United States Patent
Ouderkirk et al.

(10) Patent No.: US 10,984,476 B2
(45) Date of Patent: Apr. 20, 2021

(54) METHOD AND APPARATUS FOR DETERMINING INVENTOR IMPACT

(71) Applicant: IO Strategies LLC, Kirkland, WA (US)

(72) Inventors: Andrew Ouderkirk, Kirkland, WA (US); Rachel Andreasen, Rosemount, MN (US)

(73) Assignee: IO STRATEGIES LLC, Kirkland, WA (US)

( * ) Notice: Subject to any disclaimer, the term of this patent is extended or adjusted under 35 U.S.C. 154(b) by 55 days.

(21) Appl. No.: 16/110,848

(22) Filed: Aug. 23, 2018

(65) Prior Publication Data

US 2019/0066219 A1 Feb. 28, 2019

Related U.S. Application Data

(60) Provisional application No. 62/549,268, filed on Aug. 23, 2017, provisional application No. 62/638,699, filed on Mar. 5, 2018.

(51) Int. Cl.
*G06Q 40/06* (2012.01)
*G06Q 50/18* (2012.01)
(Continued)

(52) U.S. Cl.
CPC ....... *G06Q 40/06* (2013.01); *G06F 16/24578* (2019.01); *G06F 16/9535* (2019.01);
(Continued)

(58) Field of Classification Search
CPC .. G06Q 40/06; G06Q 10/04; G06Q 10/06398; G06Q 50/184; G06Q 50/18;
(Continued)

(56) References Cited

U.S. PATENT DOCUMENTS

| 5,774,833 A | 6/1998 | Newman |
| 5,778,362 A | 7/1998 | Deerwester |

(Continued)

FOREIGN PATENT DOCUMENTS

| CN | 104156411 A | 11/2014 |
| CN | 104156816 A | 11/2014 |

(Continued)

OTHER PUBLICATIONS

C. Plant, A. Zherdin, C. Sorg, A. Meyer-Baese and A. M. Wohlschläger, "Mining Interaction Patterns among Brain Regions by Clustering," in IEEE Transactions on Knowledge and Data Engineering, vol. 26, No. 9, pp. 2237-2249, Sep. 2014, doi: 10.1109/TKDE.2013.61. (Year: 2014).*

(Continued)

*Primary Examiner* — Bruce I Ebersman
*Assistant Examiner* — Steven R Chism
(74) *Attorney, Agent, or Firm* — Edlavitch Law PLLC; Benjamin I. Edlavitch

(57) ABSTRACT

A method for determining intellectual property value, includes creating a source of patent data; and analyzing the data to determine a patent value. Also disclosed is an instruction set executable on a machine that includes a processor and a memory. The instruction set executable on the machine to cause to the machine to: create a source of patent data; and to analyze the data to determine a patent value. A media carrying an instruction set executable on a machine. The machine includes a processor, and a memory associated with the processor. The instruction set is executable on the processor to cause to the machine to: create a source of patent data; and analyze the data to determine a patent value.

20 Claims, 38 Drawing Sheets

(51) Int. Cl.
*G06Q 10/04* (2012.01)
*G06Q 10/06* (2012.01)
*G06F 16/9535* (2019.01)
*G06F 16/2457* (2019.01)

(52) U.S. Cl.
CPC ....... *G06Q 10/04* (2013.01); *G06Q 10/06398* (2013.01); *G06Q 50/184* (2013.01)

(58) Field of Classification Search
CPC ................ G06Q 10/06; G06F 16/9535; G06F 16/24578; G06F 17/30
See application file for complete search history.

(56) References Cited

U.S. PATENT DOCUMENTS

| | | |
|---|---|---|
| 5,991,751 A | 11/1999 | Rivette et al. |
| 6,018,714 A | 1/2000 | Risen et al. |
| 6,038,574 A | 3/2000 | Pitkow et al. |
| 6,175,824 B1 | 1/2001 | Breitzman et al. |
| 6,202,058 B1 | 3/2001 | Rose et al. |
| 6,389,418 B1 | 5/2002 | Boyack et al. |
| 6,452,613 B1 | 9/2002 | Lefebvre et al. |
| 6,457,028 B1 | 9/2002 | Pitkow et al. |
| 6,526,440 B1 | 2/2003 | Bharat |
| 6,556,992 B1* | 4/2003 | Barney ................ G06Q 10/10 |
| 6,694,331 B2 | 2/2004 | Lee |
| 6,879,990 B1 | 4/2005 | Boyer et al. |
| 7,089,192 B2 | 8/2006 | Bracchitta et al. |
| 7,188,069 B2 | 3/2007 | Hagelin |
| 7,216,100 B2 | 5/2007 | Elliott |
| 7,228,288 B2 | 6/2007 | Elliott |
| 7,242,217 B2 | 7/2007 | Wageningen et al. |
| 7,315,836 B1 | 1/2008 | Elliott |
| 7,331,016 B2 | 2/2008 | Williams et al. |
| 7,346,518 B1 | 3/2008 | Frank et al. |
| 7,493,262 B2 | 2/2009 | Hagelin |
| 7,536,312 B2 | 5/2009 | Block |
| 7,546,265 B1 | 6/2009 | Donner |
| 7,558,749 B2 | 7/2009 | Chen |
| 7,606,757 B2 | 10/2009 | Poltorak |
| 7,676,375 B1 | 3/2010 | Neifeld et al. |
| 7,716,060 B2 | 5/2010 | Germeraad et al. |
| 7,792,728 B2 | 9/2010 | Poltorak |
| 7,966,328 B2 | 6/2011 | Germeraad et al. |
| 8,326,851 B2 | 12/2012 | Grune et al. |
| 8,516,076 B2 | 8/2013 | Thomas |
| 9,710,457 B2 | 7/2017 | Stobbs et al. |
| 10,013,726 B1 | 7/2018 | Jung et al. |
| 2002/0022974 A1 | 2/2002 | Lindh |
| 2002/0035499 A1 | 3/2002 | Germeraad et al. |
| 2002/0046038 A1 | 4/2002 | Prokoski |
| 2002/0077835 A1 | 6/2002 | Hagelin |
| 2002/0087442 A1 | 7/2002 | Reader |
| 2002/0178029 A1 | 11/2002 | Nutter et al. |
| 2003/0028460 A1* | 2/2003 | Kraemer ................ G06Q 10/10 |
| | | 705/36 R |
| 2003/0036945 A1 | 2/2003 | Vecchio et al. |
| 2003/0061140 A1 | 3/2003 | Chen |
| 2003/0149672 A1 | 8/2003 | Laskoski |
| 2003/0212572 A1 | 11/2003 | Poltorak |
| 2004/0010393 A1 | 1/2004 | Barney |
| 2004/0068453 A1 | 4/2004 | Duan et al. |
| 2004/0103112 A1 | 5/2004 | Colson et al. |
| 2004/0122841 A1 | 6/2004 | Goodman et al. |
| 2005/0010515 A1 | 1/2005 | Woltjen |
| 2005/0021434 A1 | 1/2005 | D'Loren |
| 2005/0071174 A1 | 3/2005 | Seebregts et al. |
| 2005/0149420 A1 | 7/2005 | Hagelin |
| 2005/0261927 A1 | 11/2005 | Bilak et al. |
| 2006/0036452 A1 | 2/2006 | Williams |
| 2006/0036453 A1 | 2/2006 | Williams |
| 2006/0036529 A1 | 2/2006 | Williams |
| 2006/0036632 A1 | 2/2006 | Williams |
| 2006/0036635 A1 | 2/2006 | Williams |
| 2006/0074867 A1 | 4/2006 | Breitzman et al. |
| 2006/0155572 A1 | 7/2006 | Postrel |
| 2006/0294138 A1 | 12/2006 | Stolba |
| 2007/0073625 A1 | 3/2007 | Shelton |
| 2007/0088738 A1 | 4/2007 | Barney et al. |
| 2007/0094297 A1 | 4/2007 | Barney |
| 2007/0136116 A1* | 6/2007 | Germeraad ............ G06Q 10/10 |
| | | 705/310 |
| 2007/0136206 A1 | 6/2007 | Kwok |
| 2007/0150298 A1 | 6/2007 | Barney |
| 2007/0226094 A1 | 9/2007 | Malackowski et al. |
| 2007/0244837 A1 | 10/2007 | Plow et al. |
| 2007/0294232 A1* | 12/2007 | Gibbs .................... G06F 16/951 |
| 2008/0086316 A1 | 4/2008 | Frank et al. |
| 2008/0086503 A1 | 4/2008 | Frank et al. |
| 2008/0091620 A1 | 4/2008 | Vollenweider et al. |
| 2008/0172266 A1 | 7/2008 | Lin et al. |
| 2008/0243642 A1 | 10/2008 | Ramer |
| 2009/0012827 A1 | 1/2009 | Avrunin |
| 2009/0024486 A1 | 1/2009 | Sevrain |
| 2009/0024534 A1 | 1/2009 | Sevrain |
| 2009/0164404 A1 | 6/2009 | Sampath et al. |
| 2009/0177656 A1 | 7/2009 | Carter |
| 2009/0234781 A1 | 9/2009 | Malackowski et al. |
| 2009/0240557 A1 | 9/2009 | Hummel |
| 2009/0259506 A1 | 10/2009 | Barney |
| 2009/0307014 A1 | 12/2009 | Block |
| 2010/0057533 A1 | 3/2010 | Ruiz et al. |
| 2010/0082395 A1 | 4/2010 | De Andrade |
| 2010/0114587 A1 | 5/2010 | Masuyama et al. |
| 2010/0169127 A1 | 7/2010 | Malackowski et al. |
| 2010/0191564 A1 | 7/2010 | Lee et al. |
| 2010/0250340 A1 | 9/2010 | Lee et al. |
| 2010/0262512 A1 | 10/2010 | Lee et al. |
| 2011/0153573 A1 | 6/2011 | Thomas |
| 2011/0153851 A1 | 6/2011 | Thomas |
| 2011/0153852 A1 | 6/2011 | Thomas |
| 2011/0154476 A1 | 6/2011 | Thomas |
| 2011/0191310 A1 | 8/2011 | Liao et al. |
| 2011/0246379 A1* | 10/2011 | Maddox ................ G06Q 40/06 |
| | | 705/310 |
| 2011/0246473 A1* | 10/2011 | Stec ...................... G06F 16/284 |
| | | 707/741 |
| 2012/0011074 A1 | 1/2012 | D'Agostino |
| 2012/0191619 A1 | 7/2012 | Gross |
| 2012/0239591 A1 | 9/2012 | Powell et al. |
| 2012/0296835 A1* | 11/2012 | Khan K ................ G06Q 50/18 |
| | | 705/310 |
| 2012/0303537 A1* | 11/2012 | Bader ................... G06Q 10/06 |
| | | 705/310 |
| 2013/0212030 A1 | 8/2013 | Lane et al. |
| 2013/0282599 A1* | 10/2013 | Kang .................... G06Q 10/10 |
| | | 705/310 |
| 2014/0258143 A1 | 9/2014 | Laroche et al. |
| 2014/0279584 A1* | 9/2014 | Lee ...................... G06F 3/0481 |
| | | 705/310 |
| 2014/0365386 A1 | 12/2014 | Carstens |
| 2015/0294074 A1* | 10/2015 | Kawato ................ G06T 7/0016 |
| | | 702/19 |
| 2015/0339572 A1* | 11/2015 | Achin ................... G06F 9/5011 |
| | | 706/46 |
| 2016/0004768 A1* | 1/2016 | Barney ................. G06F 16/95 |
| | | 707/749 |
| 2016/0350886 A1* | 12/2016 | Jessen ................. G06Q 50/184 |
| 2017/0053366 A1 | 2/2017 | Xie |
| 2018/0253486 A1* | 9/2018 | Crouse ................. G06F 40/131 |

FOREIGN PATENT DOCUMENTS

| | | |
|---|---|---|
| CN | 107480936 A | 12/2017 |
| EP | 1860578 A1 | 11/2007 |
| KR | 101851136 B1 | 4/2018 |
| WO | 2000075851 A1 | 12/2000 |
| WO | 2002009011 A1 | 1/2002 |

(56) References Cited

FOREIGN PATENT DOCUMENTS

| WO | 2007078986 A2 | 7/2007 |
|---|---|---|
| WO | 2011068939 A2 | 6/2011 |

OTHER PUBLICATIONS

Boh, et al., "Balancing breadth and depth of expertise for innovation: A 3M story", Research Policy, vol. 43, Issue 2, Mar. 2014, 349-366.

* cited by examiner

METHOD AND APPARATUS FOR DETERMINING INVENTOR IMPACT

PRIORITY CLAIM

This application claims benefit of U.S. Provisional Application Nos. 62/549,268, filed on Aug. 23, 2017, and 62/638,699, filed on Mar. 5, 2018, and which applications are incorporated herein by reference. A claim of priority is made.

BACKGROUND OF THE INVENTION

Fixed assets are physical items that an organization owns, which includes machinery, infrastructure, and land. Intangible assets are non-physical items, including patents, trademarks, goodwill and copyrights. Intangible assets are larger than tangible assets for a growing range of organizations. Patents are a highly visible and well documented part of intangible assets, and valuing an organization's patents is an important direct and indirect measure of an organization's current value, and their ability to grow.

Unfortunately, patents are difficult to value. One approach to evaluating a group of patents is performing an expert assessment of the patents, their related art, and their prosecution history. Expert assessment of patent value is expensive and time-consuming, and is only used for a limited number of patents. Most patent valuations are very subjective and are based on several approaches which can vary widely in accuracy.

In some instances, simple metrics are used to aid in valuation of a patent or patent portfolio. Simple metrics have limited utility, since many of these metrics are lagging or indirect measures, or both. Another challenge with using simple metrics for patent value is that some of the key metrics can be easily manipulated. Inventors and companies can manipulate the data by improperly citing their own patents in cases. Law firms may do the same and then tout that they write stronger patents based on the number of citations to patents they have written when in fact they may use a software package to cite every patent within a family to new members of the family or to newly drafted cases. For example, it is possible for an inventor or group of inventors to focus on generating many patents, and to increase forward citations through self-citations. It is less likely that these patents would have as high of an average value than a well-culled set of inventions.

What is needed is a timely, quick, and accurate method of assessing the value of patents. Furthermore, a method is needed for assessing the contributions and likely future contributions of both individual and groups of inventors.

SUMMARY OF THE INVENTION

A method and an apparatus for deducing patent value through analysis of inventor capabilities. In addition, a method and an apparatus for evaluating inventors and groups of inventors capabilities in consistently producing high impact inventions.

A method and an apparatus for determining inventor impact includes removing inventors and inventions which are duplicative from one or more databases. These databases are then used to numerically depict certain aspects of inventors in the inventive community. The data can then be used to identify individual inventors to certain groupings of inventors. The value of patents can be determined from the standpoint of individual inventors, or from the standpoint of a company, or from a combination thereof. The data can even be used to select individuals for building an inventive team.

A process for determining intellectual property value which includes: providing a source of patent data, analysing at least the classifications and inventor order of the inventors, and summarizing the analysis into at least one innovation metric for the inventors. In one embodiment, the at least one metric analysis further includes the domain experience of the inventors. In still another embodiment, the method is used to evaluate a group of at least 10 patents. In yet another embodiment, the innovation characteristics are determined for all inventors. In another embodiment, a group of patents is evaluated and the change in the evaluation is tracked in time.

Also included is a process for determining intellectual property value which includes: providing a source of patent data, analysing at least the classifications and inventor order of the inventors, and summarizing the analysis into at least one innovation metric for the inventors, wherein the at least one metric further includes the inventor network. In one embodiment the patents are related by a common classification, e.g. an IPC. (International Patent Classification), or the patents are related by a common inventor, or the patents are related by a common assignee. In still a further embodiment, the innovation metric is based on a weighting of different contributions of the innovation metric, where the weighting is based on the inventor order for each patent. In yet another embodiment, the patents are valued within a patent class and this valuation is compared between assignees. In still another embodiment, the patents are valued within a patent class and this valuation is compared between a first organization and a second organization for the purposes of assessing an acquisition value.

Another method for valuation of at least one patent includes: identifying the inventors on a patent, determining an innovation characteristic for at least one of the inventors, and creating a valuation metric that is based on the innovation characteristic.

Still another invention is an innovation characteristic that depends on factors selected from the group of the co-inventors, the number of patent classifications, the forward citations from the inventors of an existing portfolio. Also included in the innovation characteristics is a depth of classifications, a breadth of classifications, a number of countries filed in, back citations, self-citations, recognition, financial impact, an average position in an inventor list, membership in a collaborator network, a number of inventors per patent, a number of existing patents, a number of existing patent families, and an inventor network role. In one embodiment, the above listed characteristics are used to identify innovators with high probability of creating high value inventions. In another embodiment, the above characteristics are used to identify innovators with high probability of creating high value inventions.

A method for evaluating the innovation capability of an inventor comprising an array of inventor characteristics for at least a first and second inventor, an assessment of at least the first inventor and using the assessment to train a computer to predict the inventor characteristics of the second inventor.

Many of the above methods include programming a processor of a machine to determine exact values. One apparatus is a machine with a processor that performs at least a part of the methods set forth above. Another apparatus can be an instruction set on a media. The instruction set, when executed by the processor will perform at least part of one or more methods discussed above.

DETAILED DESCRIPTION OF THE INVENTION

Figure 1:
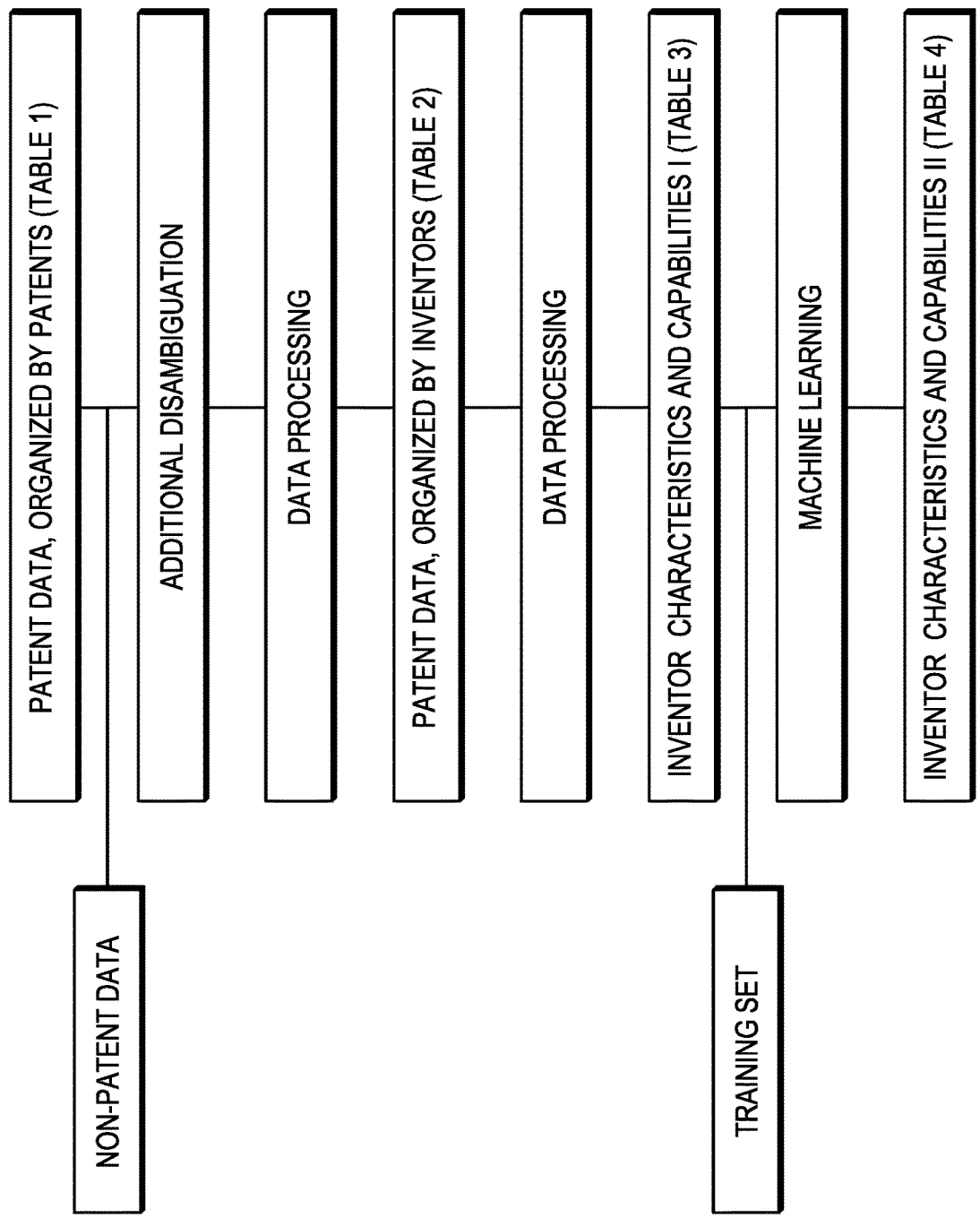
FIG. 1 is a flow chart of steps and results for assessing individual inventors, according to a preferred embodiment.

There are many approaches for patent valuation. One is to analyse metrics of the patent. These metrics commonly include citations, particularly forward and backward citations, the number of claims, the length of claims, the age of the patent, the size of the patent family and related portfolio, and the number of international filings. Of these metrics, forward citations are generally considered to be the best indicator of patent value (5, 6). Forward citations, though, are a lagging indicator of patent value (6).

Patent data from data providers commonly provides bibliographic data, citation data, and legal data. Bibliographic data includes the patent title, key dates, foreign equivalents, inventors and related information, and assignees and related information. Citation data is commonly provided as backward citations. Forward and self-citations can be determined from analysis of other patents, publications, and literature. Legal data includes prosecution history, office actions, continuations, assignment transfers, and the status of patents.

Patent data typically becomes publicly available 18 months after filing. The information that is available through the publication of the application, bibliographical data, and legal data, includes patent classification areas that relate to the application as well as a typically small set of cited patents. The number of cited patents will increase during patent prosecution due to additions from the inventors, through Information disclosure statements or their equivalent, and related art found by the examiner. These cited patents are a combination of backward citations and self-citations (inventors citing their own previously filed art). To a small degree before publication, and more rapidly after publication, other patents will cite the patent creating forward citations. Forward citations typically become a statistically significant metric between 4-7 years after the patent publishes, and most of a typical patent's forward citations accrue 10-15 years after publication.

In some instances, the metrics for patent value can be weighted, and the resulting number is used to assess the value of a patent. For example:
1. Forward citations (40%)
2. Age of patent from priority date (20%)
3. Independent claim count (adjusted by number of means claims) (15%)
4. Claim 1 word count (15%)
5. Family size and international filings (10%)

As discussed above, forward citations are a lagging indicator. Independent claim count, claim 1 word count, and family size and international filings are also all lagging metrics, since all these metrics may change during prosecution, continuations, and national stage filing.

An alternative approach to measure patent value for an organization or an individual inventor is simply measure the number of patents or patent families (8). This approach has the advantage of a short lag time and is relatively easy to apply, but the power-law distribution of patent value means that this analytic can have a very large error. The power-law distribution means that most filed patents have little to no value, and a small number of patents can dominate a patent portfolio's value. Individual inventors may be assessed by their forward citations, but as for patents, the number of forward citations is a lagging indicator. Individual inventors may also be assessed through their co-inventor network, but this is commonly a simple graphical assessment of nodes and edges of the network, or the count of different co-inventors. These data are commonly used as a qualitative assessment of connections, rather than as an accurate tool for assessing individual inventors. Assessing the value contributed by individual inventors is important for recruiting, compensation, engagement, and organizational structure. The use of statistically noisy and lagging indicators in assessing inventors does not work well at an individual level.

The value of an inventor's patents can be correlated to their depth and breadth of Patent Classifications at a classification level, and the number of co-inventors. The results from the study, as is the case for statistical assessment of patents, is found to be statistically noisy, and was imprecise in assessing individual patents and their inventors.

The invention uses patent data, where the data at least has inventor names, at least one key patent date, key dates being the earliest priority date, publication date, and the like, and the inventor's co-inventor names. Preferably, data on the order of the inventor's names as provided on the patent or patent application, or both, is available. Preferably, the data also contains patent classifications, for example, International Patent Classifications (IPC) and the Cooperative Patent Classification (CPC). Preferably, the patent data also contains citation data, at least containing backward citations, from which, forward and self-citations may be calculated. Citation data may also include examiner assessments for cited art, such as X, Y, or A designation. Preferably, the data contains legal data, including office actions, inventor responses, assignments, and if the patent or application is alive. Furthermore, the data preferably contains other sources of information on the inventors, including, for example, non-patent related publications and information. Additional inventor data may include current employer, network, and skills. Preferably, the data also includes the law firm working with the inventor.

Patent specifications and claims may also be used to assess inventors. The depth of discussion on technical attributes, examples, simulation results, experimental measurements support inventor depth. Additionally, a wide variation on solutions that enable the invention and problems that the solution can solve support inventor breadth. The relationship between patents that make up an inventor's patent portfolio can also support inventor depth, or breadth, or both, and may also indicate an inventor's ability to solve a complex system problem in protecting and exploiting a new technology. The number and types of claims can also indicate inventor capabilities.

Other sources of data include assessments on the characteristics, competencies, and capabilities of all or a group of inventors. The assessments are preferably based on expert opinion or by a consensus of multiple individuals. Other information may include professional recognition such as awards, degrees, and rank, and role within an organization. The assessments may include, but are not limited to, assessment of the inventor's prior patents. The assessment may include, patent scope, validity, discoverability, and portfolio reinforcement, economic value and impact, and technological impact. Economic impact may be estimated through one or a combination of audits, opinion, patent outcomes measured by either entering or conclusions from litigation, continued payment of maintenance fees, licensing, enabled product and service sales, and number of international filings. The assessment may also include judgement of the political skill of the inventor, where political skill may be assessed for either promoting the patented technology for common good or for self-interest. The inventor may be assessed for the role that chance contributed to their success, and the probability of future success. The inventor may be assessed for how they work within teams, specifically if they work better independently, as part of a homogeneous group, or as part of a more complex and dynamic collaboration.

At least a portion of the inventors may be assessed for their capabilities relative to other inventors as a Specialist, an inventor with narrow and deep inventor domain experience, a Generalist, an inventor with broad and shallow inventor domain experience, or a Specialist-Generalist, an inventor with both broad and deep inventor domain experience. A portion of inventors may be assessed as Inventive Leaders; one who proposes and drives a patent application preparation, or an Enabler; one that supports other inventors with, for example, access to skills, networks, and capabilities. At least a portion of the inventors may be characterized by the ability to make unusual combinations of materials, processes, articles, organizational capabilities, and needs. At least a portion of the inventors may be ranked by their ability to successfully develop solutions for complicated problems. Complicated problems are defined as where the problem and solution-space are well-defined, and there is neither substantial interactions nor dependency on necessary changes in the rest of the organization, partners, competitors, and customers or combinations thereof. At least a portion of the inventors may also be ranked by their ability to successfully develop solutions for complex problems. Complex problems are defined as where the problem and solution-space are poorly or insufficiently defined, and there are substantial interactions and dependency of the rest of the organization, partners, competitors, and customers or combinations thereof.

Specialists have deep expertise and work effectively on complicated problems, particularly by advancing the art. Architects have deep and broad expertise, and work effectively on complicated problems, particularly by creating novel combinations of existing art. Innovators have deep and broad expertise, and work effectively on complex problems by a combination of advancing the art, using new combinations of existing and new art, and solving system problems as needed.

The terms "Specialist", "Architect", and "Innovator" are intended to be general labels describing inventor capabilities, and is not meant to be limiting. For example, a single inventor may have differing levels of capabilities of all three, and may have other capabilities as well.

FIG. 1 which is discussed in detail below, is one embodiment of a flow chart that provides a roadmap for the more detailed discussion of the invention.

A significant problem with currently available patent data is the consistency of an inventor's and assignee's name across multiple patents. Recently, there has been a great deal of effort placed on disambiguating inventor's and assignee's names. The most common approach for inventor disambiguation is to look at names that are similar, for example, Kate Olson and Katherine P Olson, and decide if they are the same person by looking at a combination of geographic data, common assignees, common areas of technology (classifications), or common co-inventors, and combinations thereof. This is a highly demanding computation, and has only recently become possible to process for a large number of patents.

While the current disambiguation programs are effective in combining names, this creates a problem for assessing inventors as described in this invention. The current disambiguation programs make a large number of false-positive errors, i.e., incorrectly attributing patents to one person, but are effective at minimizing false-negative errors, where a single inventor's patents are split between two or more inventor entities in the database, or miss-attributed to another inventor. While this is not a major issue in assessing patent value directly, it is a severe issue in assessing inventors. We are assessing inventive records for every inventor, and these incorrectly joined inventors substantially distort the data. For example, two inventor's patent records may be combined and attributed to a single person. There are a very large number of these overly combined inventors in commercially available disambiguated databases, and these overly combined inventors (falsely prolific inventors) can be approximately equal to the number of records of correctly disambiguated inventors (truly prolific inventors). Unfortunately, Bayesian classification by the inventor's number of patents was not useful due to the overlap between truly and falsely prolific inventors. Surprisingly, a solution was found by considering the number of organizations that the inventor belongs to and the number of assignee changes an inventor had to date, among other data, in classifying the overly combined data. For example, bibliographic data for a true inventor would show relatively few organizational changes based on the assignee for the patent, whereas a false inventor (made up from data from several inventors) would show a large number of organization changes based on bibliographic data. For western organizations in PATSTAT patent data, this reduced the number of false-positive errors from an unacceptable 35% of prolific inventors to less than 3%, and false-negative errors did not change.

Preferably, the inventor database containing more than 1000 inventors, more than 10,000, or more than 1,000,000 inventors, has no more than 30% of the prolific inventors being falsely prolific inventors, preferably no more than 15%, and most preferably more than 5%. Prolific inventors are defined here as those with more than 10 patents, alternatively more than 25 patents, alternatively more than 50 patents.

Another method for solving the disambiguation problem for inventors and assignees is to use supervised machine learning using the data generated from this invention. For example, patent data can be provided to a computer, where the names of the inventors and assignees are not disambiguated, or are only partially disambiguated. The program running on the computer can determine inventor characteristics, and based on similar names, common characteristics, and related data, can improve disambiguation.

The patent data may be conditioned before analysing inventors. Conditioning may include reorganizing the patent data so it is organized by each inventor rather than each patent. An example of the common format for organizing patent data, which is by patent ID, is shown in table 1.

TABLE 1

| Patent ID | Date | Inventor IDs | Assignee | IPCs | Backward Citations |
|---|---|---|---|---|---|
| 100 | D1 | A, B, C | AA | B03C 1/02, G02F 1/017 | 80, 83 |
| 101 | D2 | A, D | BB | G02F 1/015, G03F 1/22 | 66, 83, 100 |

Table 1 shows a subset of the typical patent data that is available, and it will be used to illustrate the subsequent processing steps. Each label within a cell of table 1 represent either the patent number (e.g. patent number 100), the date for the patent (e.g. D1 is the earliest priority date for patent 100), the inventor name (e.g. inventor A), an assignee name (e.g. assignee AA), classifications for patent 100, and patent numbers cited by the patent (e.g. patent numbers 80 and 83 are cited by patent 100. Table 1 is a patent-centric perspective of the patent data, where the data is organized by patent application.

TABLE 2

| Inventor ID | Patent ID | Date | Assignee | Inventor Order | Depth 1 | Depth 2 | Depth 3 | Depth 4 | Depth 5 | Breadth 1 |
|---|---|---|---|---|---|---|---|---|---|---|
| A | 100 | D1 | AA | 1 | 1 | 1 | 1 | 1 | 1 | 2 |
| A | 101 | D2 | BB | 1 | 1 | 2 | 2 | 2 | 2 | 2 |
| B | 100 | D1 | AA | 2 | 1 | 1 | 1 | 1 | 1 | 2 |
| C | 100 | D1 | AA | 3 | 1 | 1 | 1 | 1 | 1 | 2 |
| D | 101 | D2 | BB | 2 | 1 | 1 | 1 | 1 | 1 | 1 |

| Inventor ID | Breadth 2 | Breadth 3 | Breadth 4 | Breadth 5 | Backward Citations | Forward Citations | Self-Citations | Co-inventors |
|---|---|---|---|---|---|---|---|---|
| A | 2 | 2 | 2 | 2 | 2 | 0 | 0 | 2 |
| A | 2 | 2 | 3 | 4 | 3 | 1 | 1 | 3 |
| B | 2 | 2 | 2 | 2 | 2 | 1 | 0 | 2 |
| C | 2 | 2 | 2 | 2 | 2 | 1 | 0 | 2 |
| D | 1 | 1 | 1 | 2 | 3 | 0 | 1 | 1 |

Table 2 shows the patent data of table 1 converted to an inventor-centered perspective. The patent data is conditioned to show the cumulative effects of each inventor adding patents. The cumulative effects include depth and breadth and unique co-inventors.

Depth and breadth is calculated in an improved method of what is described in reference 7. The method of determining depth and breadth is improved by using weighting factors with multiple levels of classifications rather than categorical variables generated from a single level.

A method of determining inventor depth is shown in Equations 1, 2, and 3.

$$y_{l_n} = \sum_{m=1}^{M} \left( \frac{1}{(\text{inventor order})^{kd}} \right) \quad \text{Eq. 1}$$

Where the array $y_{l_n}$ is the sum of the number of occurrences of each of the classification codes for the inventor's patents for classification level l, where each occurrence is weighted by the inventor order. M is the number of occurrences of classification codes within an inventor's patent records. kd is a scalar for the impact of inventor order on depth.

For example, assume that an inventor has two patents or applications, and is the first listed inventor for a patent having G02F as a third-level classification, and the inventor is the second listed inventor for a second patent, also having classification G02F. If kd=0.5, then $y_{3_1} \approx 1.707$.

References to patent records as described in this invention may include both issued patents and published patent applications.

l is the patent classification level, where l=1 is the highest level of a hierarchical classification system, l=2 is the next level, etc. For example, for IPCs, Level 1 may be G, or Physics, Level 2 may be G02, or optics. N is the maximum number of unique classification codes for the level l.

For each level for all the inventor's patents, the common classifications are counted while being weighted by inventor order. In other words, classifications in patents where the inventor is one of the first listed of multiple inventors will have more significant impact.

The array $y_{l_n}$ is then sorted and relabeled such that $y_{l_1}$ is the largest value, $y_{l_2}$ is the next largest, etc.

Depth can be calculated with Equation 2.

$$\text{Depth}_l = \sum_{n=1}^{N} y_{l_n}^{BD}(n^{Ad} - (n-1)^{Ad}) \quad \text{Eq. 2}$$

Total depth can be calculated by the weighted sum of each of the $\text{Depth}_l$ values as shown in Equation 3.

$$\text{Depth} = \sum_{l=1}^{L} (WtD_l \times \text{Depth}_l) \quad \text{Eq. 3}$$

Where $WtD_l$ is an array of weighting factors.
Breadth may be calculated in a similar method as Depth.

$$\text{Breadth}_l = \sum_{n=1}^{N} y_{l_n}^{Bb}(n^{Ab} - (n-1)^{Ab}) \quad \text{Eq. 4}$$

$$\text{Breadth} = \sum_{l=1}^{L} (WtB_l \times \text{Breadth}_l) \quad \text{Eq. 5}$$

Where the coefficients for calculating Depth and Breadth are shown in Table 2a below.

TABLE 2a

| Parameter | Value |
|---|---|
| Ad | 0.5 |
| Bd | 0.5 |
| Ab | 1.5 |
| Bb | 0.5 |

TABLE 2a-continued

| Parameter | Value |
|---|---|
| kd | 1 |
| kb | 1 |

Table 2b shows the weighting factors WtD and WtB.

TABLE 2b

| Classification level l | WtD | WtB |
|---|---|---|
| l = 1 (broadest) | 0.5 | 1 |
| l = 2 | 1 | .5 |
| l = 3 | 1 | .5 |
| l = 4 | 1.1 | .2 |
| l = 5 (narrowest) | 1.5 | .2 |

Equations 1-5 show one way of calculating the depth and breadth of skills of an inventor. Other means include manually assessing patents, particularly as part of developing a training set for a supervised machine learning algorithm. Unsupervised machine learning may also be used to calculate depth and breadth from patent or inventive outcomes. Patent and inventive outcomes include, for example, organizational growth, profit margins, patent citations, prolific inventor retention within an organization, inventor productivity, market capitalization, or stock price.

Inventor depth and breadth may be measured in other ways, such as by evaluation of their skills and capabilities, or by measuring the inventor's brain with, for example, functional magnetic resonance imaging (fMRI). fMRI has shown that the depth and creativity can both be measured. (Maguire, E. A. et al. London taxi drivers and bus drivers: a structural MRI and neuropsychological analysis, Hippocampus 2006, 16(12): 1091-101 and De Pisapia, N., et al. Brain networks for visual creativity: a functional connectivity study of planning a visual artwork., Nature Scientific Reports 6, 39185, 2016.) fMRI and other neuropsychological analyses can be used to first correlate the results of the analyses with inventor skill, and then repeat the analyses with a larger population of inventors to create a training set.

Depth and breadth may increase linearly as classifications are added to an inventor's records, or they may change non-linearly. For example, the effect of additional classification instances for an inventor may yield a diminishing impact on depth, whereas it may yield an increasing impact on breadth.

The data also shows non-cumulative information for each patent associated with each inventor. Non-cumulative data includes inventor order, backward citations, forward citations, and self-citations.

This invention advances the art by developing multiple hierarchical levels for both depth and breadth metrics. This breakdown into multiple levels allows improved analysis of an inventor's characteristics and capabilities.

TABLE 3

| Inventor ID | Patent ID | Average Depth | Average Breadth | T-Value | Backward Citation Score | Forward Citation Score | Self-citation Score | Specialist | Architect | Innovator | Network |
|---|---|---|---|---|---|---|---|---|---|---|---|
| A | 100 | | | | | | | | | | |
| A | 101 | | | | | | | | | | |
| B | 100 | | | | | | | | | | |
| C | 100 | | | | | | | | | | |
| D | 101 | | | | | | | | | | |

Table 3 shows the inventor perspective of Table 2 further processed to show inventor characteristics and capabilities (values not shown). These include:

Average depth. This may be a numerical average of the 5 levels of depth, or it may be a weighted average, or it may be a subset of the levels of depth (eg. only level 3). The average weighting may also change based on the specific inventor characteristic and capability being considered.

Average Breadth. This may be a numerical average of the 5 levels of breadth, or it may be a weighted average, or it may be a subset of the levels of depth (e.g. only level 3). The average weighting may also change based on the specific inventor characteristic and capability being considered.

T-value. T-value reflects a combination of depth and breadth metrics. T-value is intended to reflect the specialist-generalist characteristics of an inventor.

Backward citation score. This is a prediction of the ultimate number of backward citations for a patent considering the inventor's history, the inventor's co-inventor's history, and a weighting based on inventor order.

Forward citation score. This is a prediction of the ultimate number of forward citations for a patent considering the inventor's history, the inventor's co-inventor's history, and a weighting based on inventor order.

Self-citation score. This is a prediction of the ultimate number of self-citations for a patent considering the inventor's history, the inventor's co-inventor's history, and a weighting based on inventor order.

Specialist score. An estimation of the inventor's characteristics and capabilities to advance or apply the art of a field, and to solve complicated problems. Specialists have high depth, low breadth, and co-inventor networks with similar backgrounds to the inventor.

Architect score. An estimation of the inventor's characteristics and capabilities to combine disparate technologies and processes to solve complicated problems. Architects have high depth, high breadth, and broad networks of inventors with different areas of skill than the inventor.

Innovator score. An estimation of the inventor's characteristics and capabilities to solve complex problems.

Innovators have high depth, high breadth, particularly at IPC level 2 and 3, and very extensive and dynamic networks.

Network. An estimation of the value of an inventor's network measured by one or more of the following:

Importance—who collaborated and referenced the inventor, and what were their characteristics and capabilities?

Symmetry—bidirectional references and collaborations.

Centrality—number of steps of collaboration to whole network

Clustering—Number of triads of collaboration where the inventors is bidirectional Bridging—number of high quality connections (specialists, architects, and innovators)

Dynamic—how quickly are new connections established when there are changes for the inventor that affect their existing network.

The network data may be either a single metric based on a weighted compilation of the individual network analyses, or may be reflected through multiple scores.

Table 4 shows an example of parameters (values not shown) based on using a combination of experts or consensus or both to evaluate a portion of inventors as a training set for supervised machine learning. For example, a training set for calculating political skill, economic impact, architecting, serial innovator, Specialist Score, Architect Score, Innovator Score, and Network Score may be generated by expert review of inventors' performance in each area. Preferably, the inventors making up the training set are highly diverse in skills and capabilities, and also preferably, the training set has at least 50 inventors, more preferably at least 100 inventors. Preferably, the scores follow a power-law distribution, where some exceptional inventors may have a 10 or even 100 times or higher score than an average inventor.

A suitable method of rating inventors is for experts to review a group of inventors' patents, and score each patent for some or all of the headings of Table 4. Preferably, at least the Specialist, Architect, and Innovator's scores for the inventors are recorded, and a suitable means of attributing contribution from the different inventors is applied. One method is to apply the scores with diminishing weighting by the inventor order. For example, a patent may have a specialist score of 5, an architect score of 7, and an innovator score of 2, and the full scores are applied to the first inventor, and contribution of half the scores is applied to the second inventor, etc. This method typically requires the review of at least about 100 patents, more preferably at least 1000 patents. Preferably, bibliographic, and processed bibliographic data is also considered, including forward, backward, and self-citations, inventor order, number of co-inventors, and other data.

Alternatively, other publicly or privately held data such as financial data, personnel data, HR data, tax, spending, travel, attended conferences and internet data can be used for unsupervised machine learning.

Political skill is a ranking of the inventor's ability to influence their organization. This can be for reasons of the common good—e.g. Promoting the implementation of an invention, or to promote themselves, or both.

Economic impact. This is a quantitative or semi quantitative measure of the economic value generated by the inventor. An approach for estimating the impact is to use a "but for" approach, where it is hypothesized if the inventive team was in place except for the inventor, estimating the difference in likely economic impact. Economic impact may include sales, net income, recognition and reputation, increased brand value, and licensing.

Architecting. This assesses the inventor's ability to work with a new group and to effectively contribute based on their capabilities.

Serial Innovator. This assesses the role of chance (i.e., luck vs. skill) with the inventor. In other words, this is an assessment of how likely an inventor is to repeatedly make a significant contribution. A high serial innovator ranking suggests that the inventor has a high-level of skill at innovation.

Specialist score. This is a score derived from a training set for supervised machine learning, and broader data for unsupervised data. The training set can be developed by a number of means, including expert opinion, consensus, or both.

Architect score. This is a score derived from a training set for supervised machine learning, and broader data for unsupervised data. The training set can be developed by a number of means, including expert opinion, consensus, or both.

Innovator score. This is a score derived from a training set for supervised machine learning, and broader data for unsupervised data. The training set can be developed by a number of means, including expert opinion, consensus, or both. Specialist, architect, and innovator scores can also incorporate data from the scores of Table 3.

Network score. The network score may be developed by many means, including expert opinion, consensus, or both. Network scores can also incorporate data from the scores of Table 3.

FIG. 1 summarizes the possible steps and results for assessing individual inventors. Many of the steps and results are optional, depending on the specific goals of the analysis.

Using the available data, a computer calculates inventor capabilities. These capabilities include technology domain access, exposure, and expertise, co-inventor network, their inventive role, if they are an inventor-leader or enabler, and collaboration skills.

We have found that assessing inventor capabilities, and using that assessment to estimate patent value forms a surprisingly consistent and accurate predictor of inventor value creation that works across multiple types of organizations. Using inventor capabilities as a predictor has little lag, and provides timely, quick, and accurate data in assessing the value of recently published patents, and is relatively

TABLE 4

| Inventor ID | Political skill | Economic impact | Architecting | Serial Innovator | Specialist score | Architect score | Innovator score | Network score |
|---|---|---|---|---|---|---|---|---|
| A | | | | | | | | |
| B | | | | | | | | |
| C | | | | | | | | |
| D | | | | | | | | | difficult to manipulate. This approach can also be used to assess individual inventors for recruiting, compensation, engagement, and assignment.

The predictors for individual inventors may combined with that of other inventors in simple or complex ways to determine and optimize the likely future value generation of teams, organizations, and regions. Future value generation may be optimized for groups of inventors based on technology and product development, phases, and goals.

As discussed previously, a computing device can be used in certain embodiments, to accomplish many of the methods discussed above and set forth in the examples below. A computing device will now be discussed in more detail with respect to FIG. 38. It should be noted that this is one example of a computing device. There are many other possibilities including virtual devices which are formed in the cloud. So, a computing device may reside substantially all in one place. In other instances, memory which requires hardware may be cloud based. Software as a Service may also be used, which is software that is cloud based rather than resident on a local service or computer. It should further be noted that hardware and software can form modules. These modules can be programmed to provide specific or general functions to carry out operations of the methods discussed herein. It should further be pointed out that these modules can be all software based or all hardware based. Generally, the modules are a combination of hardware and software. It should also be noted that software includes a set of steps executable by a computing device to cause one or more processors to do one or more steps of a method. The software program can also be held on a medium such as a computer memory or the like. Generally, when software instruction sets are downloaded from a source, the instruction set is held in media before the transfer, during the transfer and after the transfer of a software instruction set to a machine. Generally, when a computing device is executing an instruction set it is a specialized machine.

Figure 38:
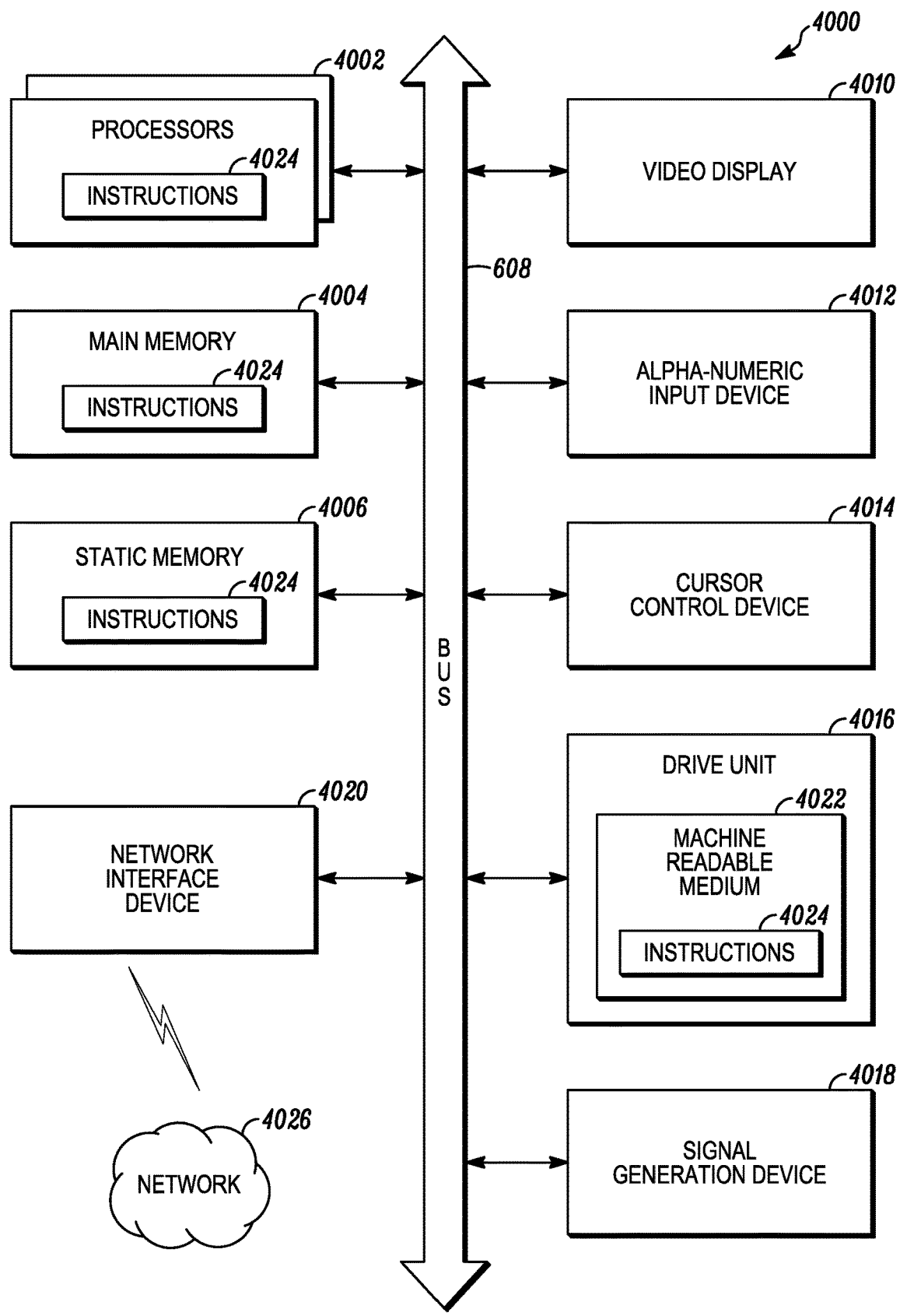
FIG. 38 is a schematic diagram of another representation of a computing device for a machine in the example electronic form of a computer system, according to yet another embodiment.

FIG. 38 shows a diagrammatic representation of a computing device for a machine in the example electronic form of a computer system 4000, within which a set of instructions for causing the machine to perform any one or more of the methodologies discussed herein. The computing device can be adapted to include the apparatus for determining various parameters and tools as described herein. In various example embodiments, the machine operates as a stand-alone device or can be connected (e.g., networked) to other machines on a network. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a smart phone, a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 4000 includes a processor or multiple processors 4002 (e.g., a central processing unit (CPU), a graphics processing unit (GPU), arithmetic logic unit or all), and a main memory 4004 and a static memory 4006, which communicate with each other via a bus 608. The computer system 4000 can further include a video display unit 4010 (e.g., a liquid crystal displays (LCD) or a cathode ray tube (CRT) or the like). The computer system 1000 also includes an alphanumeric input device 4012 (e.g., a keyboard), a cursor control device 4014 (e.g., a mouse), a disk drive unit 4016, a signal generation device 4018 (e.g., a speaker) and a network interface device 4020.

The disk drive unit 4016 includes a computer-readable medium 4022 on which is stored one or more sets of instructions and data structures (e.g., instructions 4024) embodying or utilized by any one or more of the methodologies or functions described herein. The instructions 4024 can also reside, completely or at least partially, within the main memory 4004 and/or within the processors 4002 during execution thereof by the computer system 4000. The main memory 4004 and the processors 4002 also constitute, or can include, machine-readable media.

The instructions 4024 can further be transmitted or received over a network 4026 via the network interface device 4020 utilizing any one of a number of well-known transfer protocols (e.g., Hyper Text Transfer Protocol (HTTP), CAN, Serial, or Modbus).

While the computer-readable medium 4022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall, accordingly, be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

When the methods, discussed above, are programmed into a memory of a general purpose computer, such as the one described in FIG. 38, the computer and instructions form a special purpose machine. The instructions, when programmed into a memory of a general purpose computer, are in the form of a non-transitory set of instructions. The example embodiments described herein can be implemented in an operating environment comprising computer-executable instructions (e.g., software) installed on a computer, in hardware, or in a combination of software and hardware. Modules as used herein can be hardware including circuitry for executing instructions. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method(s) can be written in any number of suitable programming languages such as, for example, Hypertext Mark up Language (HTML), Dynamic HTML, Extensible Mark up Language (XML), Extensible Stylesheet Language (XSL), Document Style Semantics and Specification Language (DSSSL), Cascading Style Sheets (CSS), Synchronized Multimedia Integration Language (SMIL), Wireless Mark up Language (WML), Java™, Jini™, C, C++, Perl, UNIX Shell, Visual Basic or Visual Basic Script, Virtual Reality Mark up Language (VRML), ColdFusion™ or other compilers, assemblers, interpreters or other computer languages or platforms.

The present disclosure refers to instructions that are received at a memory system. Instructions can include an operational command, e.g., read, write, erase, refresh, etc., an address at which an operational command should be performed, and the data, if any, associated with a command. The instructions can also include error correction data. The following examples can be accomplished with a computing device. It should be noted that the methods and examples discussed herein are not merely methods that were previously implemented and now merely computerized. These methods are not only new and not obvious but present an advancement in the area of computer arts and in the area of predicting values of patents and companies and of individuals to corporations based on new and innovative treatment of data from assorted databases. These ideas are not abstract ideas merely run on a computer to make them more effective.

Example 1. Data Preparation

Patent data from the Fall, 2016 PATSTAT dataset, available from the European Patent Office, was used to create a SQL database of international patents and patent applications, along with bibliographic data, citation data, and legal data. Company names and inventors were further disambiguated by comparing inventors to the associated number of assignee organizations and countries.

The patent data with further disambiguated inventor data was processed to provide a list of inventors with data as exemplified in Table 2. The list of inventors with data was then processed to form the list of inventors with characteristics and capabilities (ICC) as exemplified in Table 3. Finally, these results were combined with a training set of inventors, and the machine learning estimated inventor characteristics and capabilities (MLICC) was generated using Scikit-learn. The training set was created by expert opinion.

Example 2. Inventor Ranking Using Depth Level 3, Breadth Level 3, and Number of Unique Co-Inventors Inventors were ranked by the program using Depth level 3, Breadth level 3, and the number of unique co-inventors. These metrics correlated with forward citations, but the $r^2$ was low at 0.23. By using all 5 IPC levels to calculate Depth and Breadth, $r^2$ increased to 0.34. It has been found that using a plurality of levels associated with the International Patent Classification levels is superior to using a single level of the International Patent Classification system for a technology or for a patent or grouping of patents. The $r^2$ value indicates the correlation between a model and it's fit to the actual results. As can be seen, the use of multiple levels of IPC produces an increased value for $r^2$. This indicates a better fit between the model and the actual data.

Figure 2:
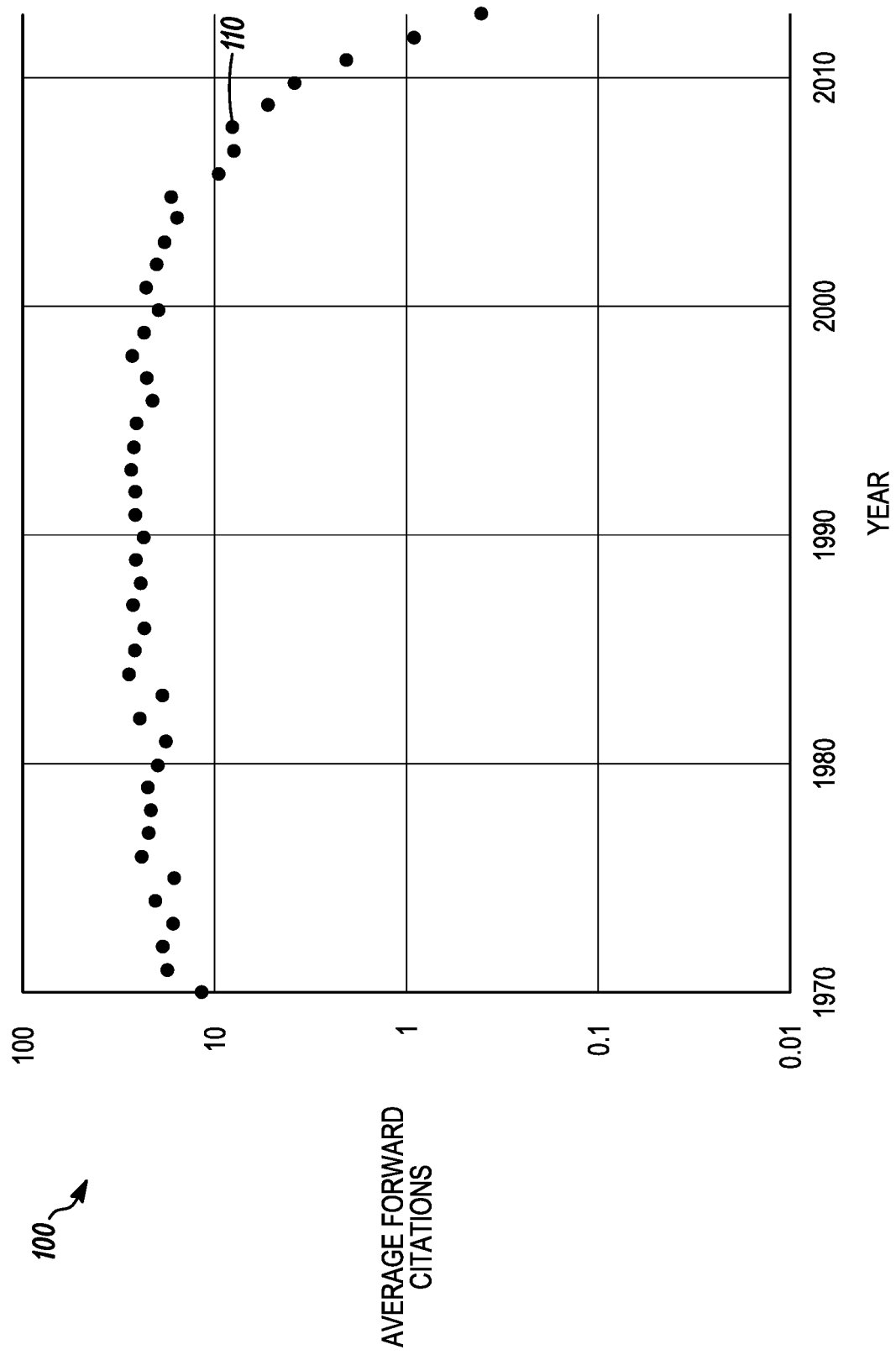
FIG. 2 is a chart of the trend in the average number of forward citations per patent (vertical axis) for all 228 organizations for the years (horizontal axis) 1970 to 2013.

Example 3. Organizational Trend Creating Patent Value Measured by Forward Citations 228 organizations selected from a group from 300 organizations generating the most US patents in 2013 were analysed using the bibliographic and legal data from the PATSTAT dataset. FIG. 2 shows the trend in the average number of forward citations per patent (vertical axis) for all 228 organizations from 1970 to 2013 (horizontal axis).

This example shows that forward citations are a lagging indicator due to the time it takes for others to publish new art that references existing art. The chart 100 shows that forward citations 110 take about 7-10 years to be about 90% of the long-term value.

Figure 3:
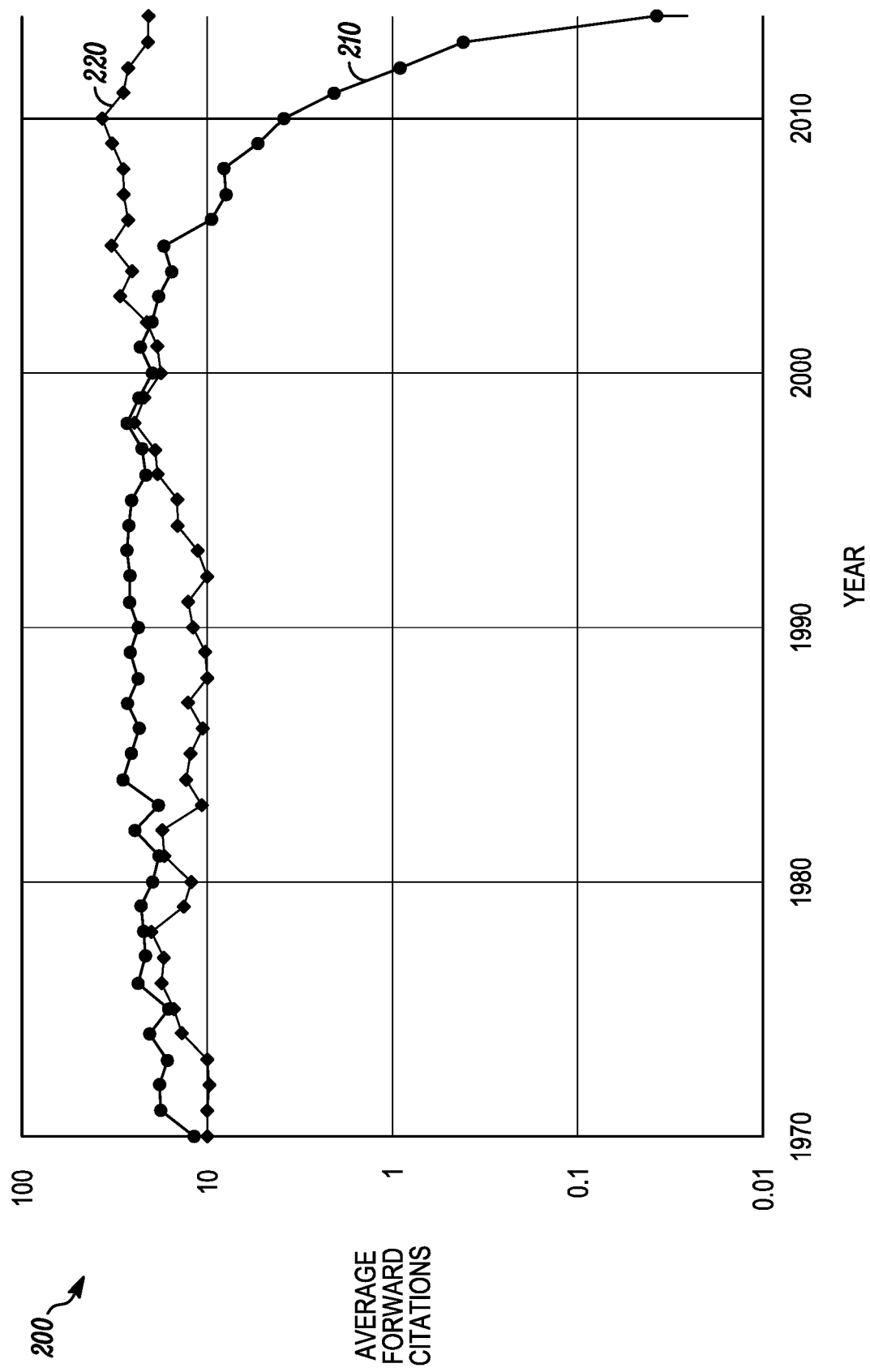
FIG. 3 is another plot of the average forward citations (vertical axis) vs. year (horizontal axis) that also includes a curve for predicting the long term average forward citations for future years, according to an example embodiment.

Example 4. Organizational Trend Forecasting Patent Value Through Inventor Characteristics The process shown in FIG. 1 was used, where chart 200 shows forward citations 210 were calculated as described in Example 3, and forward citations were estimated by the process shown in FIG. 1, using the Inventor Characteristics and Capabilities, as shown in Table 3, to calculate the forward citation score for each inventor. The patent activity for the inventors was used to predict the patents long-term average forward citations, shown in curve 220 of FIG. 3.

Example 5. Organizational Trend Forecasting Patent Value Through Inventor Characteristics The process shown in FIG. 1 was used to calculate the trend in inventor activity as estimated by average Specialist, Architect, and Innovator (SAI) activity. Average activity of, for example, the Specialists was calculated using the following equation:

$$Sa = \sum_{n=1}^{N} \left( \frac{Ss_n * InvPat_n}{TotPat} \right) \quad \text{Eq. 6}$$

Where Sa is the Specialist Activity, $Ss_n$ is the specialist score for the inventor n in the time period, $InvPat_n$ is the number of patents published or patented for inventor n that have an earliest priority date during the time period, and TotPat is the total number of patents or publications with the earliest priority date during the time period. The summation is for all N inventors in the 228 organizations described in Example 3.

Architect and Innovator activity was calculated in an analogous manner as for Specialists, where the Architect activity, Aa is calculated with the following equation:

$$Aa = \sum_{n=1}^{N} \left( \frac{As_n * InvPat_n}{TotPat} \right) \quad \text{Eq. 7}$$

Where Aa is the Architect activity, $As_n$ is the architect score for the inventor n in the time period, $InvPat_n$ is the number of patents published or patented for inventor n that have an earliest priority date during the time period, and TotPat is the total number of patents or publications with the earliest priority date during the time period.

Innovator activity, Ia, is calculated with the following equation:

$$Ia = \sum_{n=1}^{N} \left( \frac{Is_n * InvPat_n}{TotPat} \right) \quad \text{Eq. 8}$$

Where Ia is the Innovator activity, $Is_n$ is the Innovator score for the inventor n in the time period, $InvPat_n$ is the number of patents published or patented for inventor n that have an earliest priority date during the time period, and TotPat is the total number of patents or publications with the earliest priority date during the time period.

The time period for equations 6-8 can be, for example, about 6 months, a year, or longer.

The Specialist, Architect, and Innovator activities (SAI activities) were calculated as part of the Inventor Characteristics and Capabilities calculation, as shown in Table 4. The training set was based on a consensus of experts based on opinions on a number of inventors. Additional data may be gathered from expert analysis of the inventor's patents, publications, awards, and other data.

Figure 4:
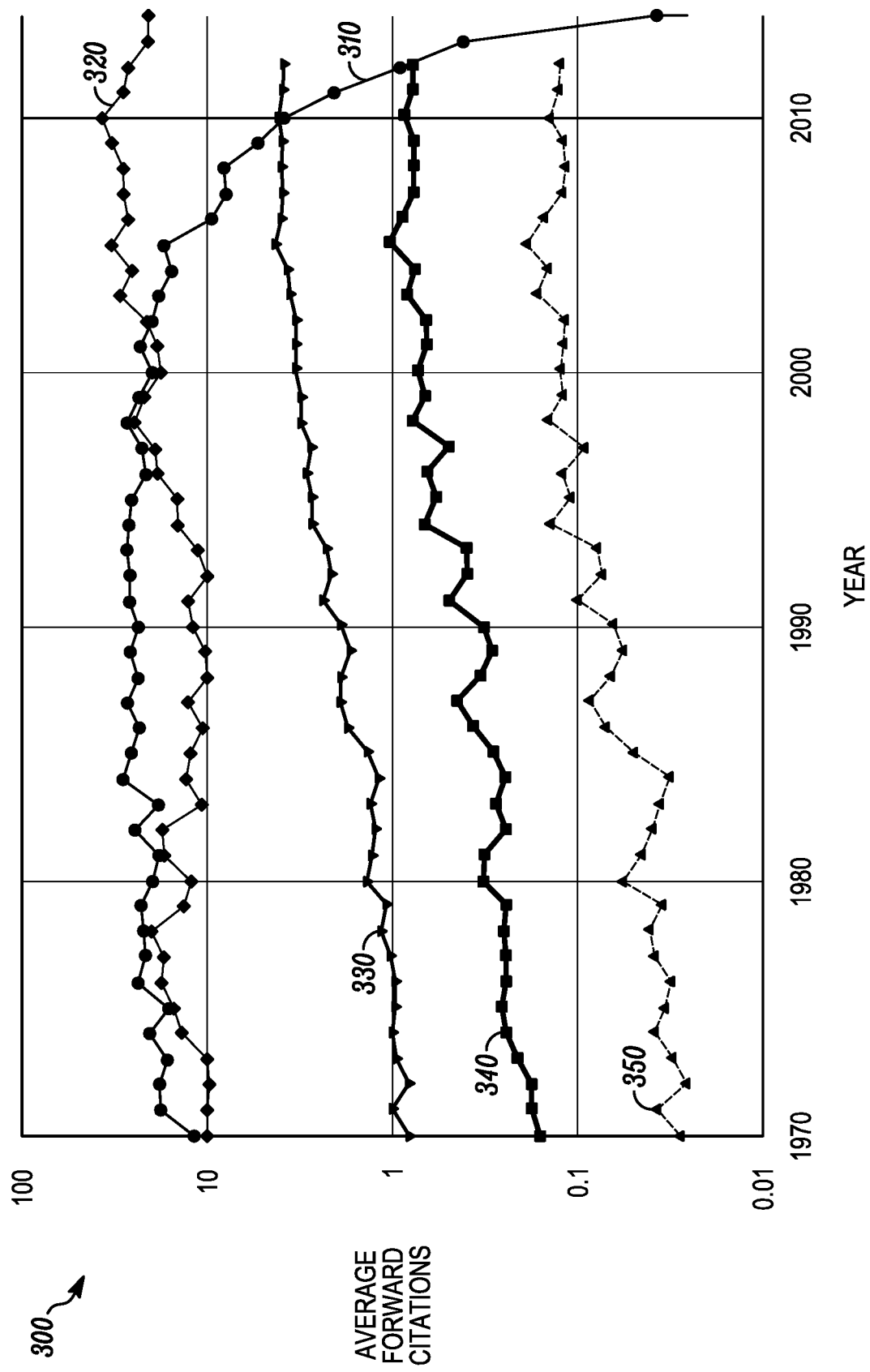
FIG. 4 is another plot of the average forward citations (vertical axis) vs. year (horizontal axis) that also includes a curve of average forward citations for inventors categorized as specialists, architects, and innovators (SAI), according to an example embodiment.

FIG. 4 shows the results in chart 300. Curve 350 is for Specialists, curve 330 is for Architects, and curve 340 is for Innovators. The scale for the Specialist, Architects, and Innovators are individually normalized to improve the readability of the graph. In other words, only the relative changes in the curves should be considered as meaningful, not the absolute position. All three curves show a significant increase in the average over the 44-year time span. As with the forward citation score, the SAI scores show much less time lag than for forward citations.

Example 6. Forecasting Organization Value

Figure 5:
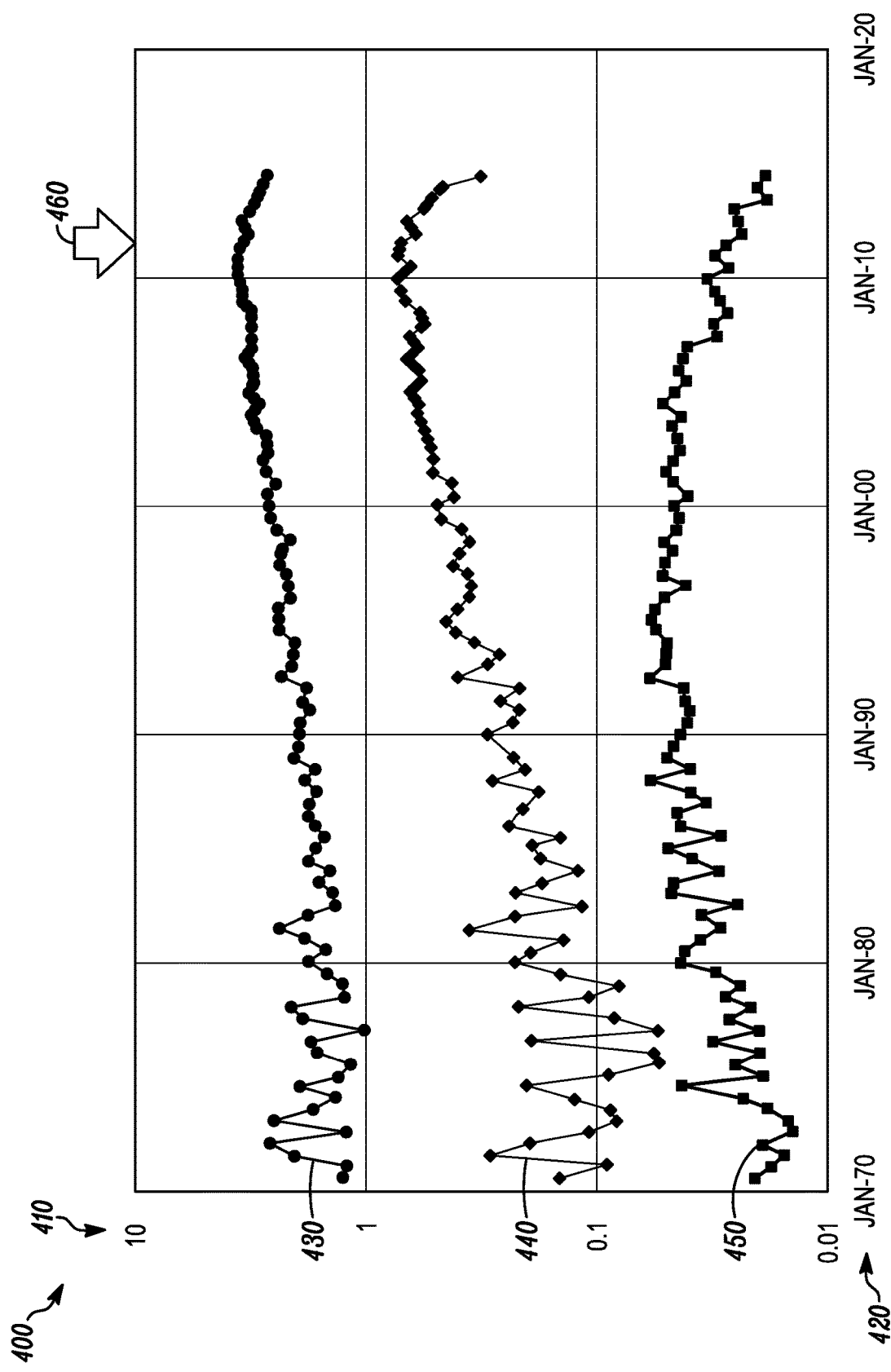
FIG. 5 is another plot of the average forward citations (vertical axis) vs. year (horizontal axis) that also includes normalized curves of average forward citations for inventors categorized as specialists, architects, and innovators (SAI), according to an example embodiment.
Figure 6:
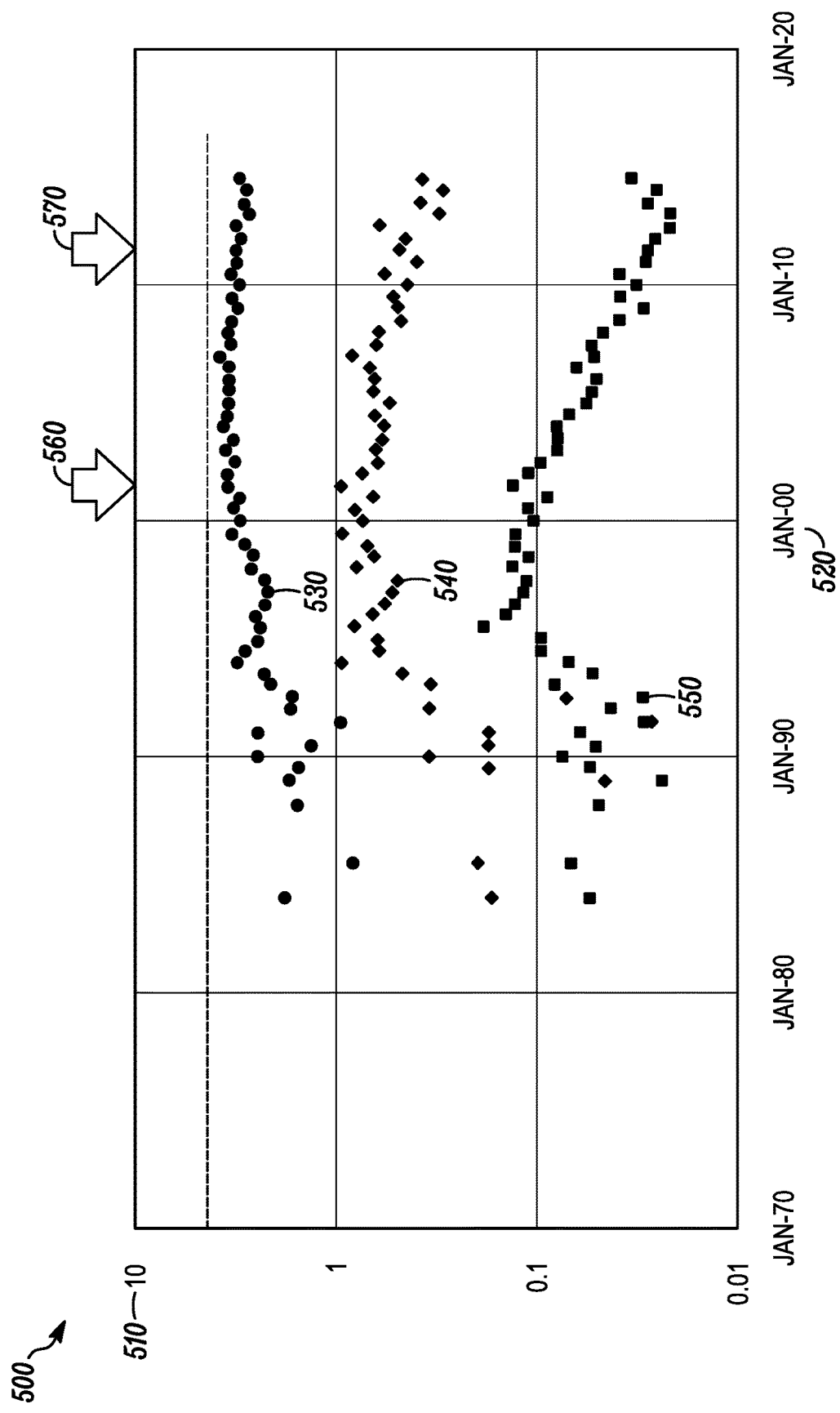
FIG. 6 is plot of the average forward citations (vertical axis) vs. year (horizontal axis) that also includes normalized curves of average forward citations for inventors categorized as specialists, architects, and innovators (SAI), and which correlates company events to these normalized curves, according to an example embodiment.

The trend for an individual organization was generated using the approach described in Example 5, where only inventors that had assigned the patent to the organization were considered. FIG. 6 shows the trend in the SAI activity for the organization. In FIG. 5, chart 400 shows normalized SAI activity, vertical axis 410, for Specialists 450, Architects 430, and Innovators 440 from 1970 to 2014 on horizontal axis 420. The impact of a change in leadership of the organization is shown at event 460, which correlated to a significant drop in Specialists, Architects, and Innovator activity. The drop in activity can be caused by a combination of inventors that have high scores for S, A, or I generating fewer patents, or for inventors who have low scores increasing their scores more slowly, or both.

Example 7. Forecasting Organization Value

The trend for an individual organization was generated using the approach described in Example 5, where only inventors that had assigned the patent to the organization were considered. FIG. 6 shows the trend in the SAI activity for the organization. Chart 500 shows normalized SAI activity, vertical axis 510, for Specialists 550, Architects 530, and Innovators 540 from 1970 to 2014 on horizontal axis 520. The impact of a change in CEO leadership of the organization is shown at events 560 and 570. Event 560 which correlated to a significant drop in Specialists and Innovator activity. Event 570 correlated to a significant increase in Specialist activity.

Figure 7:
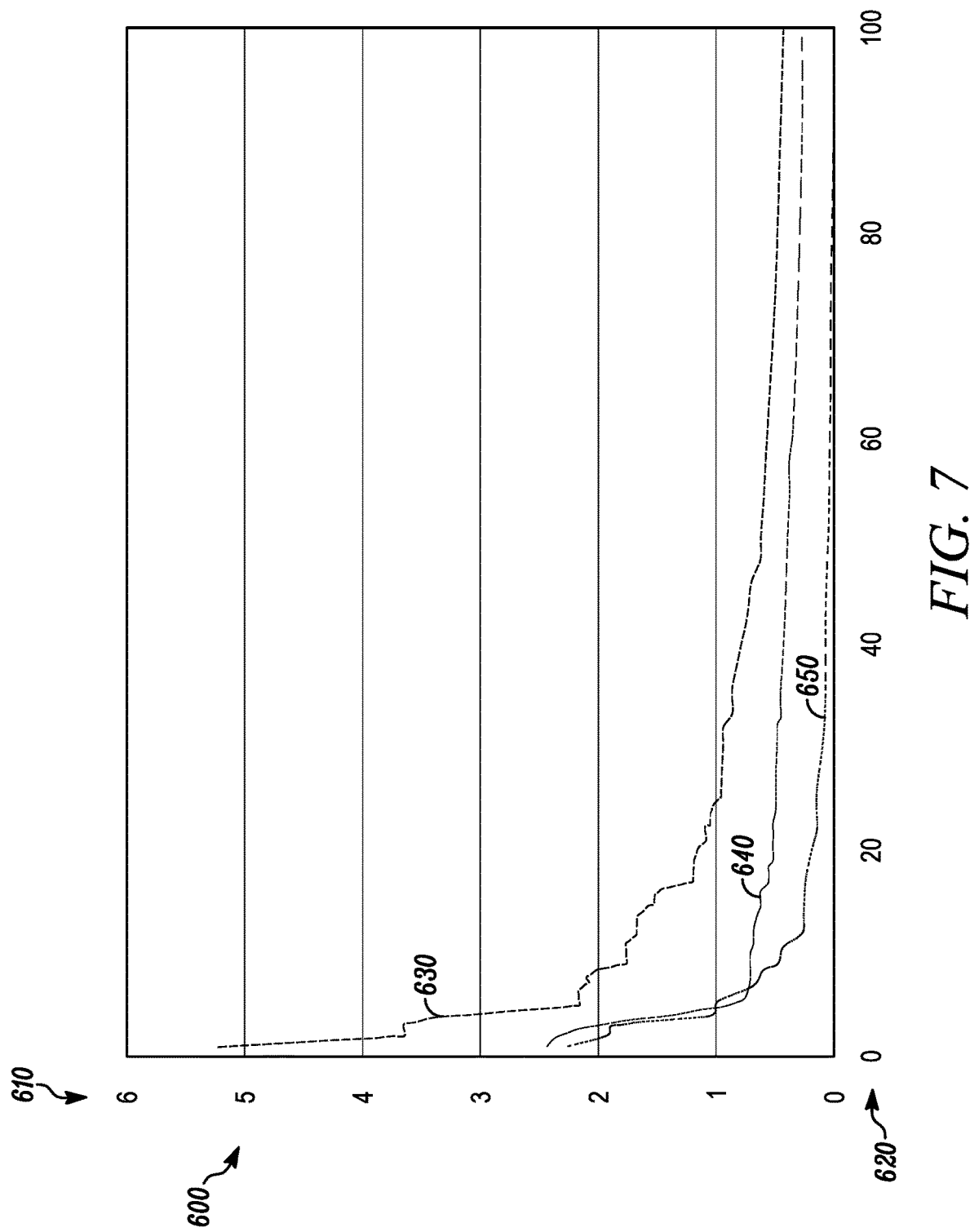
FIG. 7 is plot of an innovator score (vertical axis) vs. the number of inventors in an organization (horizontal axis) for three organizations, according to an example embodiment.

Example 8. Comparing the Degree of Innovativeness of the Top Inventors of Different Organizations Three of the 228 organizations described in Example 3 were selected, and the processed data described in Example 7 was used to identify the top innovators and their Innovator scores. The inventors were sorted by their Innovator score and the ranked-ordered inventors by Innovator score was plotted as shown in FIG. 7. Chart 600 plots Innovator score 610 by inventor number 620. Inventors for three organizations are shown in curves 630, 640, and 650. Organization 650 has a limited number of highly innovative inventors, organization 640 shows a much larger base of highly innovative inventors, and organization 630 shows both a large base of innovators with a smaller number of extremely innovative inventors.

Example 9. Identifying High-Performing Specialists, Architects, and Innovators

Table 5 shows the Specialist's, Architect's, and Innovator's scores for one of the 228 organizations described in Example 3, where the organization's inventors were originally sorted for those with the top innovative scores, that is, Inventor 1 had the highest Innovator score for the organization and Inventor 2, the second highest, etc.

TABLE 5

| Inventor Name | Specialist Score | Inventor Name | Architect Score | Inventor Name | Innovator Score |
| --- | --- | --- | --- | --- | --- |
| Inventor 1 | 2.6 | Inventor 1 | 6.7 | Inventor 1 | 2.4 |
| Inventor 2 | 1.2 | Inventor 223 | 4.8 | Inventor 2 | 2.3 |
| Inventor 24 | 0.8 | Inventor 239 | 4.8 | Inventor 3 | 2.0 |
| Inventor 4 | 0.8 | Inventor 247 | 4.8 | Inventor 4 | 1.4 |
| Inventor 4009 | 0.7 | Inventor 120 | 4.6 | Inventor 5 | 0.9 |
| Inventor 4010 | 0.6 | Inventor 222 | 4.5 | Inventor 6 | 0.7 |
| Inventor 150 | 0.6 | Inventor 225 | 4.5 | Inventor 7 | 0.7 |
| Inventor 37 | 0.6 | Inventor 263 | 4.5 | Inventor 8 | 0.7 |
| Inventor 89 | 0.5 | Inventor 287 | 4.5 | Inventor 9 | 0.7 |
| Inventor 4025 | 0.5 | Inventor 331 | 4.5 | Inventor 10 | 0.7 |

Example 10. Identification of the Top Innovative Organizations by IPC

Figure 8:
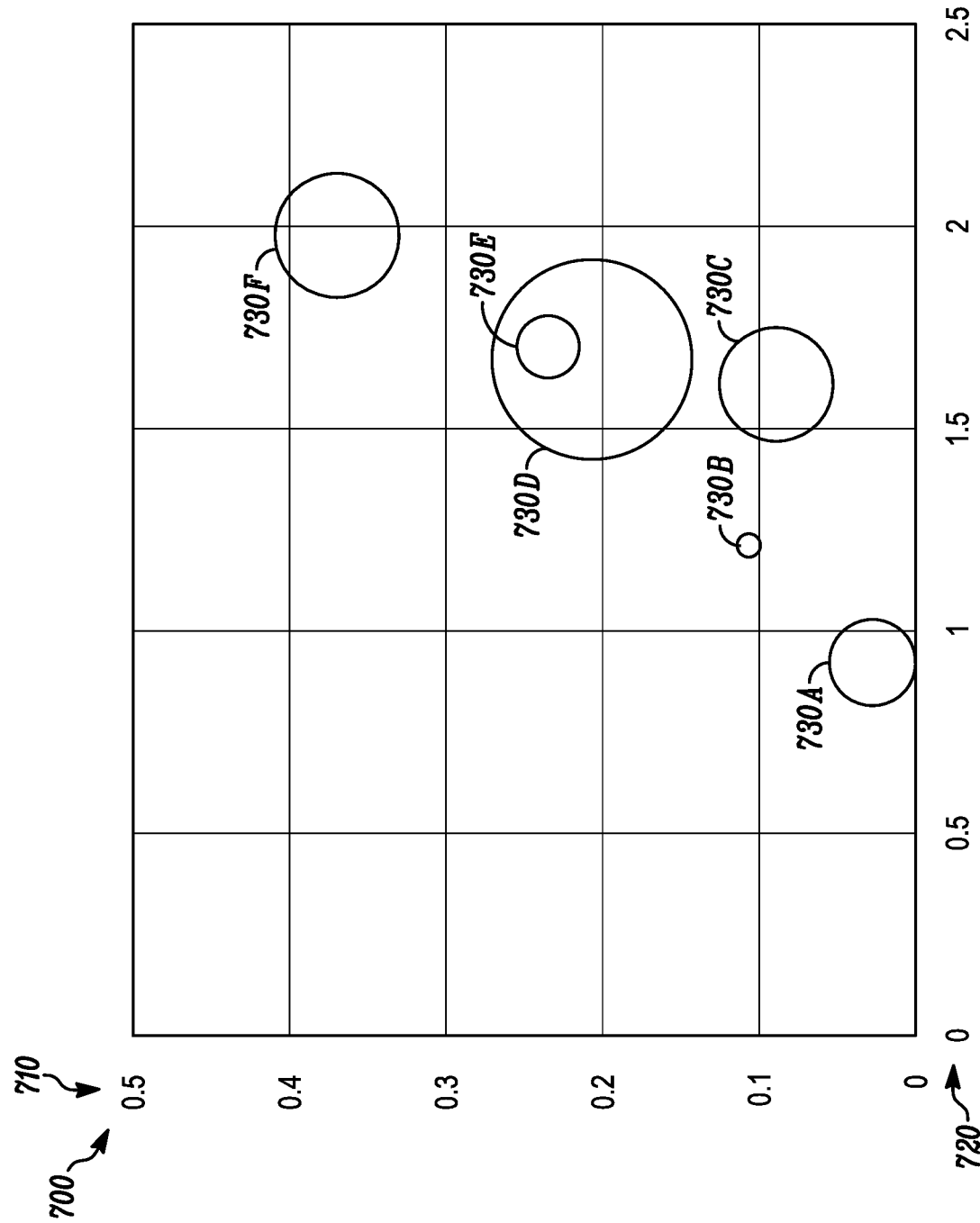
FIG. 8 is plot of a sum of Innovator scores (vertical axis) for an organization's inventors and is plotted against the sum of Architect scores (horizontal axis) for six organizations with patents in a specific international patent class (IPC) field, according to an example embodiment.

FIG. 8 shows chart 700, where the sum of Innovator scores 710 for an organization's inventors are plotted against the sum of Architect scores 720 for six organizations with patents in a specific IPC field.

The sum of innovator scores for each IPC field was calculated by the following equation:

$$SIa_{IPC} = \text{Normal} * \sum_{m=1}^{M} \left( \sum_{n=1}^{n} \left( \frac{Is_n}{(\text{Inventor Order})^{kd}} \right) \right) \quad \text{Eq. 9}$$

$$SAa_{IPC} = \text{Normal} * \sum_{m=1}^{M} \left( \sum_{n=1}^{n} \left( \frac{As_n}{(\text{Inventor Order})^{kd}} \right) \right) \quad \text{Eq. 10}$$

Where kd is a value that typically ranges from 0.1 to 1, and is taken here as being 1, Inventor order is the location of the inventor on the bibliographic data. The first listed inventor will have an inventor order of 1 (n=1), the second 2 (n=2), etc. to the $N^{th}$ inventor. $Is_n$ is the innovator score for inventor n on a patent. $As_n$ is the innovator score for inventor n on a patent. N is the number of inventors on a patent. m is the first patent in the group of M patents that have a specified IPC. $SIa_{IPC}$ is the sum of innovator scores, and $SAa_{IPC}$ is the sum of architect scores. Normal is a scaling factor to normalize a graph values.

The values for Innovator's and Architect's scores are normalized. Each organization is represented by a bubble, 730a, 730b, 730c, 730d, 730e, and 730f, where the area of the bubble is proportional to the number of patent families having an earliest priority date from 2011 to 2016.

The results shown in FIG. 8 indicate a wide variation in inventive skills between groups working in the same technology area. For example, the group(s) within a first company 730a have substantially lower skill than company 730c in being able to invent by combing technologies as shown in the Architect scores 720. Furthermore, the group(s) within company 730c have substantially lower skill in being able to work in complex areas of technologies or markets or both than group(s) in company 730f.

Figure 9A:
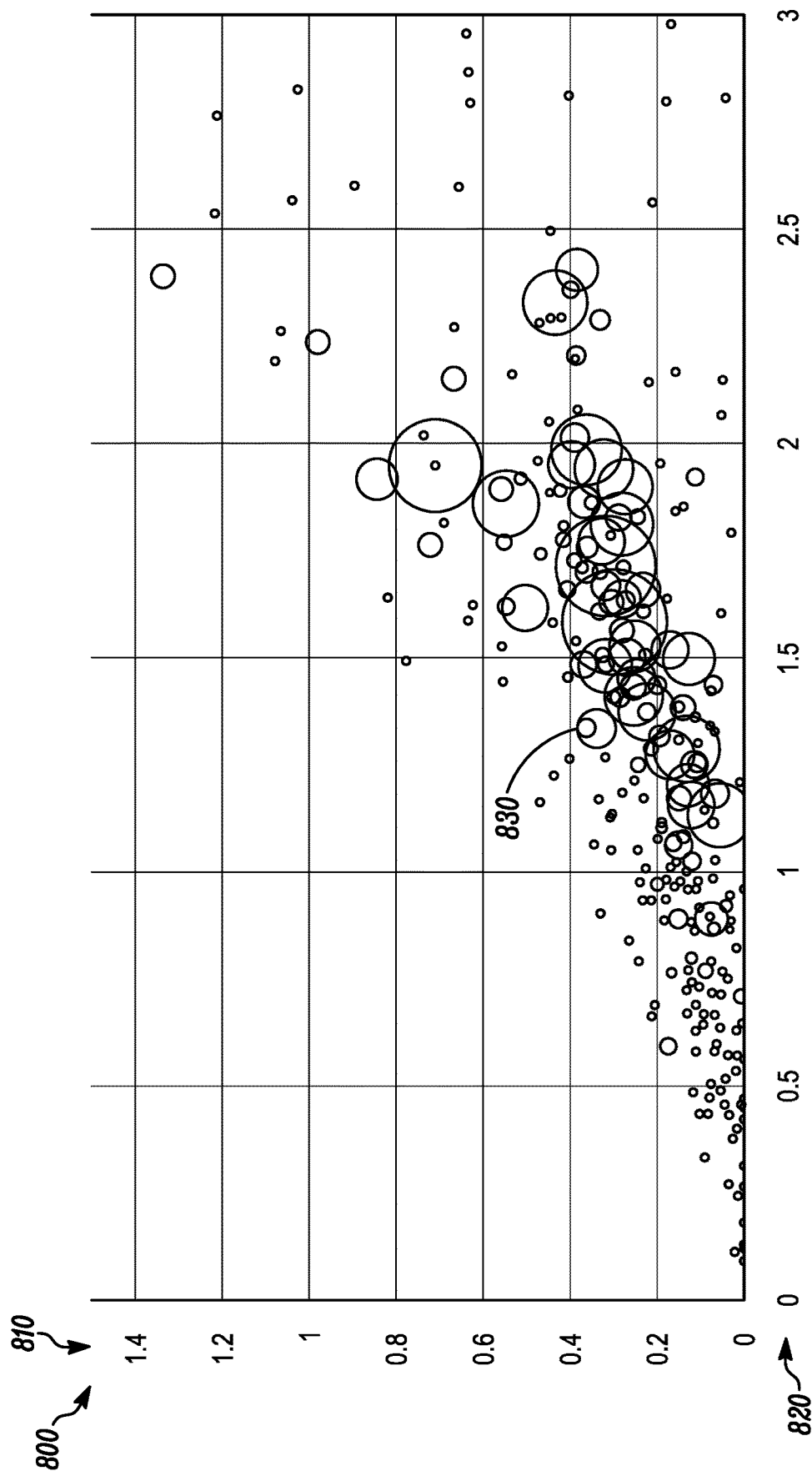
FIG. 9A is plot of a normalized sum of Innovator scores (vertical axis) for a first organization against the normalized sum of Architect scores (horizontal axis) for an organization, according to an example embodiment.
Figure 9B:
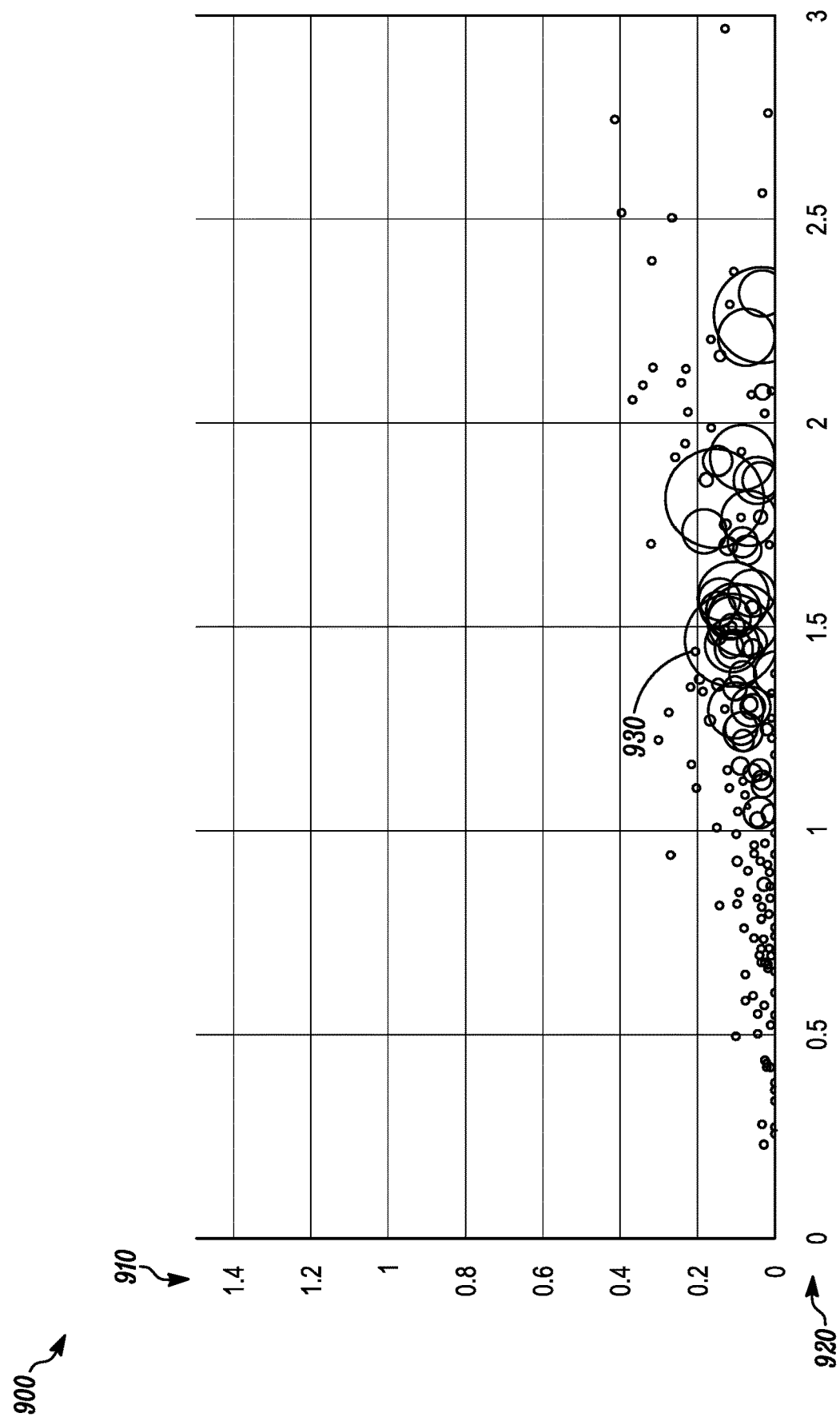
FIG. 9B is plot of a normalized sum of Innovator scores (vertical axis) for a second organization against the normalized sum of Architect scores (horizontal axis) for an organization, according to an example embodiment.

Example 11. Comparing Organizations' Ability to Architect and Innovate for All IPCs FIGS. 9a and 9b compare two different organizations ability to architect and innovate in different areas of technology. FIG. 9a shows a plot 800 that graphs the normalized sum of innovator scores 810 against the normalized sum of architecting scores 820 for a first organization. The data bubbles 830 represent all of the level 3 IPCs for the organization, and the area of each bubble represents the total number of patent families from 2011 to 2016 for that IPC. FIG. 9b shows a plot 900 that graphs the normalized sum of innovator scores 910 against the normalized sum of architecting scores 920 for a second organization. The data bubbles 930 represent all of the level 3 IPCs for the organization, and the area of each bubble represents the total number of patent families from 2011 to 2016 for that IPC.

The charts indicate that both the first and second organizations have similar ability to architect inventions, but that the second organization has substantially less ability to innovate than the first in many areas of technology.

Figure 10:
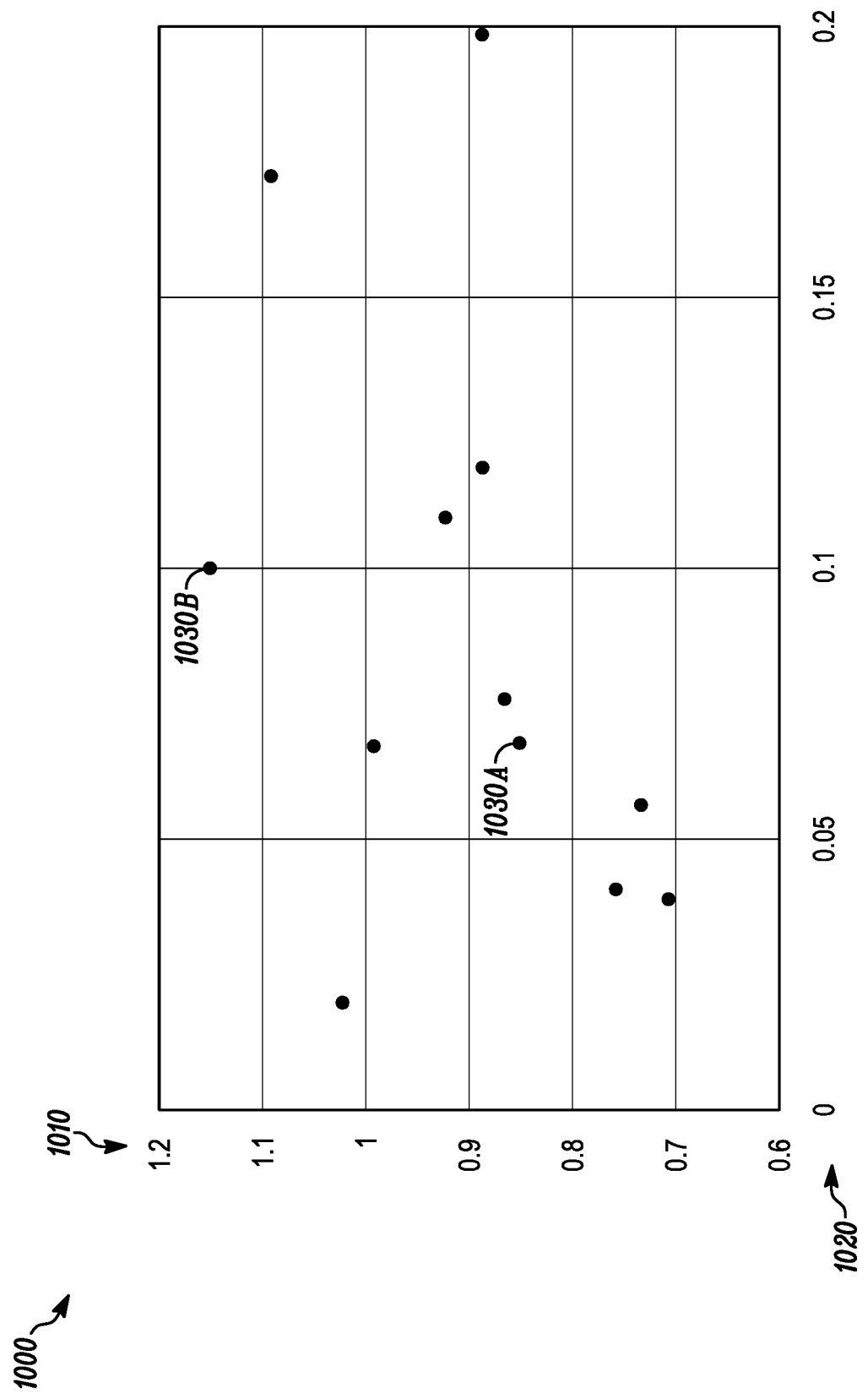
FIG. 10 is plot of a change in an Innovation metric (vertical axis) for an organization over a selected time period against the innovation metric over the time period (horizontal axis) for an organization, according to an example embodiment.

Example 12. Comparing Several Organizations in Related Businesses Relative Innovation Strength and Trend in Innovation The level and trend of innovativeness of an organization can be calculated by comparing activity for one time period to another. This is shown in FIG. 10, where the innovation metric is calculated from the sum of Architect and Innovator scores for the organization's inventors where each Architect and Innovator score is proportionately weighted by the number of patents and sequence of the inventor. The total scores are calculated for a first and a second time period. In this example, the first period is from 2010 to 2012, and the second period is from 2013 to 2015.

FIG. 10 shows a chart 1000 which plots a change in innovation metric 1010, where the change is the total score of the second period divided by the first period. The innovation metric 1020 is the total score for the second period.

This example compares private and public universities, showing, for example, university 1030b has a significant and increasing level of activity of innovative inventors, and that university 1030a has a relatively low and dropping level of innovation.

Example 13. Comparing the Distribution and "T-Value" of the Top Inventors for Several Organizations The "T-value" (Tv) was calculated for all inventors using their backward citations.

It was assumed that inventor sequence impacted the weighting of depth and breadth, i.e., if an inventor was the first listed on the patent, they got full count of the impact of the IPCs. It was assumed that the second inventor had, on average, a lessor contribution, and so would get half credit, and third, third credit, and so on. This weighted count was used to determine both breadth and depth.

Depth was calculated as the area under two curves, a first curve for depth, and the second curve for breadth. The depth curve was calculated by counting the IPCs at the first through fifth level cited for all of the inventor's patents. Each level was then sorted from the highest to the lowest count, with each count being labeled with increasing whole numbers starting with 1 (i).

The following equation was used to calculate depth:

$$X = i^A - 1$$

$$Y = count^B$$

Where count is the number of IPCs at number i. A was 0.25 and B was 0.5.

The following equation was used to calculate breadth:

$$X = i^A - 1$$

$$Y = count^B$$

Where A was 1.7 and B was 0.25.

The areas under the first and second curves representing depth and breadth were normalized and summed to create a "T-value" for each inventor.

Figure 11:
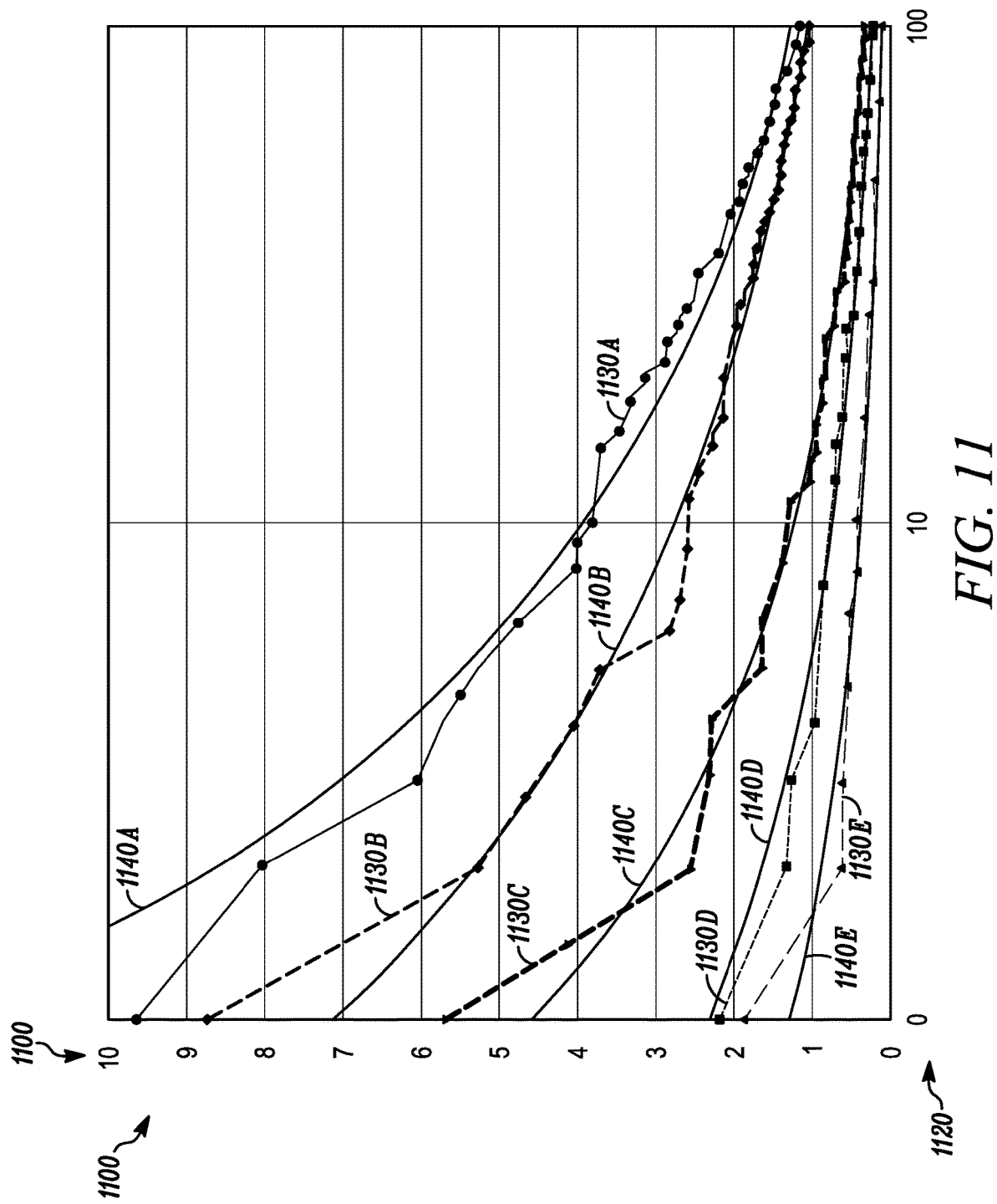
FIG. 11 is plot of a T-value (Tv) number (vertical axis) plotted against the inventor number (horizontal axis) for a plurality of organizations, according to an example embodiment.

The inventors were associated with the assignees, and the inventors were ranked for five different organizations that were in the same industry and sector. Organizations were selected with similar number of annual patent applications. Curve 1100 in FIG. 11 shows Tv 1110 plotted against inventor number 1120, where curves 1130a, b, c, d, and e are for the five different organizations, and curves 1140a, b, c, d, and e are the corresponding fits to the curves. A power-law curve was used for the fit, using the equation:

$$Y = A * X^k$$

Where the values for A and k are shown in Table 6.

This example shows that Tv follows a power-law distribution, and that the distribution is significantly different for the organizations.

Since the combination of depth and breadth is known to be important for inventors to solve problems, the curves indicate the relative innovativeness of different organizations.

TABLE 6

|  | A | k |
| --- | --- | --- |
| Organization 1140a | 12.3 | −0.49 |
| Organization 1140b | 7.07 | −0.41 |
| Organization 1140c | 4.57 | −0.56 |
| Organization 1140d | 2.32 | −0.48 |
| Organization 1140e | 1.3 | −0.5 |

Example 14. Forecasting Organic Growth of Organizations

Figure 12:
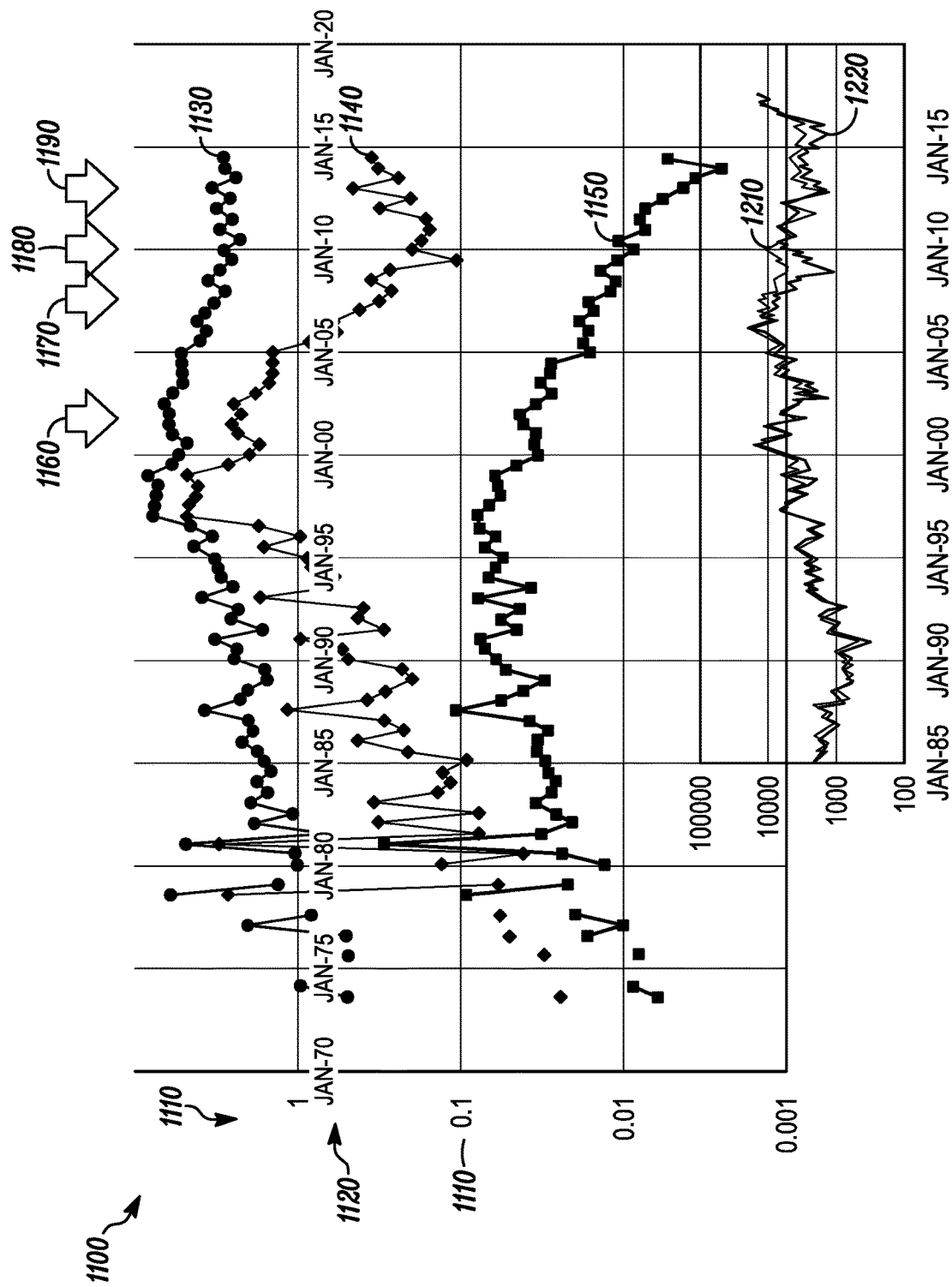
FIG. 12 is a plot of a normalized innovation score against the date. Normalized average Architect scores, Innovator scores, and Specialist scores are plotted against the organization's enterprise value and the organization's market cap, according to an example embodiment.
Figure 13A:
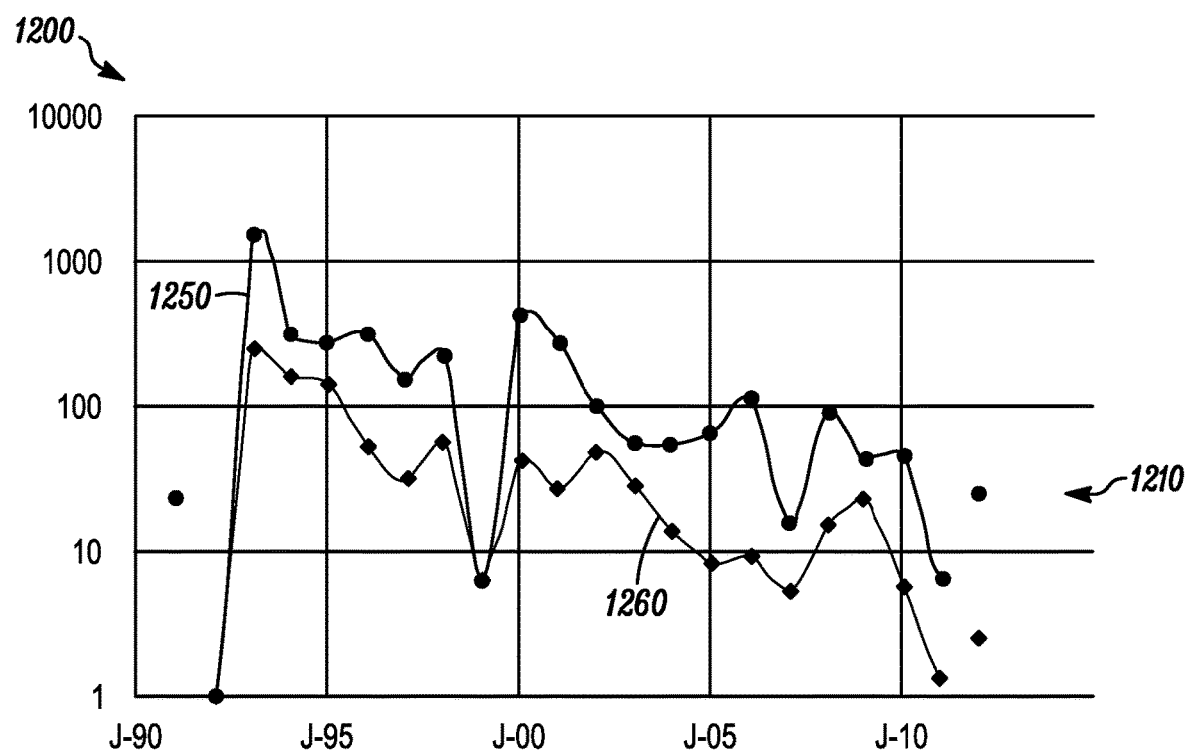
FIG. 13 is chart showing the number of forward citations for an inventor against the dates, according to an example embodiment. Charts for four inventors with different organizations are shown in FIG. 13.
Figure 13B:
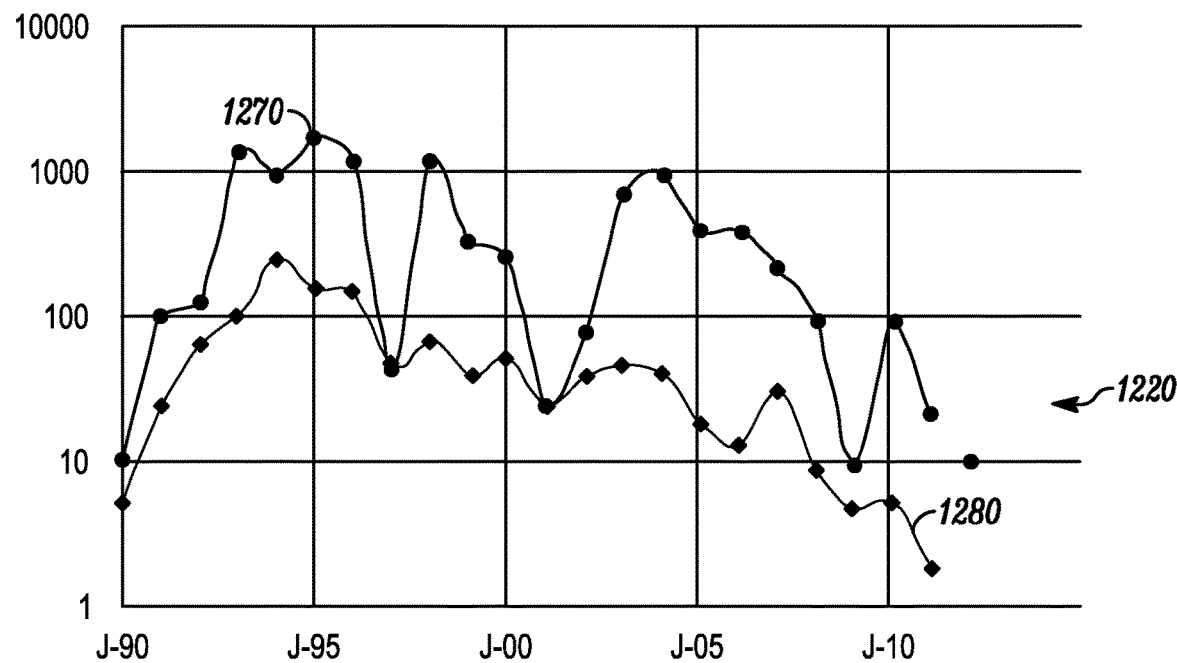
Figure 13C:
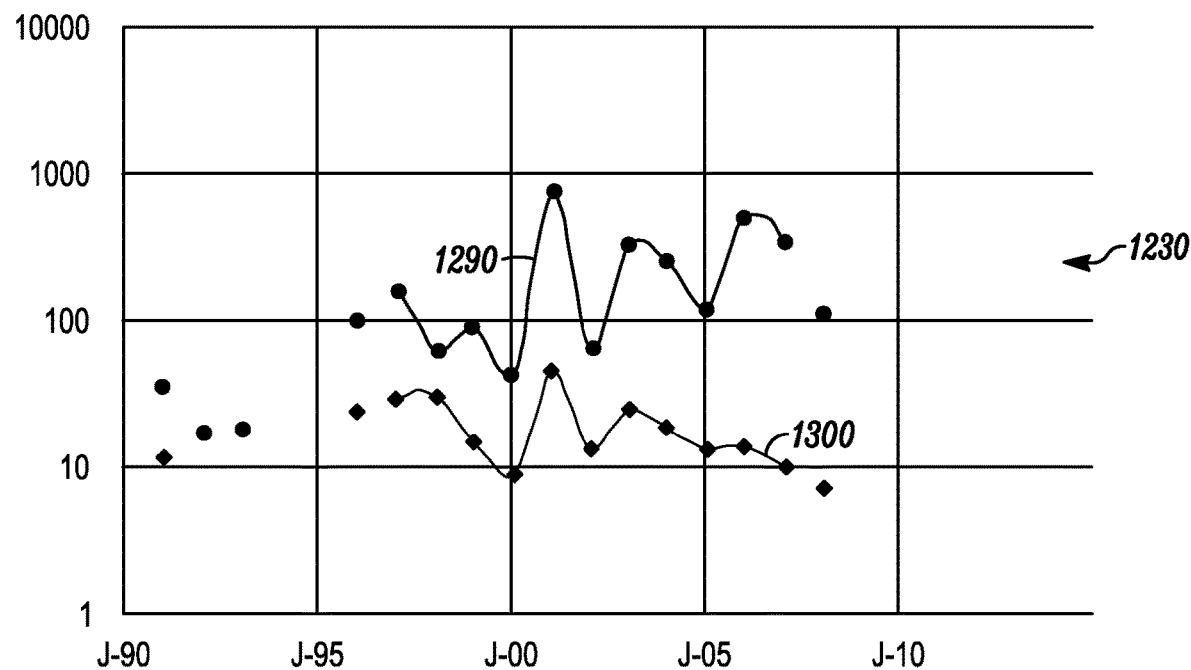
Figure 13D:
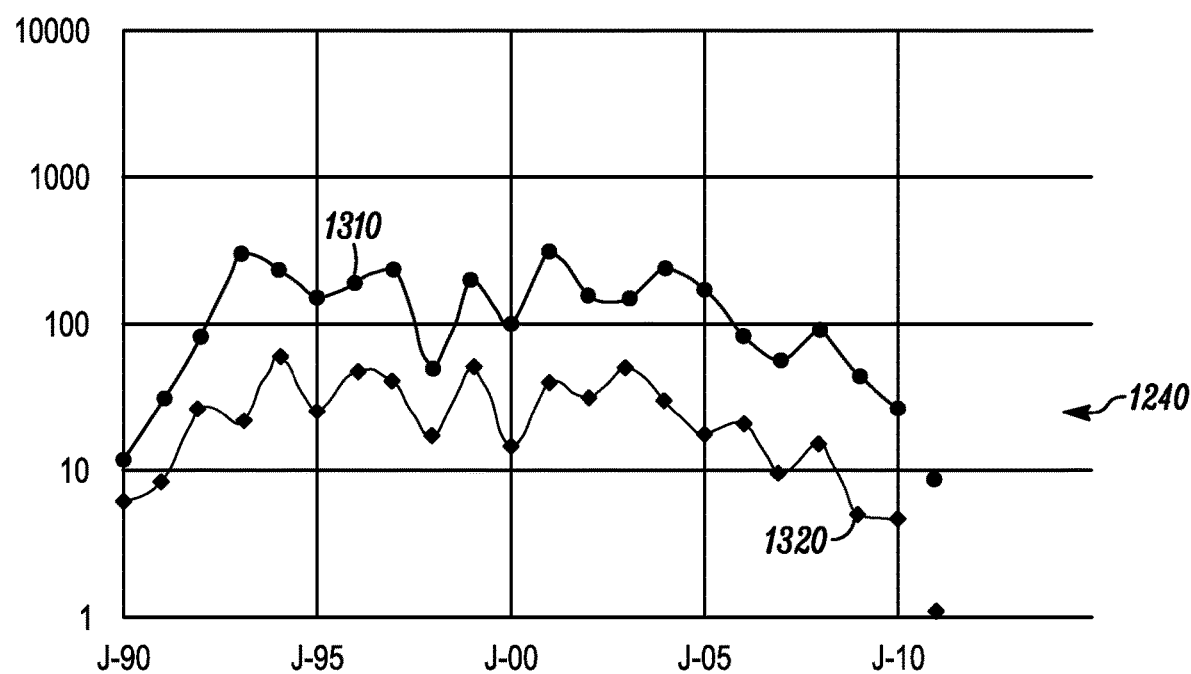

FIG. 12 shows a means for forecasting future value of an organization, where chart 1100 shows a normalized innovation score 1110 against the date 1120. Normalized average Architect scores 1130, Innovator scores 1140, and Specialist scores 1150 are plotted against the organization's enterprise value 1210 and the organization's market cap 1220. There are 4 changes in the chief executive officer (CEO) 1160, 1170, 1180, and 1190, where CEOs 1160 and 1170 correlated with substantial declines in the average scores for Specialists, Architects, and Innovators. The reduced average capability of the inventors may be caused by attrition and reduced engagement. CEOs 1180 and 1190 correlated with a stabilization of Architects, and a substantial increase in the average scores of Innovators. The increase in the average activity of Innovators led an increase in both market capitalization value and enterprise value for the organization.

The impact of individual inventors to an organization can be determined, in other words, the inventor's value can be measured. Therefore, changes in organizational value can be assessed by tracking employment of one or more individual inventors.

Example 15. Forecasting Inventor Contributions

Forward citations are a significant indicator to the degree that an inventor is advancing one or more fields. FIG. 13 shows the forward citations of the patents of four inventors from different companies and universities. The inventors were chosen because they each generated many patents over two decades or more, they were the most prolific inventors in their organization, and they started patenting their inventions at a similar date (ca. 1990). The graphs in FIG. 13, 1200, are for inventor 1210, 1220, 1230, and 1240. The vertical axes of the graphs are the number of forward citations, and the horizontal axes are the dates, in the month and year format (e.g. J-90 is Jan. 1, 1990).

The average and sum of forward citations are for patents with the earliest priority date within each date range. For example, the forward citations of patents with the earliest priority date between Jan. 1, 1990 and Dec. 31, 1990 are summed and averaged for data available at a particular date (here, using the Fall, 2016 Pat stat data), and the data is reflected on the curve. As a further example, inventor 1230's patents with an earliest priority date in 1990 had an average of about 10 forward citations in 1990, as measured with the Fall, 2016 Pat stat data.

For inventor 1210, the chart shows the sum of the number of forward citations for the inventor for each year in curve 1250, and the average number of forward citations for each year in curve 1260.

For inventor 1220, the chart shows the sum of the number of forward citations for the inventor for each year in curve 1270, and the average number of forward citations for each year in curve 1280.

For inventor 1230, the chart shows the sum of the number of forward citations for the inventor for each year in curve 1290, and the average number of forward citations for each year in curve 1300.

For inventor 1240, the chart shows the sum of the number of forward citations for the inventor for each year in curve 1310, and the average number of forward citations for each year in curve 1320.

All four inventors show a reduced number of forward citations in the later years, likely in large part due to forward citations are a lagging indicator. Inventors 1210 and 1220 show distinct declines followed by increases in their sum of forward citations. There is a smaller proportional change in the average number of forward citations. The sudden drop then increase in the sum of forward citations may represent epochs for the inventors when, for example, the inventor is changing fields of technology.

Each of the inventors retained significant impact as measured by the sum of forward citations for one or more decades. The sum of forward citations may be used to predict future impact. For example, knowing the sum of forward citations for patents filed in one five-year period can be used to forecast the impact of the inventor's patents for future periods of time. The forecast in inventor contribution may be done for individuals as well as for all or part of an organization's inventors.

Example 16. Forecasting Organizational Innovation Capacity

Example 15 shows that inventor contributions can be forecasted. The inventive capacity of an organization can be estimated by developing a forecast for individual or groups of inventors, and using publicly or privately held data to estimate the impact of changes in the combined contribution of individual inventors on the organization's innovation capacity. The changes include the inventor leaving the organization due to retirement or resignation, the inventor moving to a new organization and adding to innovation capacity, or a change in the role of the inventor, such as moving to a management role or changing technology fields.

By using sources of publicly or privately held data on the inventor, changes in the innovation capacity of an organization may be calculated with little or no lag, with, for example, daily updates.

Example 17. Forecasting the Innovation Capacity of New Organizations, or New Groups within Organizations The inventor data shown in FIG. 13 shows that at least the sampling of prolific inventors rapidly develop a certain level of innovation impact, and maintain this level of impact for many years. This means that the forward citation data, as well as other inventor data such as inventor depth, breadth, T-value, backward citation score, forward citation score, self-citation score, specialist score, architect score, innovator score, and their network metrics, may be used to forecast their contributions when moving to a new team, group, or organization. Furthermore, the efficacy of interaction of multiple inventors can be estimated by considering interactions of this data. For example, a team, group, or organization may be much more effective if there is a combination of areas of depth, and overlapping areas of breadth, than if the inventors are lacking areas of depth or breadth considered critical to what is needed to create high impact innovations.

Figure 14:
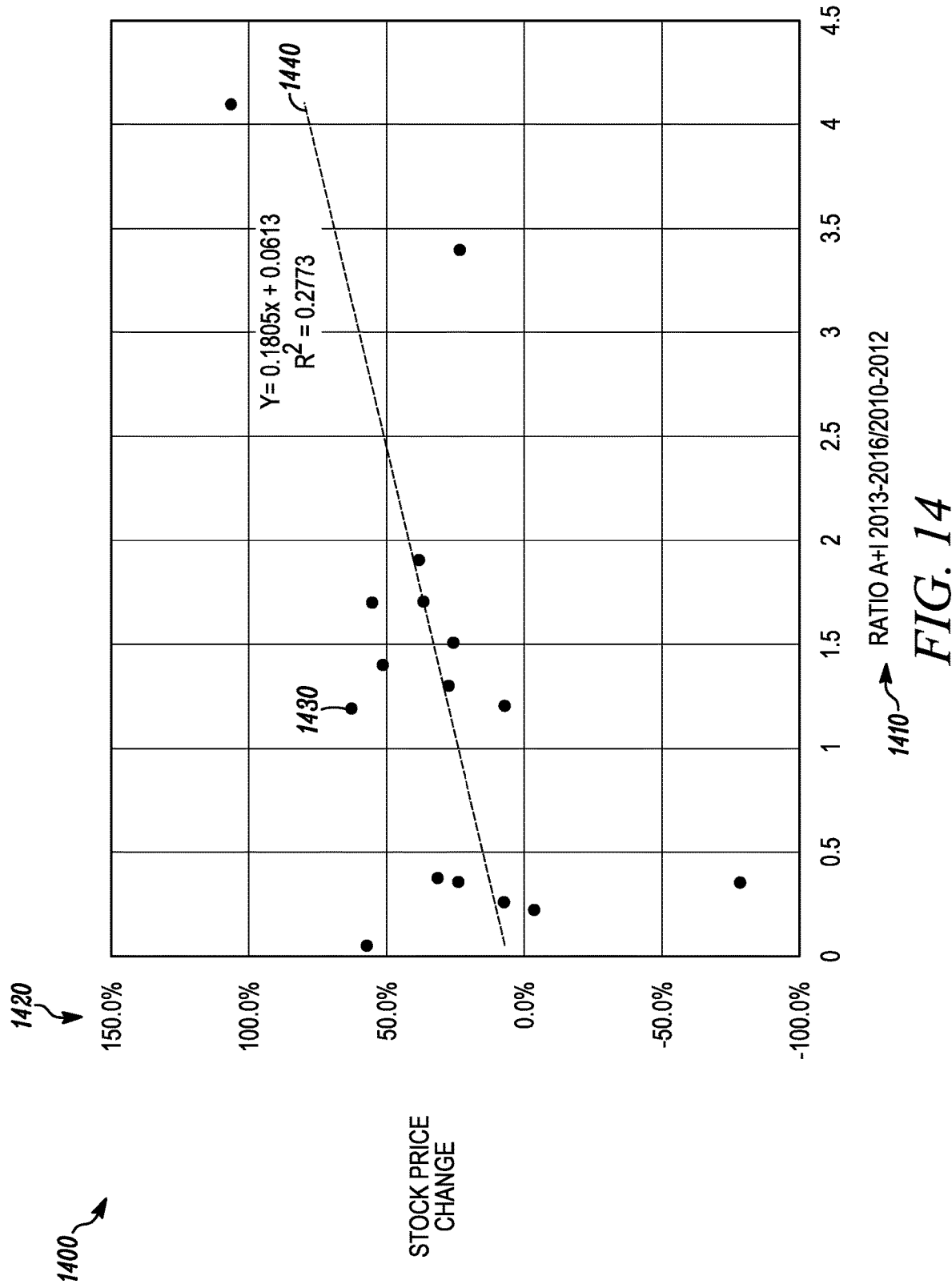
FIG. 14 is chart plotting the Architect-Innovator scores (horizontal axis) against the change in stock price (vertical axis) over a time frame, according to an example embodiment.

Example 18. Forecasting the Stock Price of Companies with A High Portion of Their Value Based on Intellectual Property FIG. 14 shows the relationship 1400 between the ratio of AI 1410 to the growth in stock price 1420 of a group of companies, where the companies are selected based on those where a substantial portion of the assets of each company is intellectual property. AI is calculated by the following equation:

$$AI = \frac{\left\{ F_I \sum_{m+1}^{M} \left( \sum_{n=1}^{N} \left( \frac{Is_n}{(\text{Inventor Order})^{kn}} \right) \right) + F_A \sum_{m+1}^{M} \left( \sum_{n=1}^{N} \left( \frac{As_n}{(\text{Inventor Order})^{kn}} \right) \right) \right\}}{\text{time period}} \qquad \text{Eq. 11}$$

Where AI is an aggregated score indicating the level of innovation within an organization during the time period. The description of the terms is the same as for Equations 9 and 10. $F_I$ is a scaling factors for innovator impact to an organization, and $F_A$ is a scaling factor for architect impact to an organization. Equation 11 may incorporate Specialist scores in a similar manner, with Specialist contributions being $F_S$. This will create an SAI score for the organization. The scores for $F_S$, $F_A$, and $F_I$ may be determined by studies of existing organizations, or may be determined by using machine learning approaches. A reasonable set of starting values for $F_S$, $F_A$, and $F_I$=1. The values of $F_S$, $F_A$, and $F_I$ can be adjusted to create the best fit between the aggregated score using Specialist, Architect, or Innovator scores, or combinations thereof (e.g AI and SAI scores) and organizational performance metrics. Suitable organizational performance metrics include stock price, operating income, operating margin, and market capitalization.

The analysis may include more complex response functions between changes in the innovation scores and changes in the financial metrics. For example, a change in organizational leadership may lead to a significant reduction in inventors with high SAI scores. That may initially reduce operating and investment costs for the organization, possibly initially increasing stock price. After a lag period though, the ability for the organization to grow and respond to competition and opportunities can be impaired, and stock price and other financial metrics can be adversely affected.

FIG. 14 charts 1400 the impact of a change in Architect-Innovator scores (AI) 1410 vs. the change in stock price 1420. Several companies in the same sector and industry are plotted, for example company 1430, on chart 1400. The stock price change was calculated as the ratio of the stock price as of Nov. 20, 2017 to the stock price as of Nov. 20, 2016. The change in AI scores were calculated from the ratio of the average sum of A and I scores from the time period from 2013 to 2016 to the average A and I scores from 2010 to 2012. A linear fit 1440 to the company data has a slope of 0.181 and an $r^2$ of 0.28.

Figure 15:
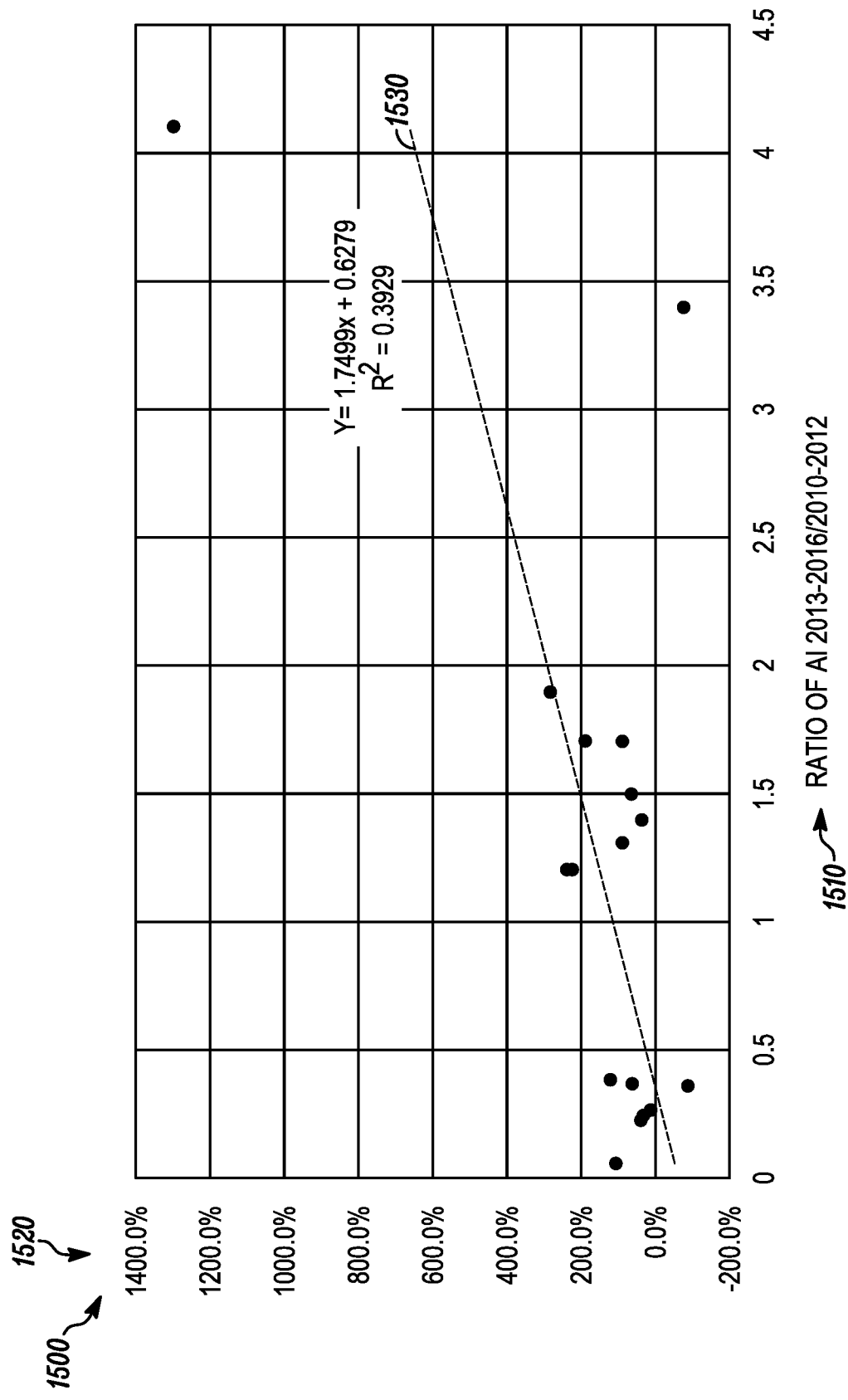
FIG. 15 is chart plotting the Architect-Innovator scores (horizontal axis) against the change in stock price (vertical axis) over another time frame, according to an example embodiment.

FIG. 15 charts 1500 the impact of a change in Architect-Innovator scores (AI) 1510 vs. the change in stock price 1520. The same companies shown in FIG. 14 are shown, but for the time period between Nov. 20, 2013 and Nov. 20, 2017. A linear fit 1440 to the company data has a slope of 1.75 and an $r^2$ of 0.393.

Figure 16:
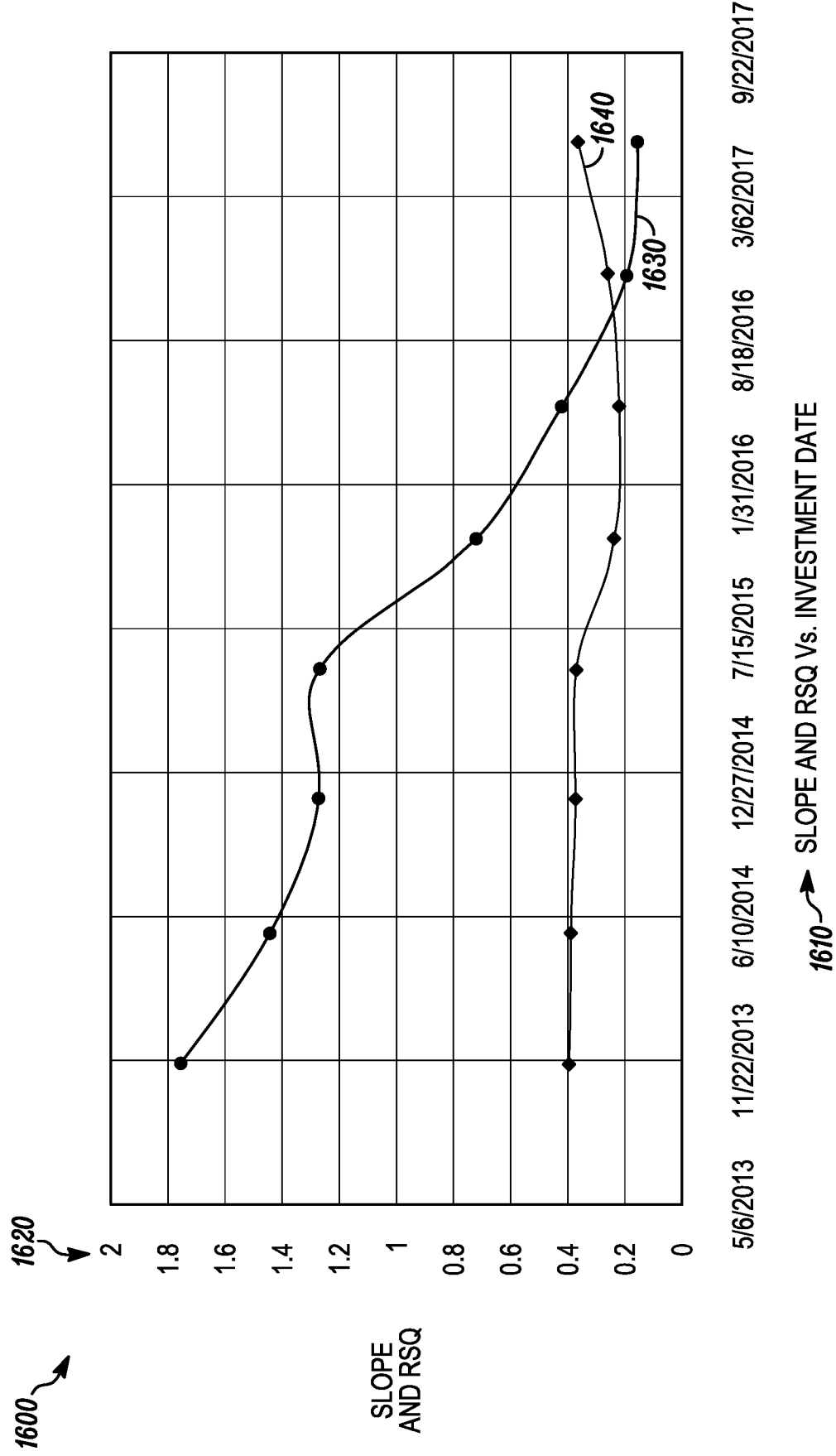
FIG. 16 is chart plotting the slope and $r^2$ for a linear fit to the chart of FIG. 14 (vertical axis) against the investment date (vertical axis), according to an example embodiment.

FIG. 16 charts 1600 the slope and $r^2$ for linear fit vs. a starting date to the companies shown in FIG. 14. The end of the time period is Nov. 20, 2017.

FIGS. 15 and 16 use beginning dates for predicting stock price change that precede the last date used to calculate the change in AI scores (2016). FIG. 12 shows that trends in changes in S, A, and I scores can be seen in periods as short as 6 months from organizational changes, and the effects on patent data can be seen about 18 months after that. By adding employment data, predicting changes in AI and SAI can be even faster. For example, publicly available data can be accessed daily for changes in employment of inventors that have a large contribution to Specialist, Architect, and Innovator (SAI) scores, and those changes can be used to calculate the impact on the organization.

The processes and systems shown below can be embodied within hardware, including one or more integrated circuits or an Application Specific Integrated Circuit (ASIC), or a combination thereof. The processor may also have GPUs. The order of the processing blocks should not be considered limiting. Rather, some of the processing blocks may executed in different configurations. Execution orders shown in FIG. 17 may be unidirectional or bidirectional between the inventor database, the application programming interface, and various queries.

Figure 17:
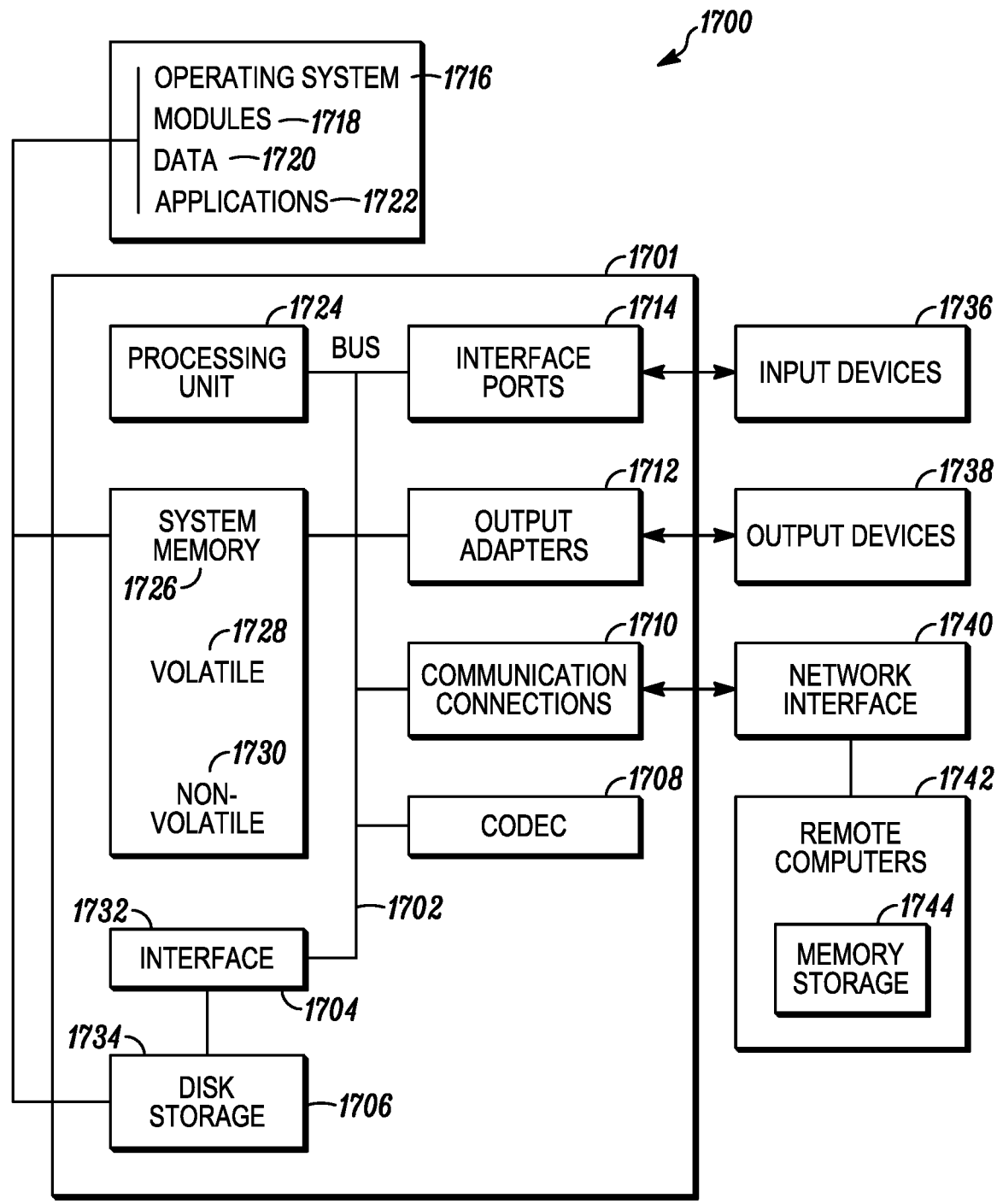
FIG. 17 is a schematic view of a computer system that can be operated in accordance with the n example embodiments discussed herein.

FIG. 17 shows a suitable environment 1700 for implementing various aspects of the claimed subject matter includes a computer 1701. The computer 1701 includes a processing unit 1724, system memory 1726 which may include non-volatile memory 1730 and volatile memory 1728 and a system bus 1702. The system bus 1702 connects system components including but not limited to the system memory 1726, the processing unit 1724, a system bus 1702, and a codec 1708. The system bus connects system memory 1726 to the processing unit 1724. The system bus 1702 can be any type of available bus including ISA, EISA, MSA, IDE, VESA, PCI, VLB, card bus, and USB, and other suitable bus architectures. The system bus may be combinations of different types of buses.

The disk storage 1706 may be magnetic storage, optical storage, or solid-state storage, or the like. The computer 1701 can communicate to external network interface 1740 through communication connections 1710 to connect to remote computers 1742 with associated memory storage 1744. The computer can also communicate to input devices 1736 and output devices 1738. The computer 1701 can be controlled by a combination of an operating system 1716, modules 1718, data 1720, and application software 1722.

Figure 18:
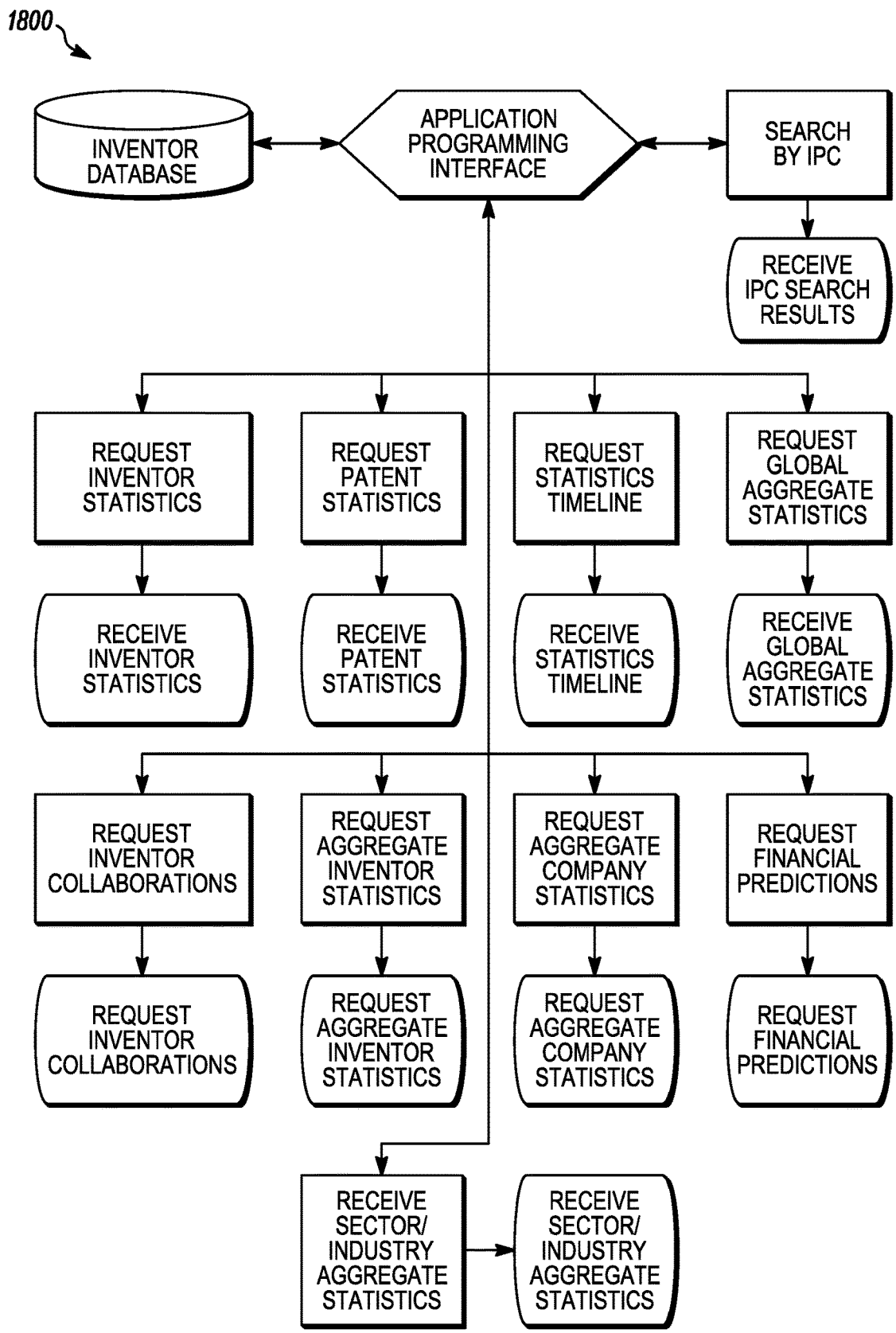
FIG. 18 is a diagram showing the commands between an inventor and at least an application user interface, and different queries, according to an example embodiment.

FIG. 18 shows the commands between the inventor database, the application programming interface, and different queries. The queries may be unidirectional or bidirectional. Where bidirectional queries may be used to modify the inventor database.

FIG. 18 is a diagram showing the commands between an inventor and at least an application user interface, and different queries, according to an example embodiment.

Figure 19:
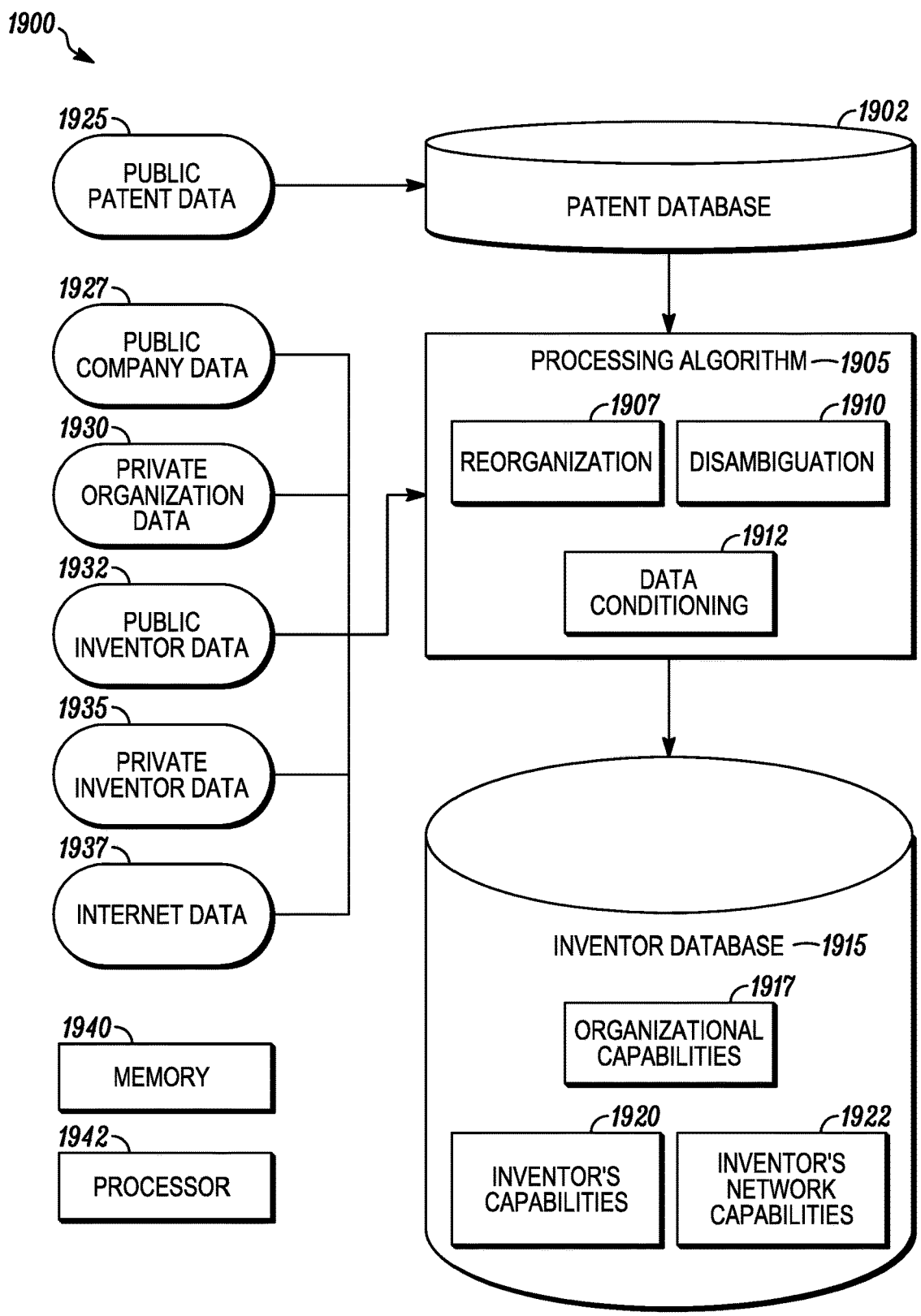
FIG. 19 is a schematic of a computer system that includes memory and a processor, according to an example embodiment. The computing system shown interacts and uses data from a number of public and private databases including and internet data.

FIG. 19 is a schematic of a computer system that includes memory and a processor, according to an example embodiment. The computing system shown interacts and uses data from a number of public and private databases including and internet data.

Figure 20:
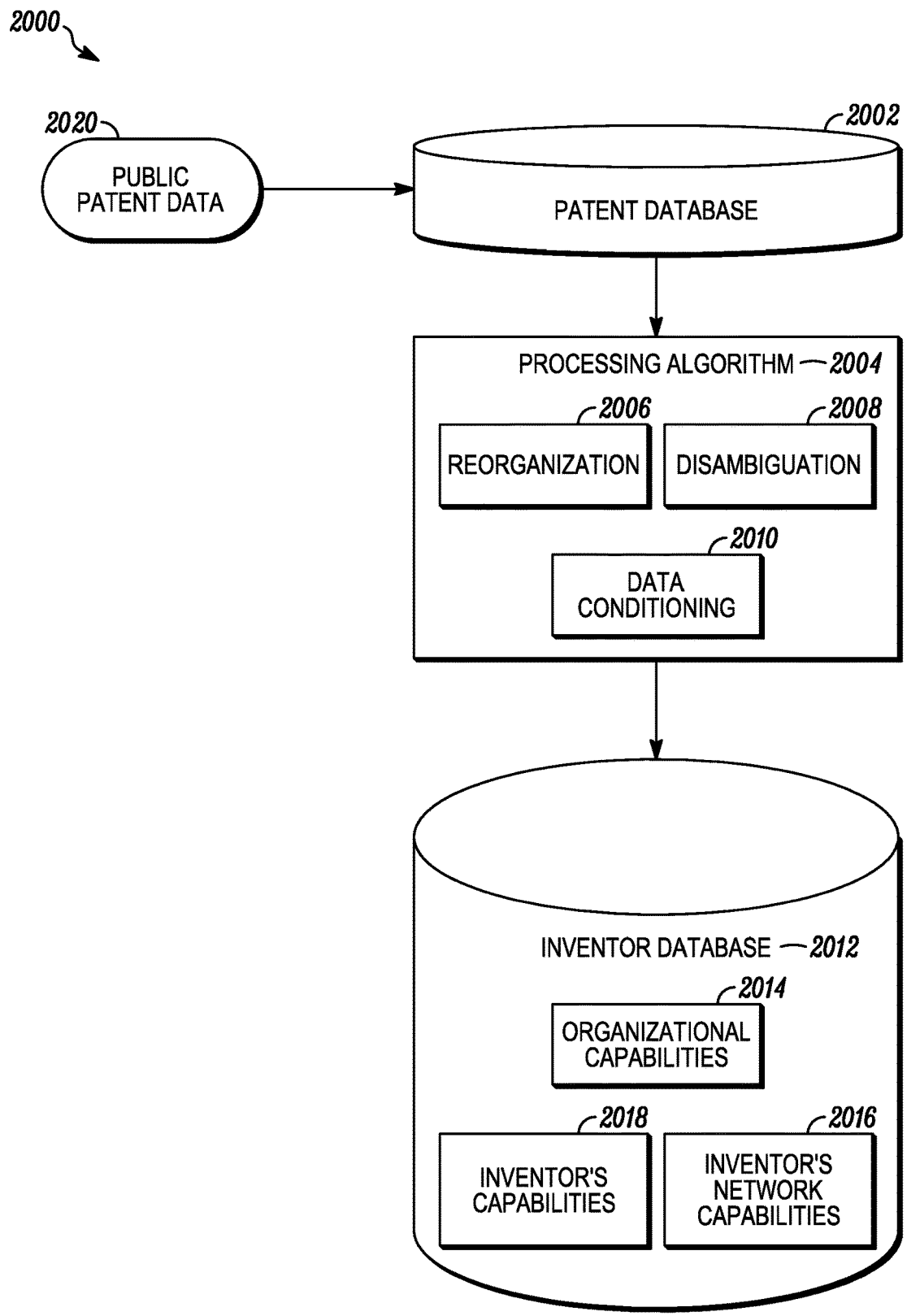
FIG. 20 is a schematic of a set of databases that are operated on by a processing system that executes an instruction set to reorganize, disambiguate and condition data received from one or more databases, according to an example embodiment.

FIG. 20 is a schematic of a set of databases that are operated on by a processing system that executes an instruction set to reorganize, disambiguate and condition data received from one or more databases, according to an example embodiment.

Figure 21:
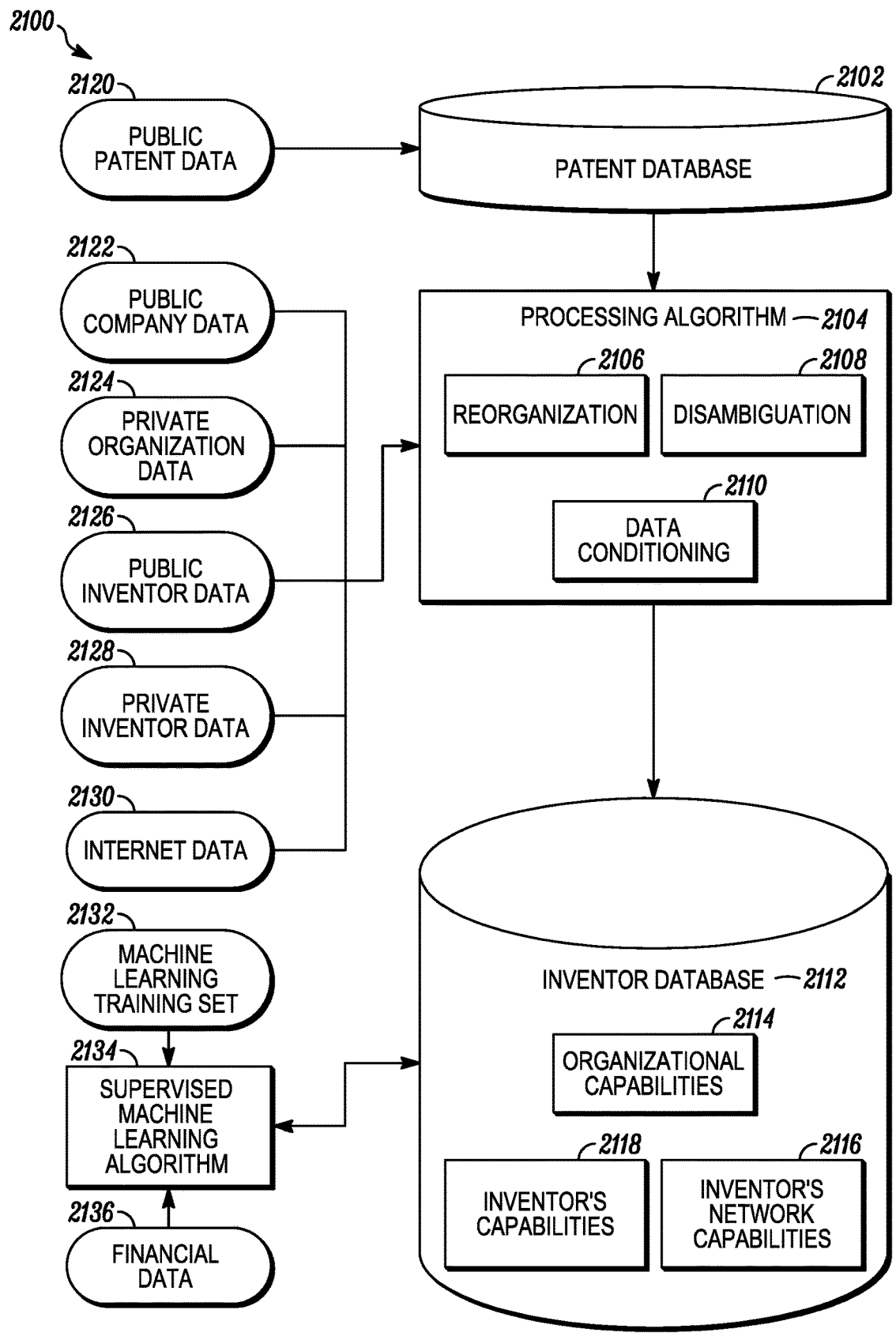
FIG. 21 is a schematic of a set of databases that are operated on by a processing system that executes an instruction set to reorganize, disambiguate and condition data received from one or more databases, and further includes financial data and a machine learning training set and subsystem, according to an example embodiment.

FIG. 21 is a schematic of a set of databases that are operated on by a processing system that executes an instruction set to reorganize, disambiguate and condition data received from one or more databases, and further includes financial data and a machine learning training set and subsystem, according to an example embodiment.

Figure 22:
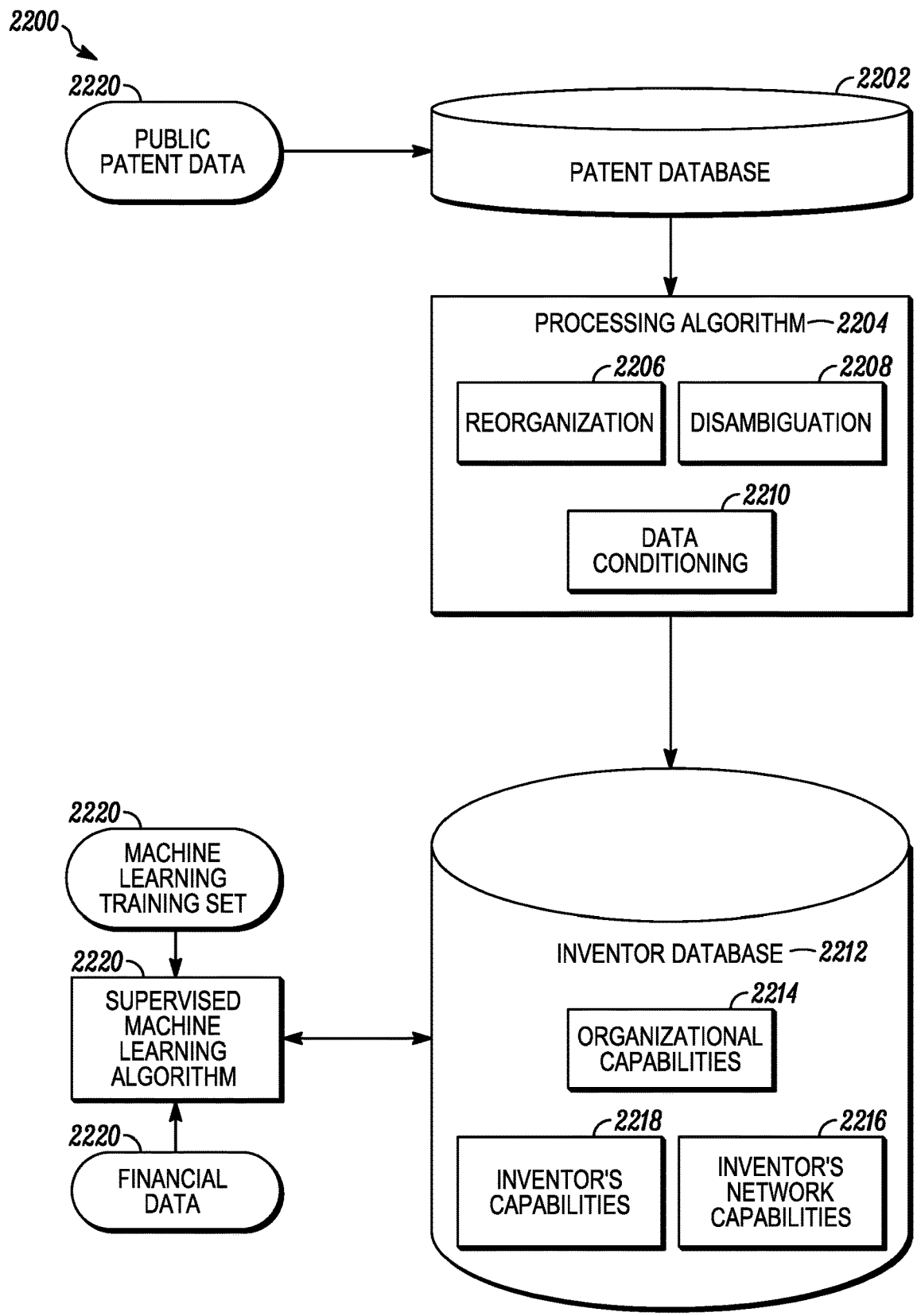
FIG. 22 is a schematic of a set of databases that are operated on by a processing system that executes an instruction set to reorganize, disambiguate and condition data received from one or more databases, and further includes financial data and a supervised machine learning training set and subsystem, according to an example embodiment.

FIG. 22 is a schematic of a set of databases that are operated on by a processing system that executes an instruction set to reorganize, disambiguate and condition data received from one or more databases, and further includes financial data and a supervised machine learning training set and subsystem, according to an example embodiment.

Figure 23:
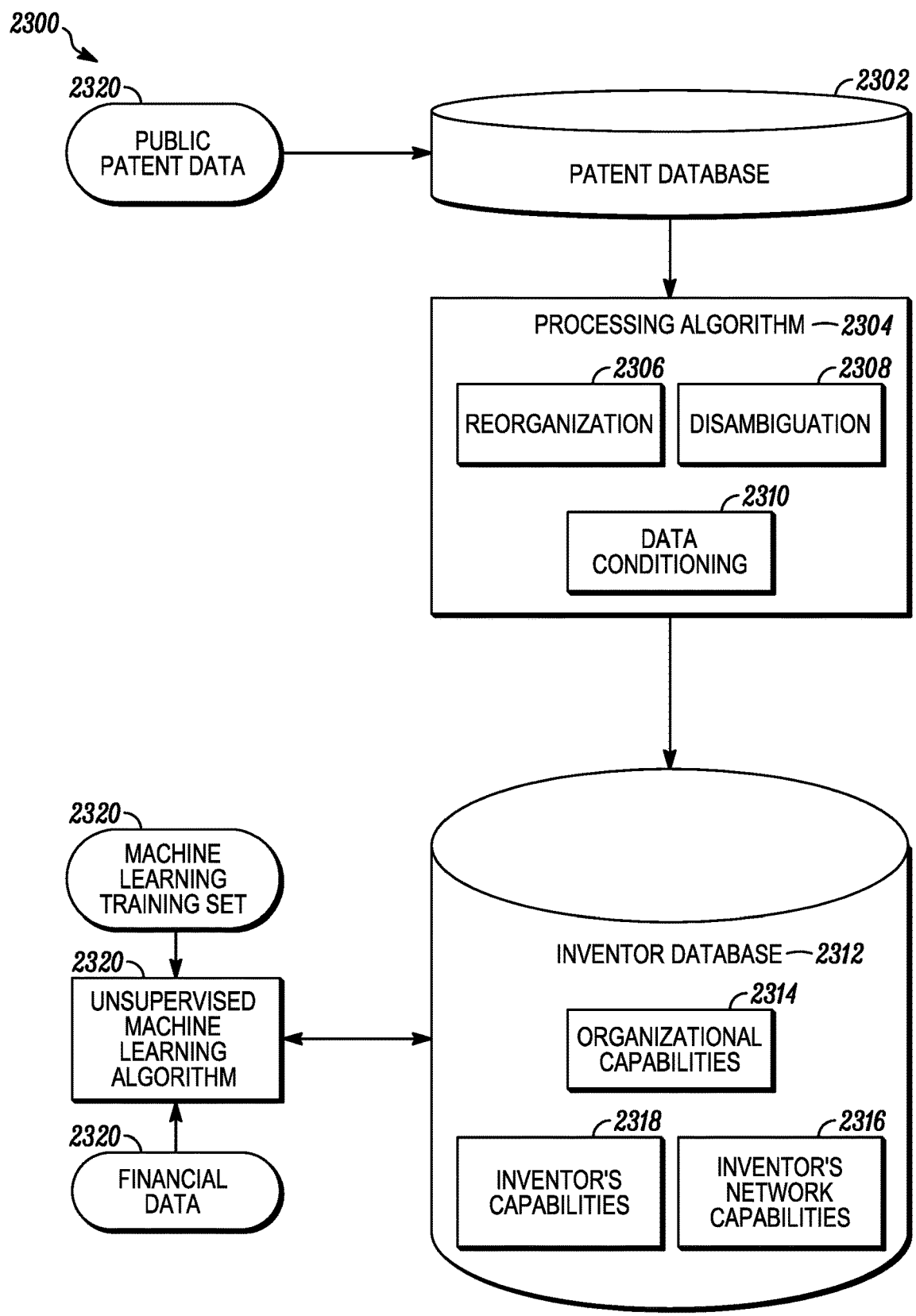
FIG. 23 is a schematic of a set of databases that are operated on by a processing system that executes an instruction set to reorganize, disambiguate and condition data received from one or more databases, and further includes financial data and an unsupervised machine learning training set and subsystem, according to an example embodiment.

FIG. 23 is a schematic of a set of databases that are operated on by a processing system that executes an instruction set to reorganize, disambiguate and condition data received from one or more databases, and further includes financial data and an unsupervised machine learning training set and subsystem, according to an example embodiment.

Figure 24:
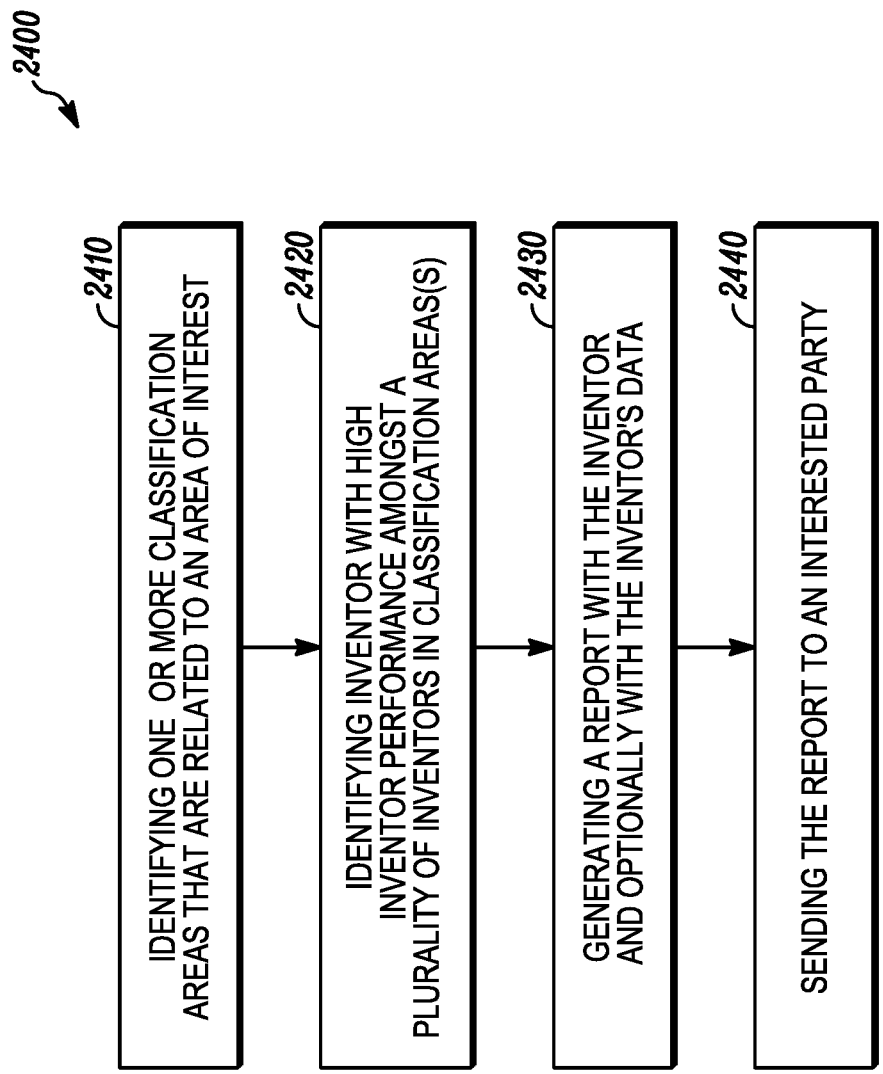
FIG. 24 is a flow diagram of a method of the invention, according to an example embodiment.

FIG. 24 is a flow diagram of a method of the invention, according to an example embodiment. It should be noted that the methods set forth herein are based on classification of invention information. It should be pointed out that similar methods can be utilized using other metrics associated with inventors and inventing. The method includes identifying one or more classification areas that are related to and area of interest 2410. The method 2400 also includes identifying an invention with high inventor performance amounts to a plurality of invention in classification areas 2420. Reports are generated 2430 and the report or reports are sent to interested parties 2440.

Figure 25:
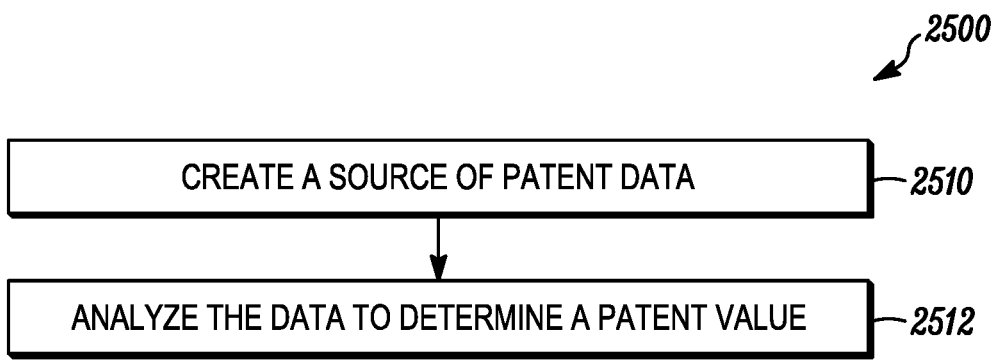
FIG. 25 is a flow chart of a method for determining patent value, according to an example embodiment.

FIG. 25 is a flow chart of a method 2500 for determining patent value, according to an example embodiment. The method includes create a source of patent data 2510. This can include public patent data and private patent data. Patent Offices around the world include patent data. Most patent offices classify the patents so related patents can be found. In the United States, for many years, had a patent classification system and also kept a manual for classifying patents. Internationally, there is also a classification system used by many countries. Each patent generally has a general classification and includes other classes as well. It can be thought of as a primary classification and a secondary classification. Many indicate that these classification systems have levels. This can be one source of patent data. It should be understood that others are also available. Once the source of patent data is determined, the data is analyzed to determine a patent value 2512.

Figure 26:
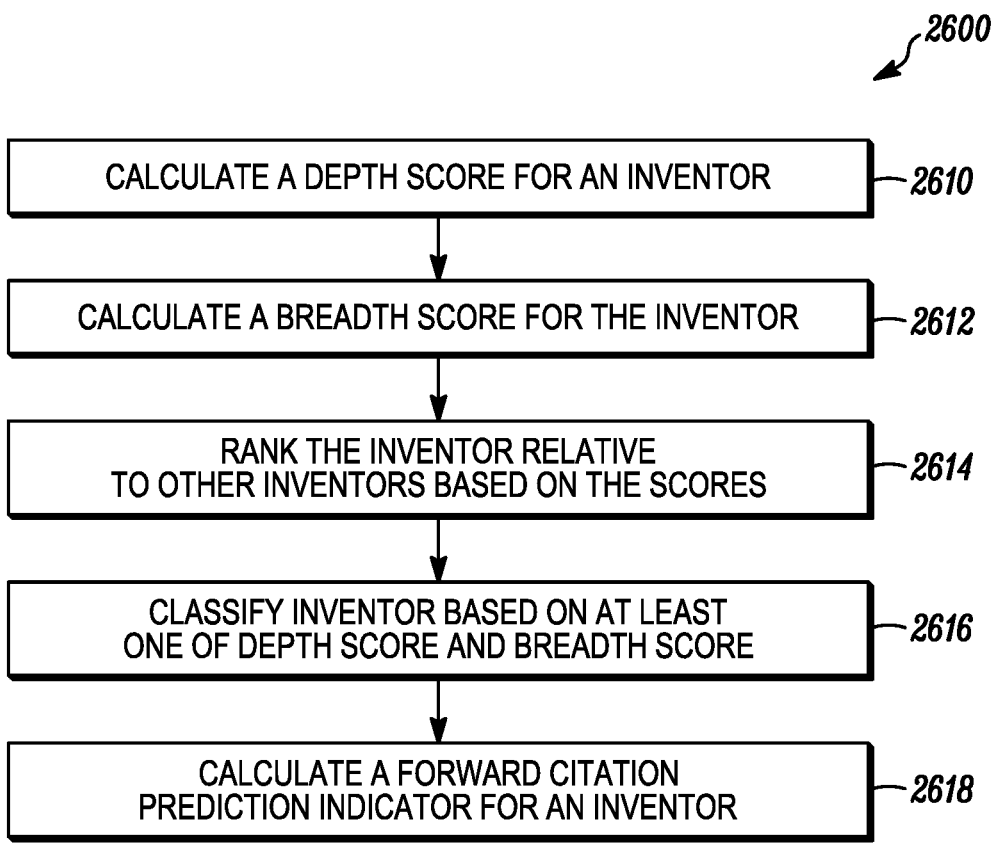
FIG. 26 is a flow chart of a method for ranking and identifying or classifying inventors, according to an example embodiment.

FIG. 26 is a flow chart of a method 2600 for ranking and identifying or classifying inventors, according to an example embodiment. The method 2600 includes calculating a depth score for an inventor 2610, and calculating a breadth score for the inventor 2612. Using these scores, the inventor is ranked relative to other inventors based on the scores 2614. The inventor is also classified or identified based on at least one of depth score and breadth score 2616. These scores can also be used to calculate a forward citation prediction indicator for an inventor 2618. It should be pointed out that an inventor can identify in a plurality of areas.

Figure 27:
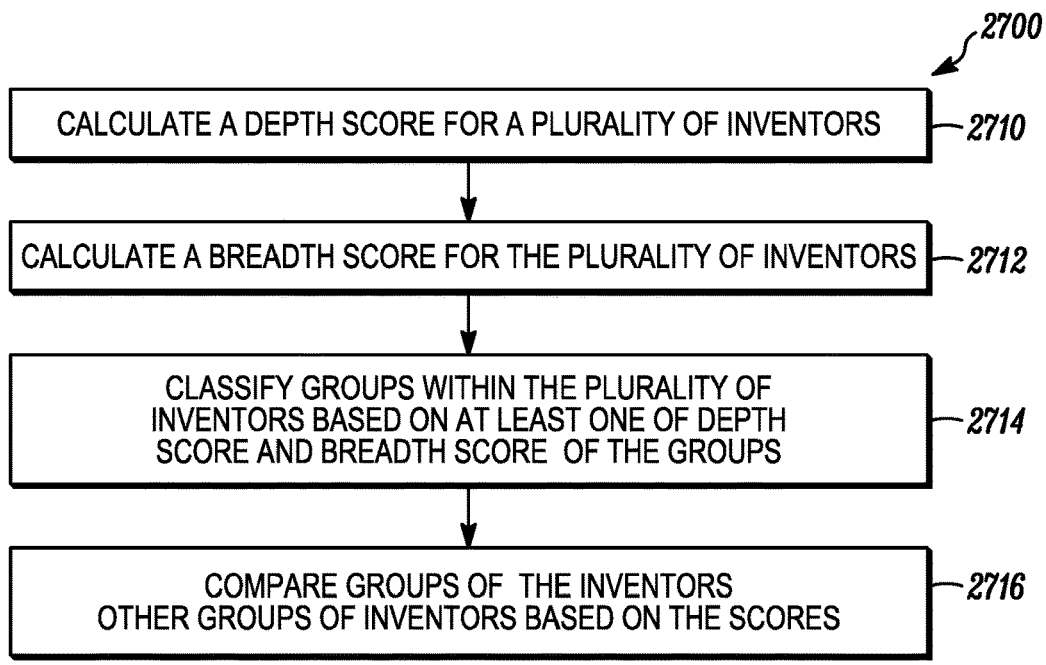
FIG. 27 is a flow chart of a method for comparing groups of inventors, according to an example embodiment.

FIG. 27 is a flow chart of a method 2700 for comparing groups of inventors, according to an example embodiment. The method includes calculating a depth score for a plurality of inventors 2710, and calculating a breadth score for the plurality of inventors 2712. The groups are classified or identified within the plurality of inventors based on at least one of depth score and breadth score of the groups 2714. It should be noted that in one embodiment, inventors can be classified or identified in a single group. In other embodiments, an inventor can be identified as belonging to more than one group. The method 2700 also includes comparing groups of the inventors other groups of inventors based on the scores 2716.

Figure 28:
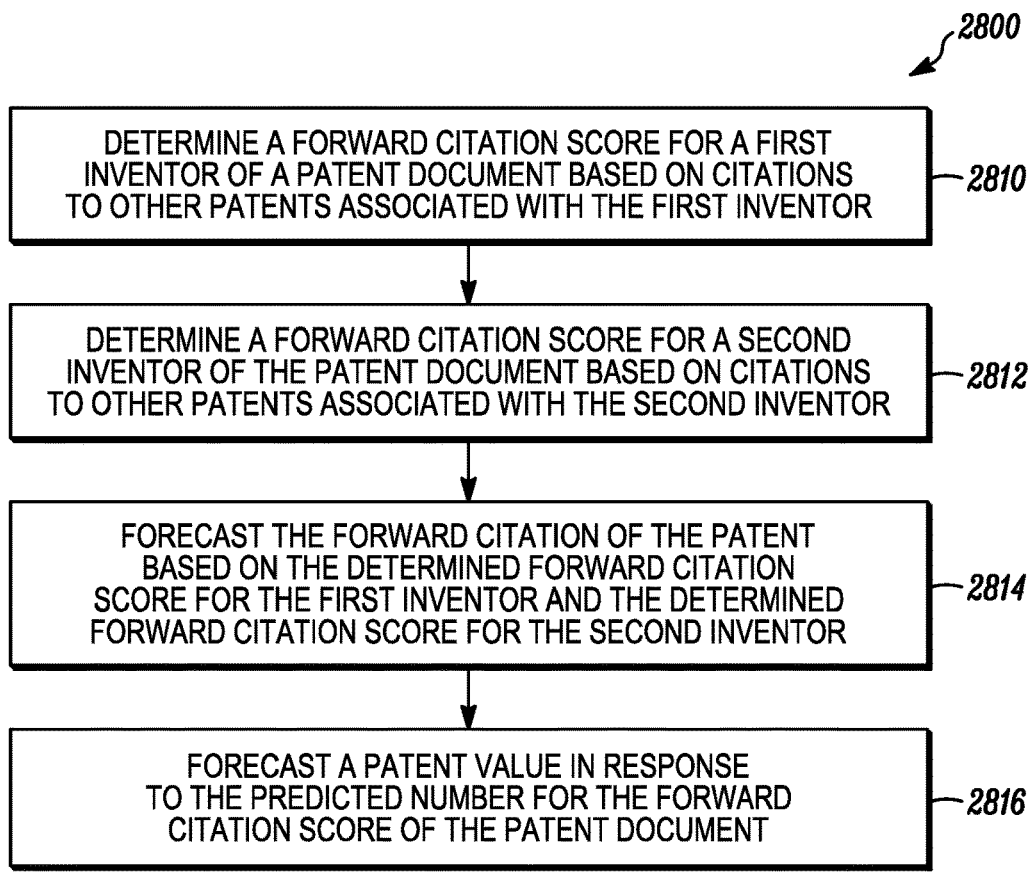
FIG. 28 is a flow chart of a method for predicting forward citation of a patent document, according to an example embodiment.

FIG. 28 is a flow chart of a method 2800 for predicting forward citation of a patent document, according to an example embodiment. The method 2600 includes determining a forward citation score for a first inventor of a patent document based on citations to other patents associated with the first inventor 2810, and determining a forward citation score for a second inventor of the patent document based on citations to other patents associated with the second inventor 2812. The method 2800 also includes forecasting the forward citation of the patent based on the determined forward citation score for the first inventor and the determined forward citation score for the second inventor 2814. A patent value is forecast in response to the predicted number for the forward citation score of the patent document 2816.

Figure 29:
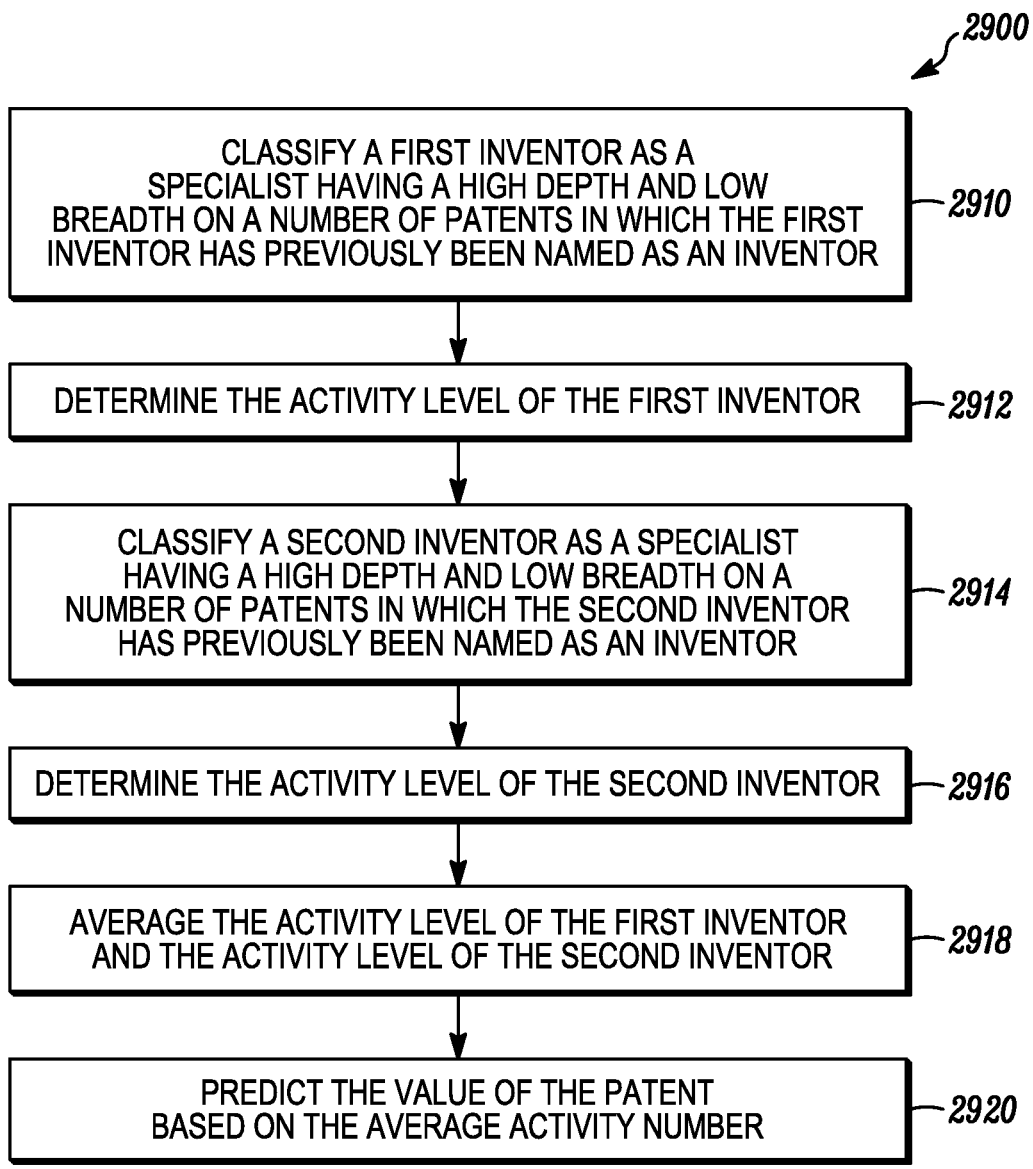
FIG. 29 is a flow chart of a method for predicting forward citation of a patent document, according to an example embodiment.

FIG. 29 is a flow chart of a method 2900 for predicting forward citation of a patent document, according to an example embodiment. The method 2900 includes classifying or identifying a first inventor as a specialist having a high depth and low breadth on a number of patents in which the first inventor has previously been named as an inventor 2910. The method 2900 also includes determining the activity level of the first inventor 2912. A second inventor is classified or identified as a specialist having a high depth and low breadth on a number of patents in which the second inventor has previously been named as an inventor 2914. The activity level of the second inventor is also determined 2916. The activity level of the first inventor and the activity level of the second inventor are averaged 2918. The method also includes predicting the value of the patent based on the average activity number 2920.

Figure 30:
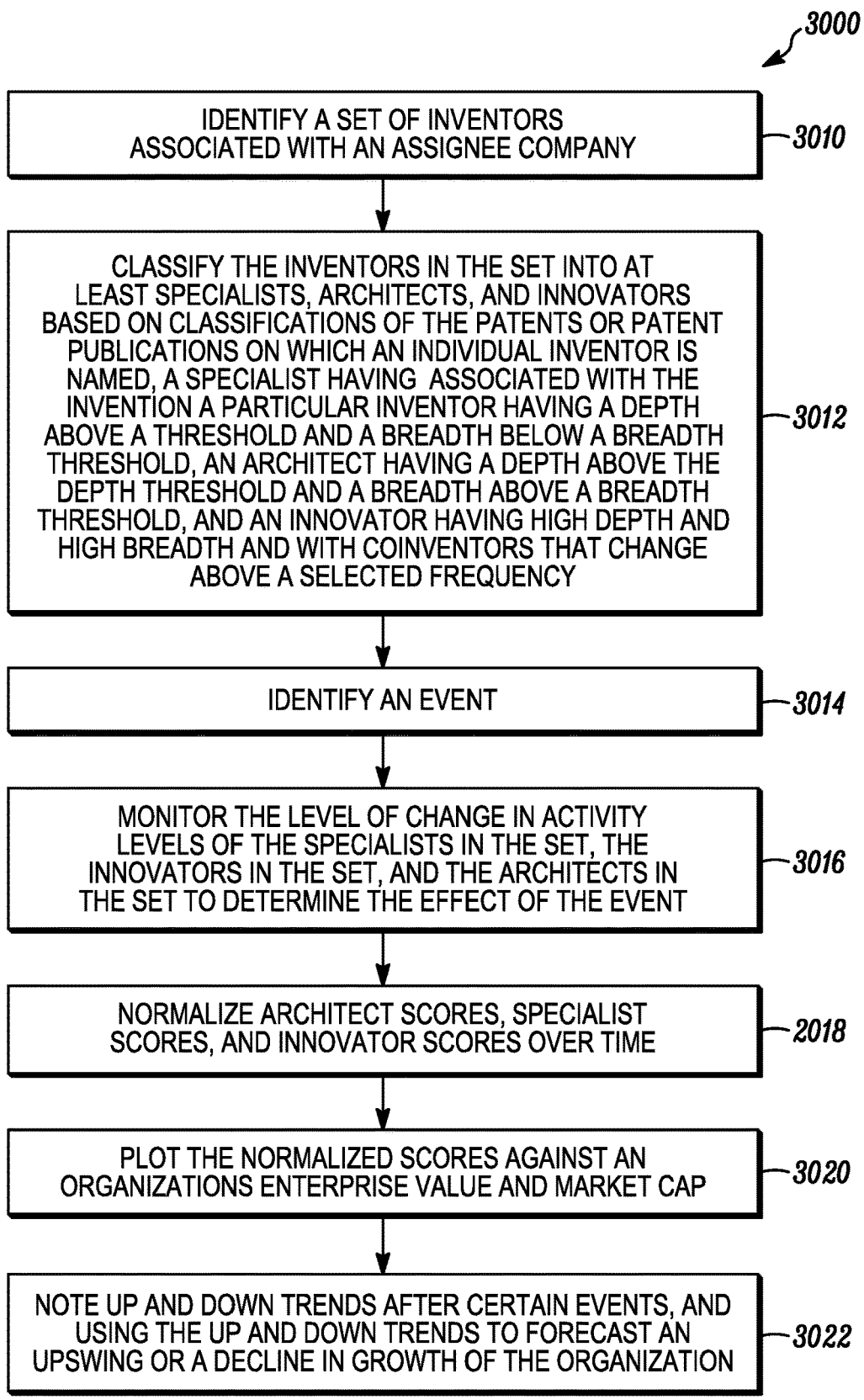
FIG. 30 is a flow chart of a method, according to an example embodiment.

FIG. 30 is a flow chart of a method 3000 for predicting an upswing or a decline in growth of the organization, according to an example embodiment. The method 3000 includes identifying a set of inventors associated with an assignee company 3010. The inventors in the set are classified or identified as specialists, architects, and innovators based on classifications of the patents or patent publications on which an individual inventor is named, a specialist having associated with the invention a particular inventor having a depth above a threshold and a breadth below a breadth threshold, an architect having a depth above the depth threshold and a breadth above a breadth threshold, and an innovator having high depth and high breadth and with coinventors that change above a selected frequency 3012. An event is identified 3014. The level of change in activity levels of the specialists in the set, the innovators in the set, and the architects in the set is monitored to determine the effect of the event 3016. In some embodiments, the architect scores, specialist scores, and innovator scores are normalized over time 3018. The normalized scores are plotted against an organizations enterprise value and market cap 3020. Up and down trends are noted after certain events. The up and down trends are used to forecast an upswing or a decline in growth of the organization 3022.

Figure 31:
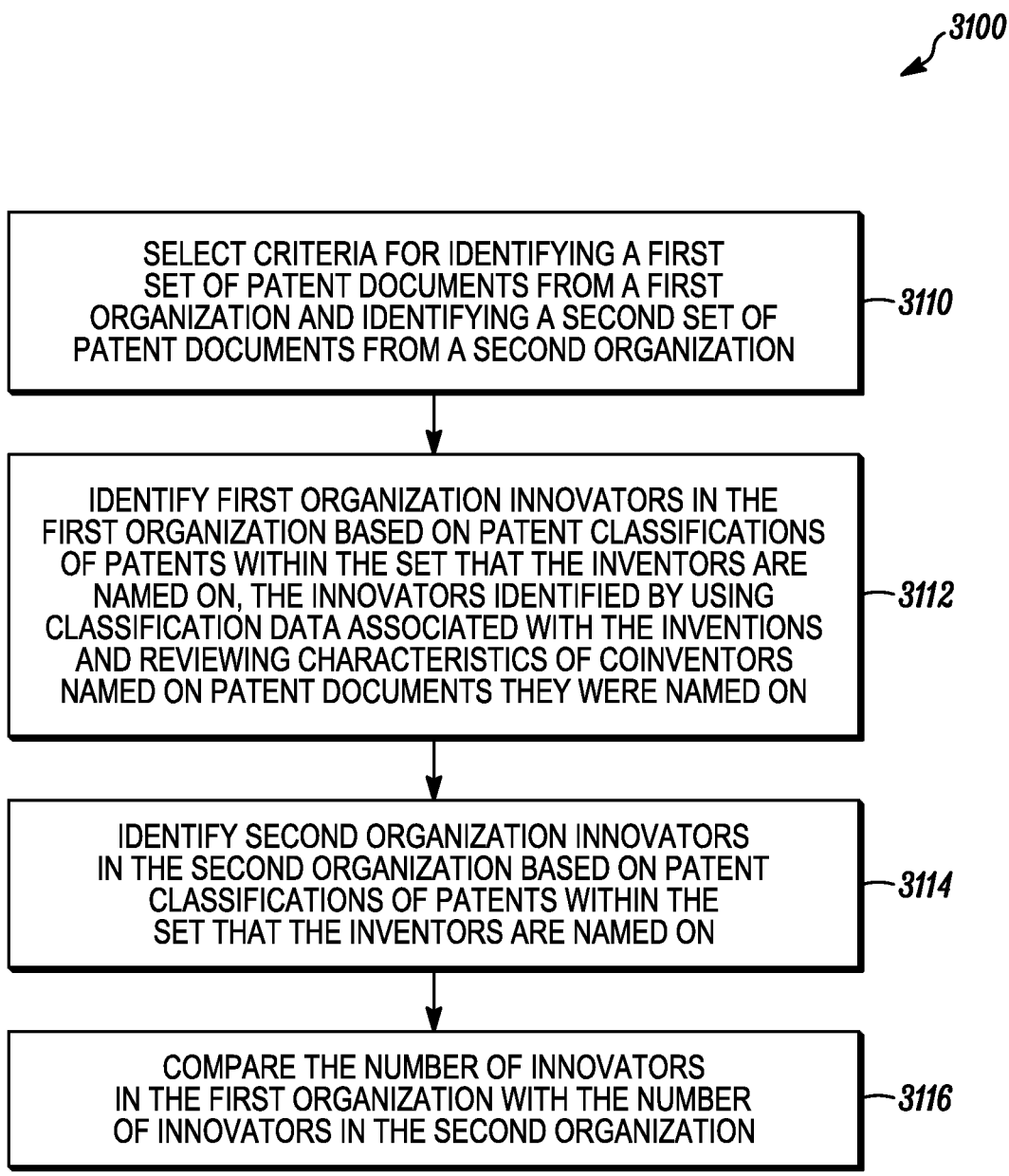
FIG. 31 is a flow chart of another method, according to an example embodiment.

FIG. 31 is a flow chart of a method 3100 for predicting an upswing or a decline in growth of the organization, according to an example embodiment. The method 3100 includes selecting criteria for identifying a first set of patent documents from a first organization and identifying a second set of patent documents from a second organization 3110. Method 3100 also includes identifying first organization innovators in the first organization based on patent classifications of patents within the set that the inventors are named on, the innovators identified by using classification data associated with the inventions and reviewing characteristics of coinventors named on patent documents they were named on 3112. Method 3100 also includes identifying second organization innovators in the second organization based on patent classifications of patents within the set that the inventors are named on 3114. The number of innovators in the first organization is compared with the number of innovators in the second organization 3116. This can include comparing the scores or average scores of innovation of the two organizations. It should be noted that inventors in these groups can be classified or identified as belonging to more than one group. In some embodiments, individual inventors may be constrained to a single group. It should be noted that this can be done on a specific technology area so that innovation in one technology area can be compared between organizations.

Figure 32:
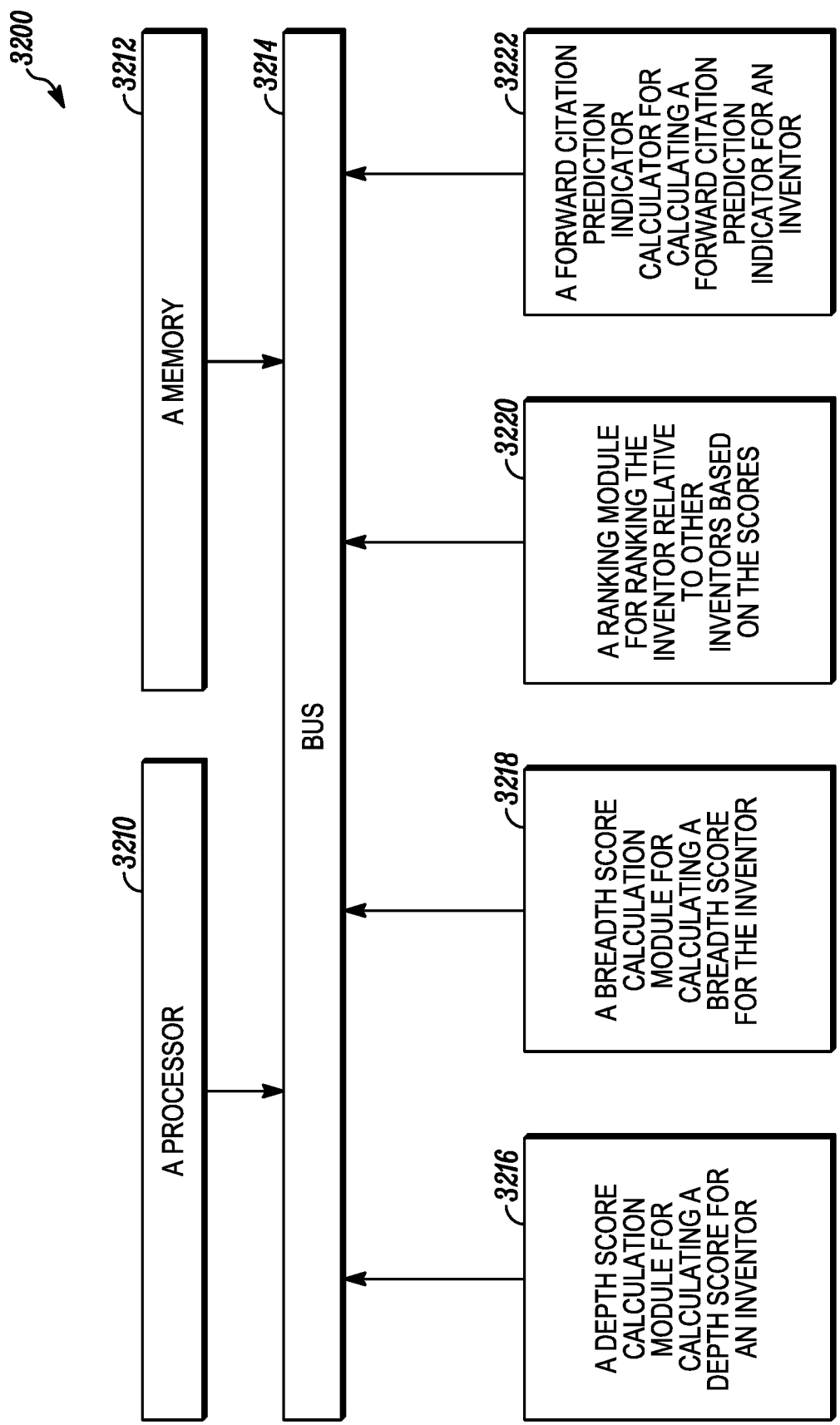
FIG. 32 is a computer system for predicting forward citations for an inventor, according to an example embodiment.

FIG. 32 is a computer system 3200 for predicting forward citations for an inventor, according to an example embodiment. The computer system includes a processor 3210, and a memory 3212 attached or communicatively coupled to a bus 3214. A number of modules are also attached to the bus 3214. The modules can be a hardware, software, or a combination of software and hardware. They can be stand alone or can share memory 3212 or another source of memory. They can have stand alone processors or can share processing with the processor 3210. The modules include a depth score calculation module for calculating a depth score for an inventor 3216, a breadth score calculation module for calculating a breadth score for the inventor 3218, a ranking module for ranking the inventor relative to other inventors based on the scores 3220, and a forward citation prediction indicator calculator for calculating a forward citation prediction indicator for an inventor 3222.

Figure 33:
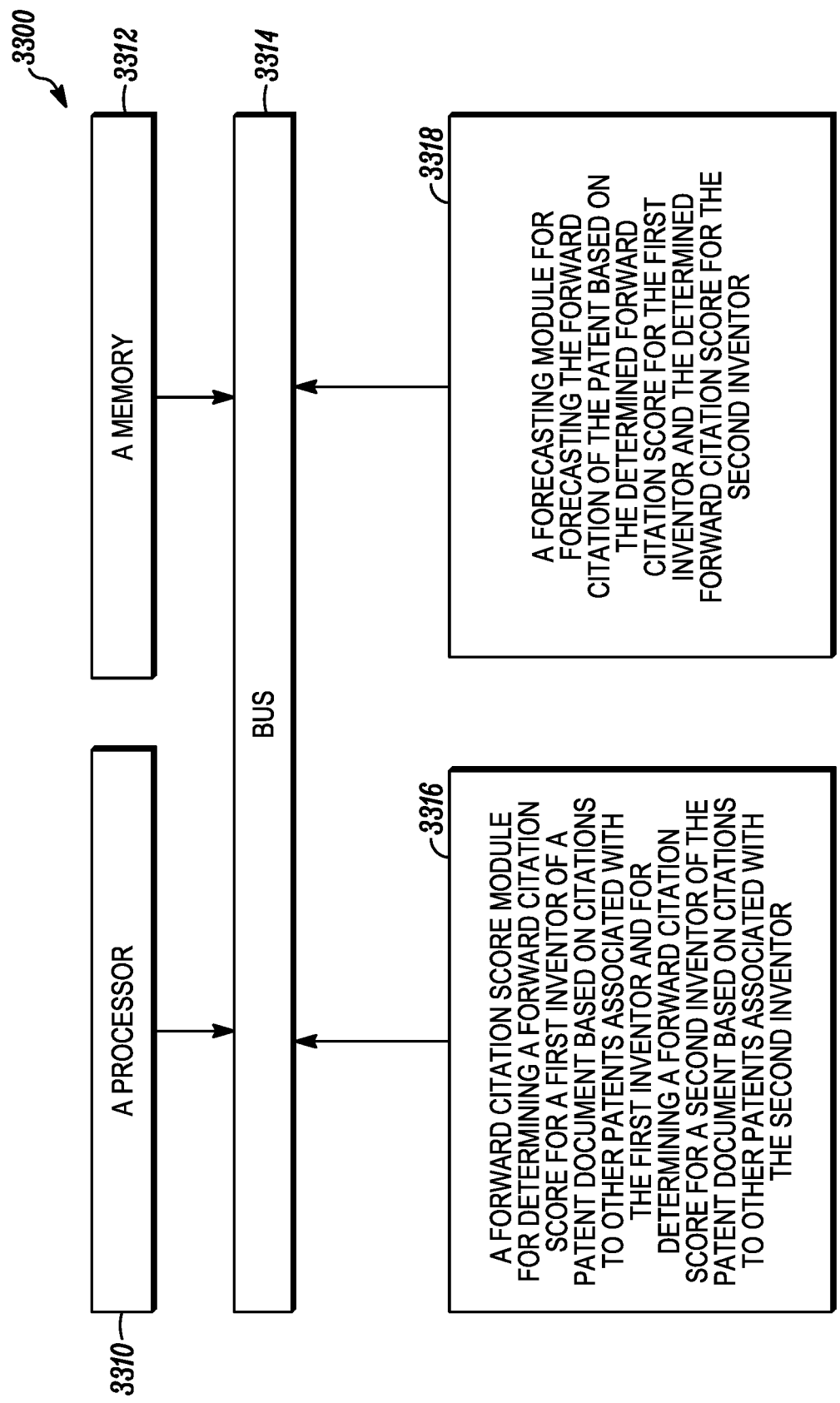
FIG. 33 is a computer system for predicting forward citations for a patent, according to an example embodiment.

FIG. 33 is a computer system 3300 for predicting forward citations for a patent, according to an example embodiment. The computer system 3300 includes a processor 3310, and a memory 3312 attached or communicatively coupled to a bus 3314. A number of modules are also attached to the bus 3314. The modules can be a hardware, software, or a combination of software and hardware. They can be stand alone or can share memory 3312 or another source of memory. They can have stand alone processors or can share processing with the processor 3310. The modules include a forward citation score module for determining a forward citation score for a first inventor of a patent document based on citations to other patents associated with the first inventor and for determining a forward citation score for a second inventor of the patent document based on citations to other patents associated with the second inventor 3316. Another module is a forecasting module for forecasting the forward citation of the patent based on the determined forward citation score for the first inventor and the determined forward citation score for the second inventor 3318.

Figure 34:
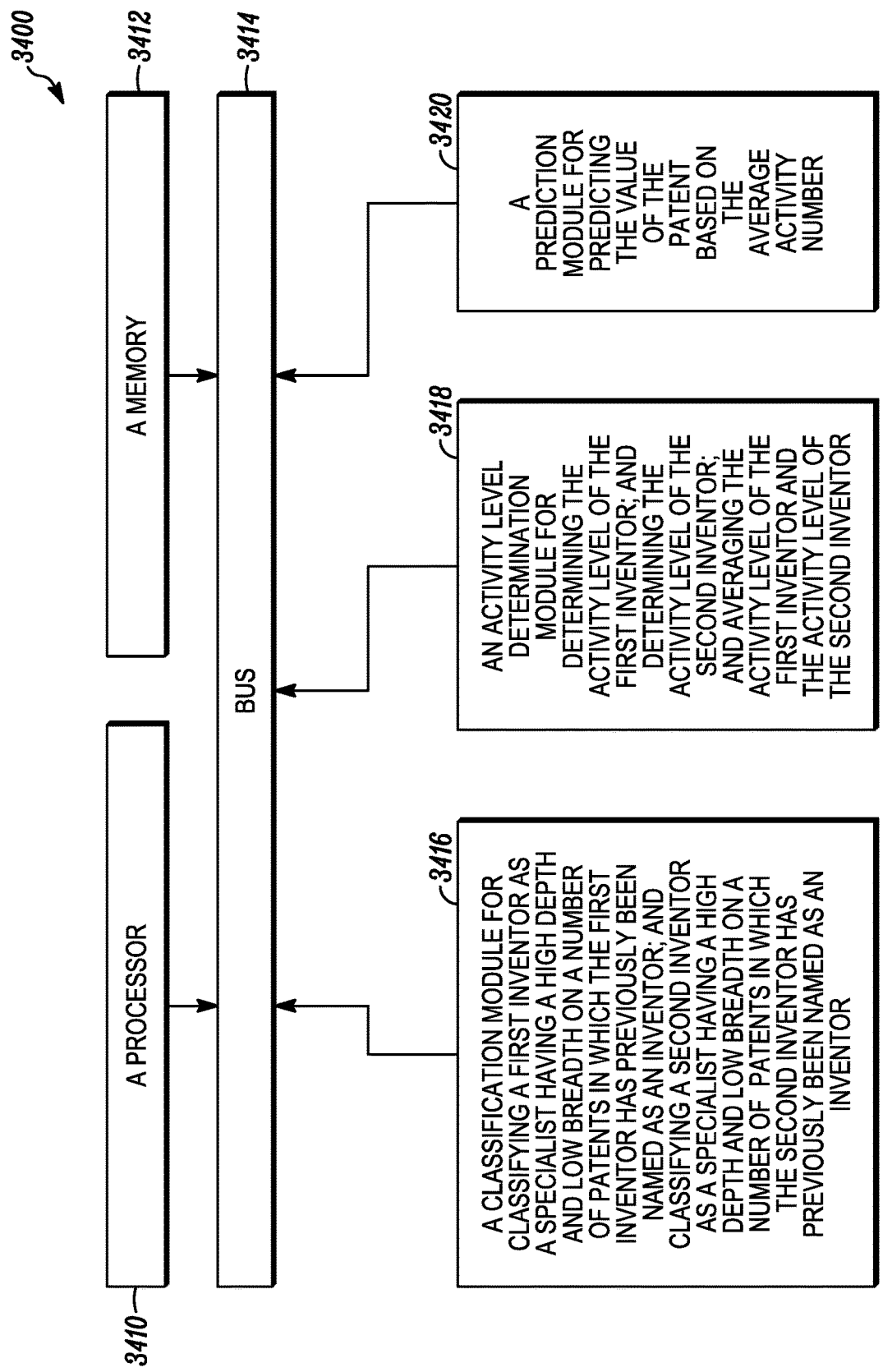
FIG. 34 is a computer system for predicting the value of the patent based on the activity of a plurality of inventors, according to an example embodiment.

FIG. 34 is a computer system 3400 for predicting the value of the patent based on the activity of a plurality of inventors, according to an example embodiment. The computer system 3400 includes a processor 3410, and a memory 3412 attached or communicatively coupled to a bus 3414. A number of modules are also attached to the bus 3414. The modules can be a hardware, software, or a combination of software and hardware. They can be stand alone or can share memory 3412 or another source of memory. They can have stand alone processors or can share processing with the processor 3410. The modules include a classification module for classifying a first inventor as a specialist having a high depth and low breadth on a number of patents in which the first inventor has previously been named as an inventor; and classifying a second inventor as a specialist having a high depth and low breadth on a number of patents in which the second inventor has previously been named as an inventor 3416. Another module attached to the bus 3414 is an activity level determination module for determining the activity level of the first inventor; and determining the activity level of the second inventor; and averaging the activity level of the first inventor and the activity level of the second inventor 3418. A prediction module for predicting the value of the patent based on the average activity number 3420 is also attached to the bus. Again, it should be noted that the inventors can be identified in one of several classes. In other embodiments, the inventors can be identified as belonging to several classes of inventors.

Figure 35:
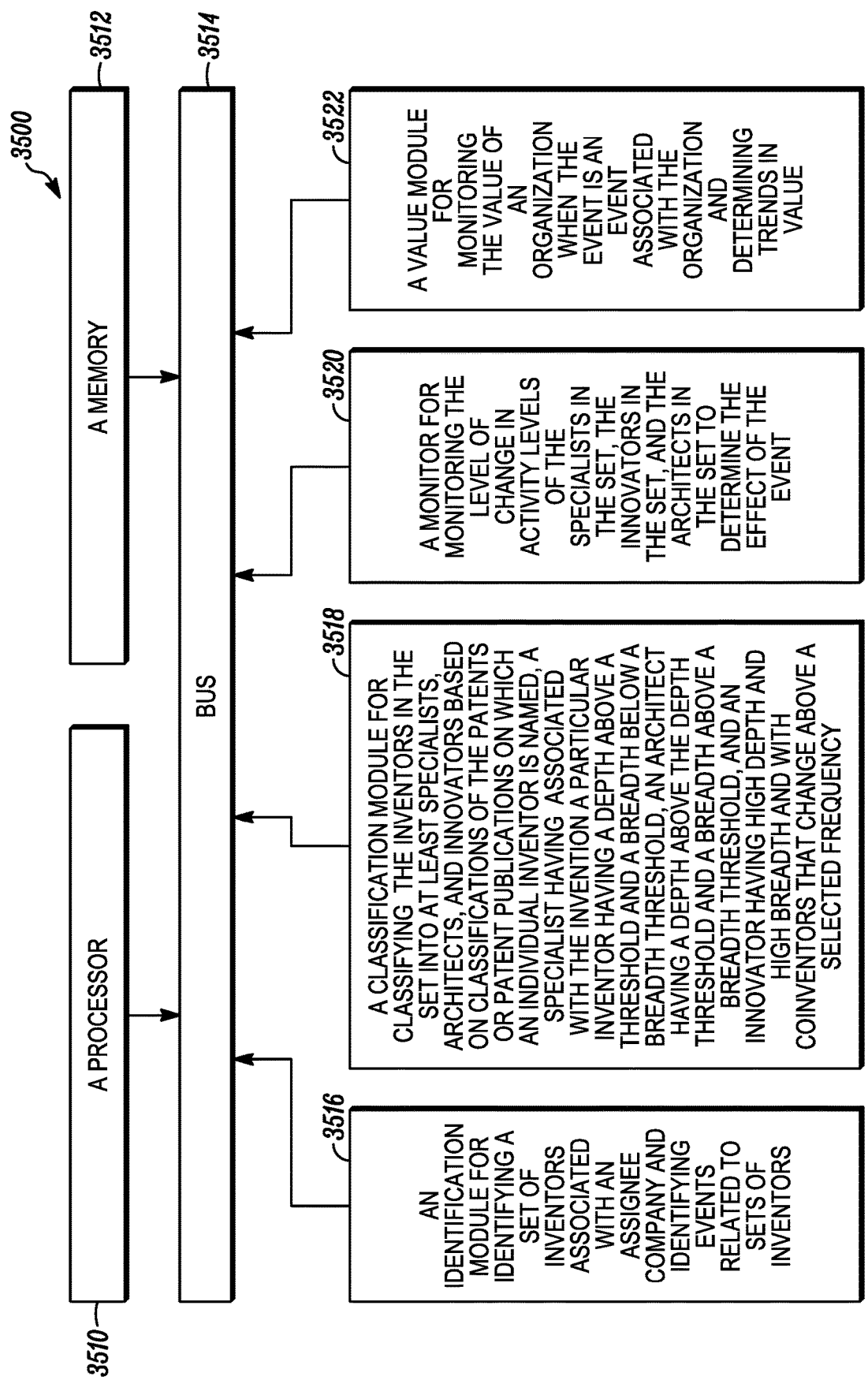
FIG. 35 is a computer system for predicting the value of the patent based on the activity of a plurality of inventors, according to an example embodiment.

FIG. 35 is a computer system 3500 for predicting the value of the patent based on the activity of a plurality of inventors, according to an example embodiment. The computer system 3500 includes a processor 3510, and a memory 3512 attached or communicatively coupled to a bus 3514. A number of modules are also attached to the bus 3514. The modules can be a hardware, software, or a combination of software and hardware. They can be stand alone or can share memory 3512 or another source of memory. They can have stand alone processors or can share processing with the processor 3510. The modules include an identification module for identifying a set of inventors associated with an assignee company and identifying events related to sets of inventors 3516, a classification module for classifying the inventors in the set into at least specialists, architects, and innovators based on classifications of the patents or patent publications on which an individual inventor is named, a specialist having associated with the invention a particular inventor having a depth above a threshold and a breadth below a breadth threshold, an architect having a depth above the depth threshold and a breadth above a breadth threshold, and an innovator having high depth and high breadth and with coinventors that change above a selected frequency 3518, and a monitor for monitoring the level of change in activity levels of the specialists in the set, the innovators in the set, and the architects in the set to determine the effect of the event 3520. Also attached to the bus is a value module for monitoring the value of an organization when the event is an event associated with the organization and determining trends in value 3522.

Figure 36:
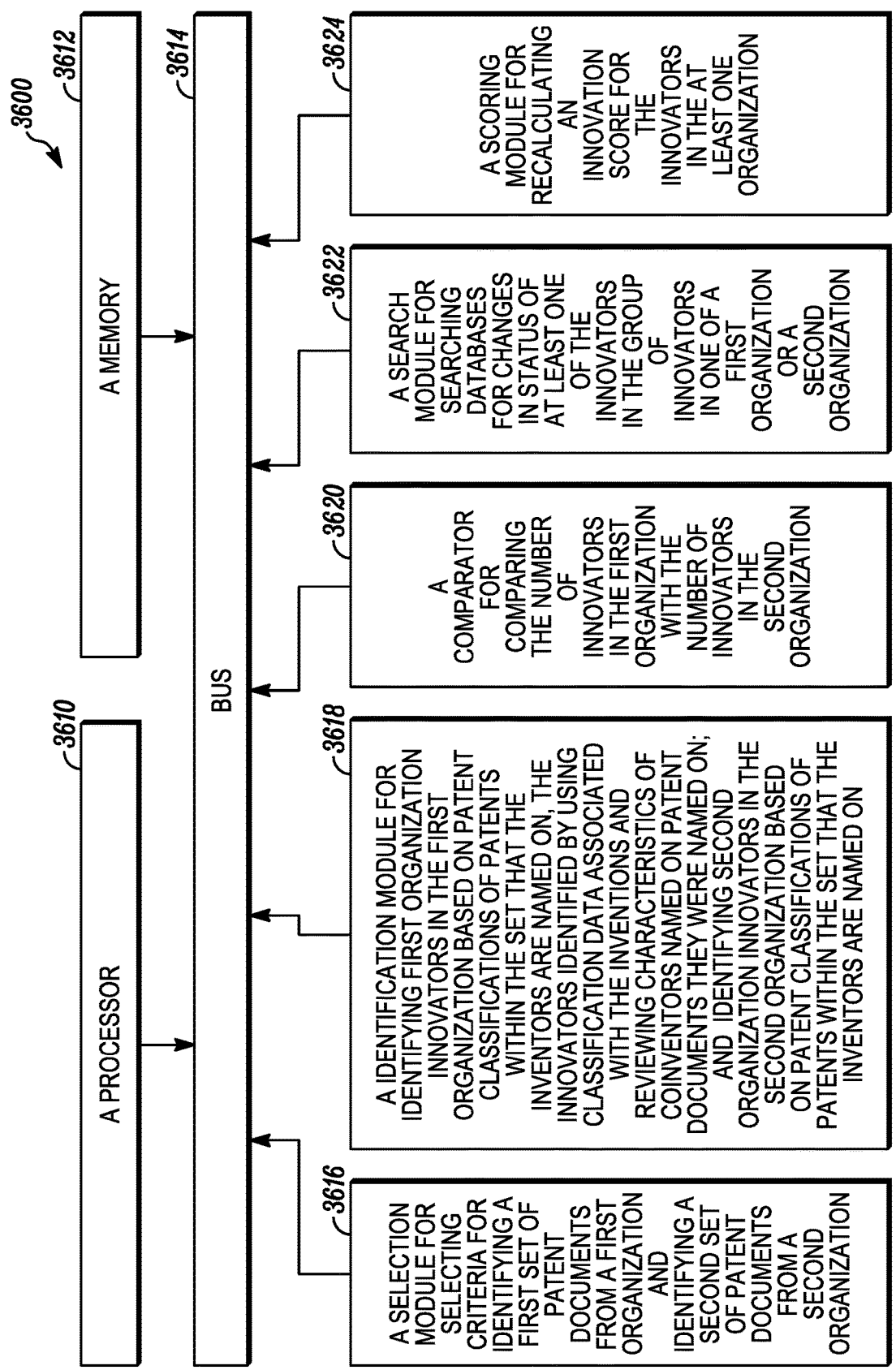
FIG. 36 is a computer system for comparing the amount of innovation for two or more organizations, according to an example embodiment.

FIG. 36 is a computer system 3600 for comparing the amount of innovation for two or more organizations, according to an example embodiment. The computer system 3600 includes a processor 3610, and a memory 3612 attached or communicatively coupled to a bus 3614. A number of modules are also attached to the bus 3614. The modules can be a hardware, software, or a combination of software and hardware. They can be stand alone or can share memory 3612 or another source of memory. They can have stand alone processors or can share processing with the processor 3610. The modules include a selection module for selecting criteria for identifying a first set of patent documents from a first organization and identifying a second set of patent documents from a second organization 3616, and a identification module for identifying first organization innovators in the first organization based on patent classifications of patents within the set that the inventors are named on, the innovators identified by using classification data associated with the inventions and reviewing characteristics of coinventors named on patent documents they were named on; and identifying second organization innovators in the second organization based on patent classifications of patents within the set that the inventors are named on 3618. The computer system 3600 also includes a comparator for comparing the number of innovators in the first organization with the number of innovators in the second organization 3620. Several other modules are also attached to the bus 3614 in the event the database changes over the time frame. These include a search module for searching databases for changes in status of at least one of the innovators in the group of innovators in one of a first organization or a second organization 3622, and a scoring module for recalculating an innovation score for the innovators in the at least one organization 3624.

Figure 37:
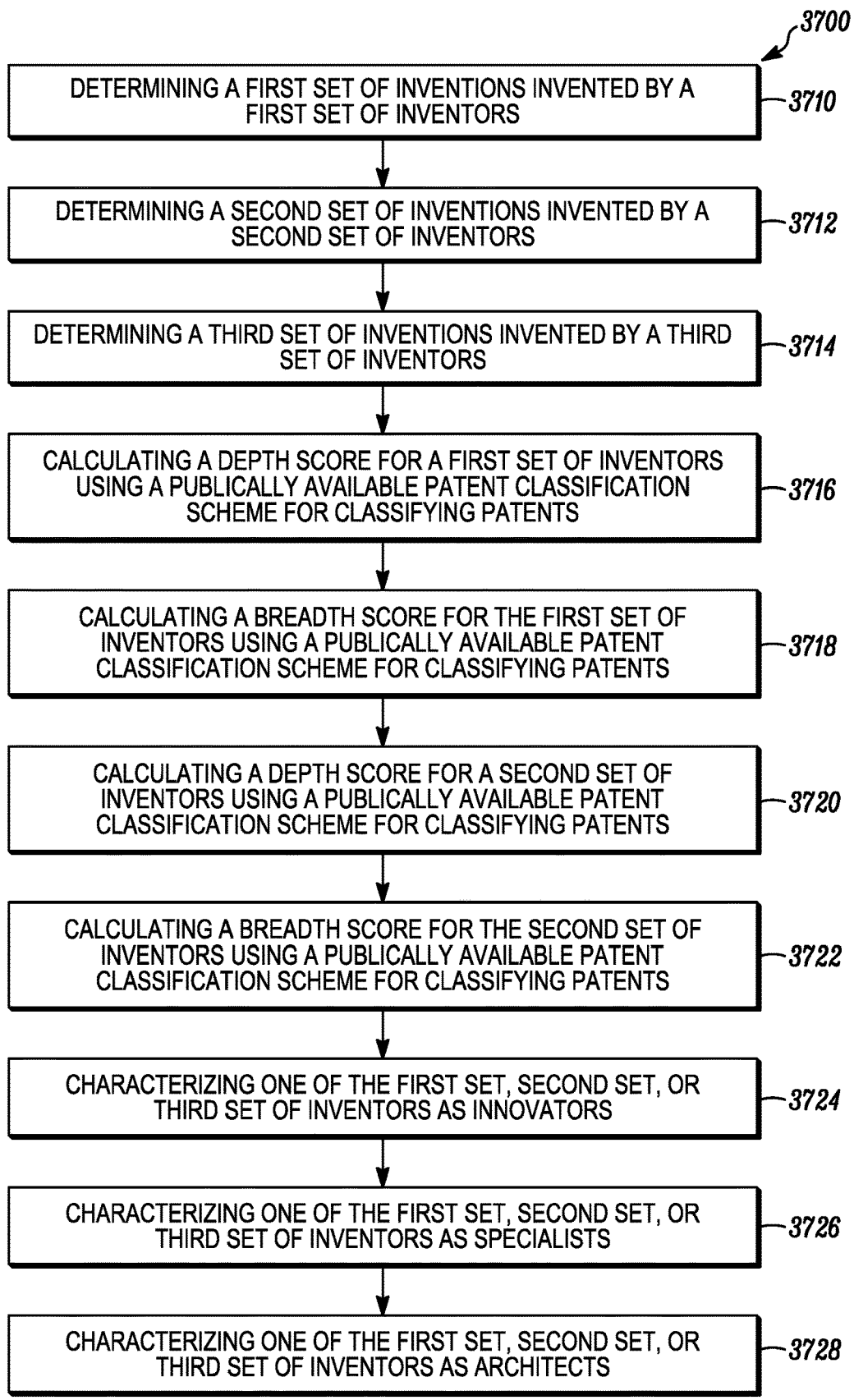
FIG. 37 is a flow chart of a method for identifying inventors or others in an organization, according to an example embodiment.

FIG. 37 is a flow chart of a method 3700 for identifying inventors or others in an organization, according to an example embodiment. The method 3100 includes determining a first set of inventions invented by a first set of inventors 3710, determining a second set of inventions invented by a second set of inventors 3712, and determining a third set of inventions invented by a third set of inventors 3714. The method 3700 further includes calculating a depth score for a first set of inventors using a publicly available patent classification scheme for classifying patents 3716, calculating a breadth score for the first set of inventors using a publicly available patent classification scheme for classifying patents 3718, calculating a depth score for a second set of inventors using a publicly available patent classification scheme for classifying patents 3720. And calculating a breadth score for the second set of inventors using a publicly available patent classification scheme for classifying patents 3722. The method 3700 also includes characterizing one of the first set, second set, or third set of inventors as innovators 3724, characterizing one of the first set, second set, or third set of inventors as specialists 3726, and characterizing one of the first set, second set, or third set of inventors as architects 3728. Given these criteria, various predictions and parameters can be determined. Comparisons can be made between organizations within companies, or between separate companies.

FIG. 38 shows a diagrammatic representation of a computing device for a machine in the example electronic form of a computer system 4000, within which a set of instructions for causing the machine to perform any one or more of the error correction methodologies discussed herein can be executed or is adapted to include the apparatus for error correction as described herein. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as a Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 4000 includes a processor or multiple processors 4002 (e.g., a central processing unit (CPU), a graphics processing unit (GPU), arithmetic logic unit or all), and a main memory 4004 and a static memory 4006, which communicate with each other via a bus 4008. The computer system 4000 can further include a video display unit 4010 (e.g., a liquid crystal display (LCD) or a cathode ray tube (CRT)). The computer system 4000 also includes an alphanumeric input device 4012 (e.g., a keyboard), a cursor control device 4014 (e.g., a mouse), a disk drive unit 4016, a signal generation device 4018 (e.g., a speaker) and a network interface device 4020.

The disk drive unit 4016 includes a computer-readable medium 4022 on which is stored one or more sets of instructions and data structures (e.g., instructions 4024) embodying or utilized by any one or more of the methodologies or functions described herein. The instructions 4024 can also reside, completely or at least partially, within the main memory 4004 and/or within the processors 4002 during execution thereof by the computer system 4000. The main memory 4004 and the processors 4002 also constitute machine-readable media.

The instructions 4024 can further be transmitted or received over a network 4026 via the network interface device 4020 utilizing any one of a number of well-known transfer protocols (e.g., Hyper Text Transfer Protocol (HTTP), CAN, Serial, or Modbus).

While the computer-readable medium 4022 is shown in an example embodiment to be a single medium, the term "computer-readable medium" should be taken to include a single medium or multiple media (e.g., a centralized or distributed database, and/or associated caches and servers) that store the one or more sets of instructions and provide the instructions in a computer readable form. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, tangible forms and signals that can be read or sensed by a computer. Such media can also include, without limitation, hard disks, floppy disks, flash memory cards, digital video disks, random access memory (RAMs), read only memory (ROMs), and the like.

The specification details many inventions. Some of the inventions are further detailed in the following paragraphs. The following listing of inventions is not exhaustive. It should be noted that there are many other possible inventions described herein.

A method for determining intellectual property value, comprising: creating a source of patent data; and analyzing the data to determine a patent value.

An instruction set executable on a machine that includes a processor and a memory, the instruction set executable on the machine to cause to the machine to: create a source of patent data; and analyze the data to determine a patent value.

A media carrying an instruction set executable on a machine, the machine further comprising: a processor; and a memory associated with the processor. The instruction set is executable on the processor to cause to the machine to: create a source of patent data; and analyze the data to determine a patent value.

A method comprising: calculating a depth score for an inventor; calculating a breadth score for the inventor; and ranking the inventor relative to other inventors based on the scores. In one embodiment an inventor's capability for generating high-value patents is ranked based on at least one of the depth score or the breadth scores. The scores are based on a plurality of patent classifications associated with patents obtained by the inventor. The method also further includes calculating a collaboration score reflective of the inventors ability to work with other inventors. The plurality of patent classifications have a first level and a second level. At least one of the depth score or the breadth score are calculated from at least the first level patent classification and the second level patent classification. The method further comprising calculating a forward citation prediction indicator for an inventor. The method further comprising evaluating capability in one or more inventive categories based at least on the depth and breadth scores for the inventor. The capability is determined for an inventor or for a plurality of inventors. The method can also include disambiguating patent data which further comprises disassociating certain patents from a list of patents erroneously attributed to an inventor. The method also includes identifying an inventor as a specialist when the inventor has a depth score above a threshold depth score and a breath value which is below a breadth threshold score, identifying an inventor as an innovator when the inventor has a depth score above a threshold depth score and a breadth value above a breadth threshold score, or identifying an inventor as an architect when the inventor has a depth score above a threshold depth score and a breadth value above a breadth threshold score, and the inventor has co-Inventors with different specialty areas. It should be noted that one inventor can be identified as one or more of an architect, innovator or specialist. The method can also include: reviewing one or more co-inventors on a collection of patent documents on which the inventor is listed: and ranking the inventor based on the number of unique one or more co-inventors associated with the inventor on the collection of patent documents. The method can include identifying an inventor as an innovator when the inventor has a depth score above a threshold depth score and a breadth value above a breadth threshold score, and with co-inventors that change above a selected frequency.

A method for forecasting patent value comprising: determining a forward citation score for a first inventor of a patent document based on citations to other patents associated with the first inventor; and determining a forward citation score for a second inventor of the patent document based on citations to other patents associated with the second inventor; and forecasting the forward citation of the patent based on the determined forward citation score for the first inventor and the determined forward citation score for the second inventor. The method further comprising averaging the forward citation score for the first inventor and the forward citation score for the second inventor to arrive at a number to predict the forward citation score of the patent document. The method for forecasting patent value further comprising valuing the patent document in response to the predicted number for the forward citation score of the patent document.

A method for predicting a value of a patent that includes a plurality of inventors comprising: identifying a first inventor as a specialist having a high depth and low breadth on a number of patents in which the first inventor has previously been named as an inventor; determining the activity level of the first inventor; identifying a second inventor as a specialist having a high depth and low breadth on a number of patents in which the second inventor has previously been named as an inventor; determining the activity level of the second inventor; and averaging the activity level of the first inventor and the activity level of the second inventor; and predicting the value of the patent based on the average activity number. The above method further comprising: identifying a third inventor as an architect having a high depth and high breadth on a number of patents in which the third inventor has previously been named as an inventor; determining the activity level of the third inventor; identifying a fourth inventor as an architect having a high depth and high breadth on a number of patents in which the fourth inventor has previously been named as an inventor; determining the activity level of the fourth inventor; and averaging the activity level of the third inventor and the activity level of the fourth inventor; and predicting the value of the patent based on the average activity number for specialists and the average activity number for architects. The above method further comprising: identifying a fifth inventor as an innovator having a high depth and high breadth on a number of patents in which the fifth inventor has previously been named as an inventor; determining the activity level of the fifth inventor; identifying a sixth inventor as an innovator having a high depth and high breadth on a number of patents in which the sixth inventor has previously been named as an inventor; determining the activity level of the sixth inventor; and averaging the activity level of the fifth inventor and the activity level of the sixth inventor; and predicting the value of the patent based on the average activity number for specialists and the average activity number for innovators.

A method of monitoring the value of an organization comprising: identifying a set of inventors associated with an assignee company; identifying the inventors in the set as specialists, architects, and innovators based on classifications of the patents or patent publications on which an individual inventor is named, a specialist having associated with the invention a particular inventor having a depth above a threshold and a breadth below a breadth threshold, an architect having a depth above the depth threshold and a breadth above a breadth threshold, and an innovator having high depth and high breadth and with co-inventors that change above a selected frequency; and Identifying an event; and monitoring the level of change in activity levels of the specialists in the set, the innovators in the set, and the architects in the set to determine the effect of the event. The event can be an event associated with the organization. Other events outside the organization can also be monitored. The above method further comprising determining a trend in activity levels after the event, and associating an increased value with the organization in response to an upward trend in increased levels of activity of the specialists in the set, the innovators in the set, and the architects in the set. The above method further comprising: normalizing architect scores, specialist scores, and innovator scores over time; and plotting the normalized scores against an organizations enterprise value and market cap; and noting up and down trends after certain events, and using the up and down trends to forecast an upswing or a decline in growth of the organization. The above method further comprising: associating an innovation score with the innovators; associating an architect score with the architects; and associating an specialist score with the specialists in an organization; and ranking the innovators, architects and specialists in an organization based on the respective scores for the individuals in these categories.

A method of comparing the relative innovation between organizations comprising: selecting criteria for identifying a first set of patent documents from a first organization and identifying a second set of patent documents from a second organization; and identifying first organization innovators in the first organization based on patent classifications of patents within the set that the inventors are named on, the innovators identified by using classification data associated with the inventions and reviewing characteristics of co-inventors named on patent documents they were named on; identifying second organization innovators in the second organization based on patent classifications of patents within the set that the inventors are named on; and comparing the number of innovators in the first organization with the number of innovators in the second organization. The above method wherein the numbers of innovators is normalized. The above method wherein selecting the criteria for identifying a first set of patent documents from the first organization and for identifying a second set of patent documents from the second organization includes a first time period and a second time period. The above method wherein selecting the criteria for identifying a first set of patent documents from the first organization and for identifying a second set of patent documents from the second organization includes a specific technology field as depicted by a patent classification. The above method further comprising: searching databases for changes in status of at least one of the innovators in the group of innovators in one of a first organization or a second organization; and recalculating an innovation score for the innovators in the at least one organization. The above method further comprising: Identifying first organization architects in the first organization based on patent classifications of patents within the set that the inventors are named on, the architects identified by using classification data associated with the inventions and reviewing characteristics of co-inventors named on patent documents they were named on; and Identifying second organization innovators in the second organization based on patent classifications of patents within the set that the inventors are named on. The above method wherein the selection criteria for the subset of patents includes a plurality of patent classifications.

An intellectual property valuing system comprising: a processor; a memory; and an instruction set stored in memory, the instruction set executable on the processor to cause to the processor to: calculate a depth score for an inventor; calculate a breadth score for the inventor; and rank the inventor relative to other inventors based on the scores. The above intellectual property valuing system wherein the instruction set further causes the processor to rank the inventor in terms of capability for generating high-value patents is based on at least one of the depth score or the breadth scores. The above intellectual property valuing system wherein the scores are based on a plurality of patent classifications associated with patents obtained by the inventor. The above intellectual property valuing system wherein the instruction set further causes the processor to calculate a collaboration score reflective of the inventors ability to work with other inventors. The above intellectual property valuing system wherein the plurality of classifications have a first level and a second level, wherein the instruction set further causes the processor to calculate at least one of the depth score or the breadth score from at least the first level classification and the second level classification. The above intellectual property valuing system wherein the instruction set further causes the processor to calculate a forward citation prediction indicator for an inventor. The above intellectual property valuing system wherein the instruction set further causes the processor to evaluate a capability in one or more inventive categories based at least on the depth and breadth scores for the inventor. The above intellectual property valuing system wherein the capability is determined for an inventor. The above intellectual property valuing system wherein the capability is determined for a plurality of inventors. The above intellectual property valuing system wherein the instruction set further causes the processor to disambiguate patent data which further comprises disassociating certain patents from a list of patents erroneously attributed to an inventor. The above intellectual property valuing system wherein the instruction set further causes the processor to identify an inventor as a specialist when the inventor has a depth score above a threshold depth score and a breath value which is below a breadth threshold score. The above intellectual property valuing system wherein the instruction set further causes the processor to identify an inventor as an innovator when the inventor has a depth score above a threshold depth score and a breadth value above a breadth threshold score. The intellectual property valuing system wherein the instruction set further causes the processor to identify an inventor as an architect when the inventor has a depth score above a threshold depth score and a breadth value above a breadth threshold score, and the inventor has co-inventors with different specialty areas. The above intellectual property valuing system wherein the instruction set further causes the processor to: review one or more co-inventors on a collection of patent documents on which the inventor is listed: and rank the inventor based on the number of unique one or more co-inventors associated with the inventor on the collection of patent documents. The above intellectual property valuing system wherein the instruction set further causes the processor to identify an inventor as an innovator when the inventor has a depth score above a threshold depth score and a breadth value above a breadth threshold score, and with co-inventors that change above a selected frequency.

An intellectual property valuing system comprising: a processor; a memory; and an instruction set stored in memory. The instruction set is executable on the processor to cause to the processor to forecast patent value comprising: determining a forward citation score for a first inventor of a patent document based on citations to other patents associated with the first inventor; and determining a forward citation score for a second inventor of the patent document based on citations to other patents associated with the second inventor; and forecasting the forward citation of the patent based on the determined forward citation score for the first inventor and the determined forward citation score for the second inventor. The above intellectual property valuing system wherein the instruction set further causes the processor to average the forward citation score for the first inventor and the forward citation score for the second inventor to arrive at a number to predict the forward citation score of the patent document. The above intellectual property valuing system wherein the instruction set further causes the processor to value the patent document in response to the predicted number for the forward citation score of the patent document.

An intellectual property valuing system comprising: a processor; a memory; and an instruction set stored in memory. The instruction set is executable on the processor to cause to the processor to: predict a value of a patent that includes a plurality of inventors by: identifying a first inventor as a specialist having a high depth and low breadth on a number of patents in which the first inventor has previously been named as an inventor; determining the activity level of the first inventor; identifying a second inventor as a specialist having a high depth and low breadth on a number of patents in which the second inventor has previously been named as an inventor; determining the activity level of the second inventor; and averaging the activity level of the first inventor and the activity level of the second inventor; and predicting the value of the patent based on the average activity number. The above intellectual property valuing system wherein the instruction set further causes the processor to: identify a third inventor as an architect having a high depth and high breadth on a number of patents in which the third inventor has previously been named as an inventor; determine the activity level of the third inventor; identify a fourth inventor as an architect having a high depth and high breadth on a number of patents in which the fourth inventor has previously been named as an inventor; determine the activity level of the fourth inventor; and average the activity level of the third inventor and the activity level of the fourth inventor; and predict the value of the patent based on the average activity number for specialists and the average activity number for architects. The above intellectual property valuing system wherein the instruction set further causes the processor to: identify a fifth inventor as an innovator having a high depth and high breadth on a number of patents in which the fifth inventor has previously been named as an inventor; determine the activity level of the fifth inventor; identify a sixth inventor as an innovator having a high depth and high breadth on a number of patents in which the sixth inventor has previously been named as an inventor; determine the activity level of the sixth inventor; and average the activity level of the fifth inventor and the activity level of the sixth inventor; and predict the value of the patent based on the average activity number for specialists and the average activity number for innovators.

An intellectual property valuing system comprising: a processor; a memory; and an instruction set stored in memory. The instruction set executable on the processor to cause to the processor to monitor the value of an organization by: identifying a set of inventors associated with an assignee company; identifying the inventors in the set into at least specialists, architects, and innovators based on classifications of the patents or patent publications on which an individual inventor is named, a specialist having associated with the invention a particular inventor having a depth above a threshold and a breadth below a breadth threshold, an architect having a depth above the depth threshold and a breadth above a breadth threshold, and an innovator having high depth and high breadth and with co-inventors that change above a selected frequency; and identifying an event; monitoring the level of change in activity levels of the specialists in the set, the innovators in the set, and the architects in the set to determine the effect of the event. The above intellectual property valuing system wherein the instruction set further causes the processor to monitor the value of an organization when the event is an event associated with the organization. The above intellectual property valuing system wherein the instruction set further causes the processor to determine a trend in activity levels after the event, and associating an increased value with the organization in response to an upward trend in increased levels of activity of the specialists in the set, the innovators in the set, and the architects in the set. The above intellectual property valuing system wherein the instruction set further causes the processor to: normalize architect scores, specialist scores, and innovator scores over time; and plot the normalized scores against an organizations enterprise value and market cap; and note up and down trends after certain events, and use the up and down trends to forecast an upswing or a decline in growth of the organization. The above intellectual property valuing system wherein the instruction set further causes the processor to: associate an innovation score with the innovators; associate an architect score with the architects; and associate an specialist score with the specialists in an organization; and rank the innovators, architects and specialists in an organization based on the respective scores for the individuals in these categories.

An intellectual property valuing system comprising: a processor; a memory; and an instruction set stored in memory. The instruction set executable on the processor to cause to the processor to compare the relative innovation between organizations by: selecting criteria for identifying a first set of patent documents from a first organization and identifying a second set of patent documents from a second organization; identifying first organization innovators in the first organization based on patent classifications of patents within the set that the inventors are named on, the innovators identified by using classification data associated with the inventions and reviewing characteristics of co-inventors named on patent documents they were named on; identifying second organization innovators in the second organization based on patent classifications of patents within the set that the inventors are named on; and comparing the number of innovators in the first organization with the number of innovators in the second organization. The above intellectual property valuing system wherein the instruction set further causes the processor to normalize the numbers of innovators. The above intellectual property valuing system wherein the instruction set further causes the processor to select the criteria for identifying a first set of patent documents from the first organization and to identify a second set of patent documents from the second organization includes a first time period and a second time period. The above intellectual property valuing system wherein the instruction set further causes the processor to select the criteria for identifying a first set of patent documents from the first organization and for identifying a second set of patent documents from the second organization includes a specific field as depicted by a patent classification. The above intellectual property valuing system of wherein the instruction set further causes the processor to: search databases for changes in status of at least one of the innovators in the group of innovators in one of a first organization or a second organization; and recalculate an innovation score for the innovators in the at least one organization. The above intellectual property valuing system wherein the instruction set further causes the processor to: Identify a first organization architects in the first organization based on patent classifications of patents within the set that the inventors are named on, the architects identified by using classification data associated with the inventions and reviewing characteristics of co-inventors named on patent documents they were named on; and Identify a second organization innovators in the second organization based on patent classifications of patents within the set that the inventors are named on. The above intellectual property valuing system wherein the instruction set further causes the processor to select criteria for the subset of patents that includes a plurality of patent classifications.

A non-transitory machine-readable medium providing instructions that, when executed by a machine, cause the machine to perform operations comprising: calculate a depth score for an inventor; calculate a breadth score for the inventor; and rank the inventor relative to other inventors based on the scores. The above non-transitory machine-readable medium providing instructions that further causes the machine to rank the inventor in terms of capability for generating high-value patents is based on at least one of the depth score or the breadth scores. The above non-transitory machine-readable medium wherein the scores are based on a plurality of patent classifications associated with patents obtained by the inventor. The above non-transitory machine-readable medium providing instructions that further causes the machine to calculate a collaboration score reflective of the inventors ability to work with other inventors. The above non-transitory machine-readable medium wherein the plurality of classifications have a first level and a second level, wherein the non-transitory machine-readable medium providing instructions that further causes the machine to calculate at least one of the depth score or the breadth score from at least the first level classification and the second level classification. The above non-transitory machine-readable medium providing instructions that further causes the machine to calculate a forward citation prediction indicator for an inventor. The above non-transitory machine-readable medium providing instructions that further causes the machine to evaluate a capability in one or more inventive categories based at least on the depth and breadth scores for the inventor. The above non-transitory machine-readable medium wherein the capability is determined for an inventor. The above non-transitory machine-readable medium wherein the capability is determined for a plurality of inventors. The above non-transitory machine-readable medium providing instructions that further causes the machine to disambiguate patent data which further comprises disassociating certain patents from a list of patents erroneously attributed to an inventor. The above non-transitory machine-readable medium providing instructions that further causes the machine r to identify an inventor as a specialist when the inventor has a depth score above a threshold depth score and a breath value which is below a breadth threshold score. The non-transitory machine-readable medium providing instructions that further causes the machine to identify an inventor as an innovator when the inventor has a depth score above a threshold depth score and a breadth value above a breadth threshold score. The above non-transitory machine-readable medium providing instructions that further causes the machine to identify an inventor as an architect when the inventor has a depth score above a threshold depth score and a breadth value above a breadth threshold score, and the inventor has co-inventors with different specialty areas. The above non-transitory machine-readable medium providing instructions that further causes the machine to: review one or more co-inventors on a collection of patent documents on which the inventor is listed: and rank the inventor based on the number of unique one or more co-inventors associated with the inventor on the collection of patent documents. The above non-transitory machine-readable medium providing instructions that further causes the machine to identify an inventor as an innovator when the inventor has a depth score above a threshold depth score and a breadth value above a breadth threshold score, and with co-inventors that change above a selected frequency.

A non-transitory machine-readable medium providing instructions that, when executed by a machine, cause the machine to perform operations to forecast patent value comprising: determining a forward citation score for a first inventor of a patent document based on citations to other patents associated with the first inventor; and determining a forward citation score for a second inventor of the patent document based on citations to other patents associated with the second inventor; and forecasting the forward citation of the patent based on the determined forward citation score for the first inventor and the determined forward citation score for the second inventor. The above non-transitory machine-readable medium providing instructions that further causes the machine to average the forward citation score for the first inventor and the forward citation score for the second inventor to arrive at a number to predict the forward citation score of the patent document. The above non-transitory machine-readable medium providing instructions that further causes the machine to value the patent document in response to the predicted number for the forward citation score of the patent document.

A non-transitory machine-readable medium providing instructions that, when executed by a machine, cause the machine to perform operations to forecast patent value by; predicting a value of a patent that includes a plurality of inventors by: identifying a first inventor as a specialist having a high depth and low breadth on a number of patents in which the first inventor has previously been named as an inventor; determining the activity level of the first inventor; identifying a second inventor as a specialist having a high depth and low breadth on a number of patents in which the second inventor has previously been named as an inventor; determining the activity level of the second inventor; and averaging the activity level of the first inventor and the activity level of the second inventor; and predicting the value of the patent based on the average activity number. The above non-transitory machine-readable medium providing instructions that further causes the machine to: identify a third inventor as an architect having a high depth and high breadth on a number of patents in which the third inventor has previously been named as an inventor; determine the activity level of the third inventor; identify a fourth inventor as an architect having a high depth and high breadth on a number of patents in which the fourth inventor has previously been named as an inventor; determine the activity level of the fourth inventor; and average the activity level of the third inventor and the activity level of the fourth inventor; and predict the value of the patent based on the average activity number for specialists and the average activity number for architects.

A non-transitory machine-readable medium providing instructions that, when executed by a machine, cause the machine to perform operations to forecast patent value by; identifying a set of inventors associated with an assignee company; identifying the inventors in the set into at least specialists, architects, and innovators based on classifications of the patents or patent publications on which an individual inventor is named, a specialist having associated with the invention a particular inventor having a depth above a threshold and a breadth below a breadth threshold, an architect having a depth above the depth threshold and a breadth above a breadth threshold, and an innovator having high depth and high breadth and with co-inventors that change above a selected frequency; and identifying an event; monitoring the level of change in activity levels of the specialists in the set, the innovators in the set, and the architects in the set to determine the effect of the event. The above non-transitory machine-readable medium providing instructions that further causes the machine to monitor the value of an organization when the event is an event associated with the organization. The above non-transitory machine-readable medium providing instructions that further causes the machine to determine a trend in activity levels after the event, and associating an increased value with the organization in response to an upward trend in increased levels of activity of the specialists in the set, the innovators in the set, and the architects in the set. The above non-transitory machine-readable medium providing instructions that further causes the machine to: normalize architect scores, specialist scores, and innovator scores over time; and plot the normalized scores against an organizations enterprise value and market cap; and note up and down trends after certain events, and use the up and down trends to forecast an upswing or a decline in growth of the organization. The above non-transitory machine-readable medium providing instructions that further causes the machine to: associate an innovation score with the innovators; associate an architect score with the architects; and associate an specialist score with the specialists in an organization; and rank the innovators, architects and specialists in an organization based on the respective scores for the individuals in these categories.

A non-transitory machine-readable medium providing instructions that, when executed by a machine, cause the machine to perform operations to compare the relative innovation between organizations by: selecting criteria for identifying a first set of patent documents from a first organization and identifying a second set of patent documents from a second organization; identifying first organization innovators in the first organization based on patent classifications of patents within the set that the inventors are named on, the innovators identified by using classification data associated with the inventions and reviewing characteristics of co-inventors named on patent documents they were named on; identifying second organization innovators in the second organization based on patent classifications of patents within the set that the inventors are named on; and comparing the number of innovators in the first organization with the number of innovators in the second organization. The above non-transitory machine-readable medium providing instructions that further causes the machine to normalize the numbers of innovators. The above non-transitory machine-readable medium providing instructions that further causes the machine to select the criteria for identifying a first set of patent documents from the first organization and to identify a second set of patent documents from the second organization includes a first time period and a second time period. The above non-transitory machine-readable medium providing instructions that further causes the machine to select the criteria for identifying a first set of patent documents from the first organization and for identifying a second set of patent documents from the second organization includes a specific field as depicted by a patent classification. The above non-transitory machine-readable medium providing instructions that further causes the machine to: search databases for changes in status of at least one of the innovators in the group of innovators in one of a first organization or a second organization; and recalculate an innovation score for the innovators in the at least one organization. The above non-transitory machine-readable medium providing instructions that further causes the machine to: Identify a first organization architects in the first organization based on patent classifications of patents within the set that the inventors are named on, the architects identified by using classification data associated with the inventions and reviewing characteristics of co-inventors named on patent documents they were named on; and Identify a second organization innovators in the second organization based on patent classifications of patents within the set that the inventors are named on. The above non-transitory machine-readable medium providing instructions that further causes the machine to select criteria for the subset of patents that includes a plurality of patent classifications. The above computer system wherein scores from at least one of the depth score calculating module or the breadth score calculating module are used to evaluate an inventor's capability for generating high-value patents. The above computer system further comprising an input from a patent classification system for one or more patents associated with an inventor. The above computer system wherein the patent classification system includes plurality of classifications with a first level and a second level, at least one of the depth score or the breadth score are calculated from at least the first level classification and the second level classification.

The above computer system further comprising a forward citation prediction module for calculating a forward citation prediction indicator for an inventor. The above computer system wherein scores are determined for a plurality of inventors, the scores used to compare various inventors. The above computer system further comprising a classification module. The classification module identifying an inventor as a specialist when the inventor has a depth score above a threshold depth score and a breath value which is below a breadth threshold score. The above computer system wherein the classification module identifies an inventor as an innovator when the inventor has a depth score above a threshold depth score and a breadth value above a breadth threshold score. The above computer system wherein the classification module identifies an inventor as an architect when the inventor has a depth score above a threshold depth score and a breadth value above a breadth threshold score, and the inventor has co-inventors with different specialty areas. The above computer system wherein the classification module identifies an inventor as an innovator when the inventor has a depth score above a threshold depth score and a breadth value above a breadth threshold score, and with co-inventors that change above a selected frequency.

A computer system for forecasting patent value comprising: a microprocessor; a memory communicatively coupled to the microprocessor; a forward citation score module communicatively coupled to at least the microprocessor, that determines a forward citation score for a first inventor of a patent document based on citations to other patents associated with the first inventor; and determines a forward citation score for a second inventor of the patent document based on citations to other patents associated with the second inventor; and forecasts the forward citation of the patent based on the determined forward citation score for the first inventor and the determined forward citation score for the second inventor. The above computer system for forecasting patent value further a forward citation prediction module that averages the forward citation score for the first inventor and the forward citation score for the second inventor to arrive at a number to predict the forward citation score of the patent document produced by the first inventor and the second inventor.

A computer system for predicting a value of a patent that includes a plurality of inventors comprising: a classification module for identifying a first inventor as a specialist having a high depth and low breadth on a number of patents in which the first inventor has previously been named as an inventor; and identifying a second inventor as a specialist having a high depth and low breadth on a number of patents in which the second inventor has previously been named as an inventor; an inventive activity module for determining the activity level of the first inventor; and determining the activity level of the second inventor; and averaging the activity level of the first inventor and the activity level of the second inventor; and a prediction module for predicting the value of the patent based on the average activity number. The above computer system for predicting a value of a patent wherein the classification module identifying a third inventor as an architect having a high depth and high breadth on a number of patents in which the third inventor has previously been named as an inventor; identifying a fourth inventor as an architect having a high depth and high breadth on a number of patents in which the fourth inventor has previously been named as an inventor; and wherein the inventive activity module determines the activity level of the third inventor; and determines the activity level of the fourth inventor; and averages the activity level of the third inventor and the activity level of the fourth inventor; and wherein the prediction module for predicts the value of the patent based on the average activity number for specialists and the average activity number for architects. The above computer system for predicting a value of a patent wherein the classification module identifies a fifth inventor as an innovator having a high depth and high breadth on a number of patents in which the fifth inventor has previously been named as an inventor; identifies a sixth inventor as an innovator having a high depth and high breadth on a number of patents in which the sixth inventor has previously been named as an inventor; determines the activity level of the fifth inventor; determines the activity level of the sixth inventor; and averages the activity level of the fifth inventor and the activity level of the sixth inventor; and wherein the prediction module predicts the value of the patent based on the average activity number for specialists and the average activity number for innovators.

A computer system for monitoring the value of an organization comprising: a microprocessor; a memory communicatively coupled to the microprocessor; an identification module for identifying a set of inventors associated with an assignee company, the identification module also identifying at least one event; a classification module for identifying the inventors in the set into at least specialists, architects, and innovators based on classifications of the patents or patent publications on which an individual inventor is named, a specialist having associated with the invention a particular inventor having a depth above a threshold and a breadth below a breadth threshold, an architect having a depth above the depth threshold and a breadth above a breadth threshold, and an innovator having high depth and high breadth and with co-inventors that change above a selected frequency; and a monitor for monitoring activity levels for specialists, innovators and architects, the monitor monitoring the level of change in activity levels of the specialists in the set, the innovators in the set, and the architects in the set to determine the effect of the event. The above computer system for monitoring the value of an organization further comprising: a statistical module for normalizing architect scores, specialist scores, and innovator scores over time; and plotting the normalized scores against an organizations enterprise value and market cap; and noting up and down trends after certain events, and using the up and down trends to forecast an upswing or a decline in growth of the organization.

A computer system for comparing the relative innovation between organizations comprising: a selection module for selecting criteria for identifying a first set of patent documents from a first organization and identifying a second set of patent documents from a second organization; an identification module for identifying first organization innovators in the first organization based on patent classifications of patents within the set that the inventors are named on, the innovators identified by using patent classification data associated with the inventions and reviewing characteristics of co-inventors named on patent documents they were named on; the identification module also identifying second organization innovators in the second organization based on patent classifications of patents within the set that the inventors are named on; and a compare module for comparing the number of innovators in the first organization with the number of innovators in the second organization. The above computer system for comparing the relative innovation between organizations further comprising a statistical module which normalizes the numbers of innovators for the first organization and the second organization. The above computer system for comparing the relative innovation between organizations wherein the selection module selects the criteria for identifying a first set of patent documents from the first organization and for identifying a second set of patent documents from the second organization includes a first time period and a second time period. The above computer system for comparing the relative innovation between organizations wherein the selection module selects the criteria for identifying a first set of patent documents from the first organization and for identifying a second set of patent documents from the second organization includes a specific field as depicted by a patent classification of a governmental patent body. The above computer system for comparing the relative innovation between organizations wherein the selection module searches databases for changes in status of at least one of the innovators in the group of innovators in one of a first organization or a second organization; and the microprocessor recalculates an innovation score for the innovators in the at least one organization in response to finding a change in status of at least one innovator, the microprocessor recalculation the innovation score for the organization in which the change of status was found. The above computer system for comparing the relative innovation between organizations wherein the identification module Identifies first organization architects in the first organization based on patent classifications of patents within the set that the inventors are named on, the architects identified by using classification data associated with the inventions and reviewing characteristics of co-inventors named on patent documents they were named on; and Identifies second organization innovators in the second organization based on patent classifications of patents within the set that the inventors are named on. The above computer system for comparing the relative innovation between organizations wherein the selection criteria for the subset of patents includes a plurality of public patent classifications. The above computer system for comparing the relative innovation between organizations wherein the selection criteria for the subset of patents includes a plurality of international patent classification codes.

A method for determining the technological ability of an inventor comprising: determining a set of inventions invented by the inventor; calculating a depth score for the inventor using a publicly available patent classification scheme for identifying patents, the depth score being higher when the classification of each of the patents of the set of patents is for a similar technology; calculating a breadth score for the inventor using a publicly available patent classification scheme for identifying patents, the breadth score being higher when the classifications of the patents in the set of inventions is for different technologies. The above method wherein the inventor's capability for generating high-value patents is ranked based on at least one of the depth score or the breadth scores. The above method further comprising analyzing the depth score and the breadth score to characterize the inventor. The above method further comprising analyzing the depth score and the breadth score to characterize the inventor as an innovator. The above method further comprising analyzing the depth score and the breadth score to characterize the inventor as an architect. The above method further comprising analyzing the depth score and the breadth score to characterize the inventor as a specialist. The above method further comprising analyzing depth and breadth scores of co-inventors of the inventions within the set of inventions associated with the inventor. The above method wherein the inventor is provided with a collaboration score based on the depth and breadth score of the co-inventors. The above method wherein the number of forward citations to a patent can be predicted based, at least in part on the depth score and breadth score of the inventor. The above method wherein the predicted number of forward citations is used to predict the strength of a patent the inventor is named on. The above method wherein the number of forward citations to a patent can be predicted based, at least in part on the depth score and breadth score of the inventor, and at least in part, on the depth score and breadth score of co-inventors of the patent. The above method wherein the predicted number of forward citations is used to predict the strength of a patent the inventor and co-inventor are named on.

A method for comparing the technological ability of a first inventor to the technological ability of a second inventor comprising: determining a first set of inventions invented by a first inventor; determining a second set of inventions invented by a second inventor; calculating a depth score for a first inventor using a publicly available patent classification scheme for identifying patents; calculating a breadth score for the first inventor using a publicly available patent classification scheme for classifying patents; calculating a depth score for a second inventor using a publicly available patent classification scheme for classifying patents; calculating a breadth score for the second inventor using a publicly available patent classification scheme for classifying patents; and ranking the first inventor relative to second inventor based on at least one of the depth scores and the breadth scores. The above method wherein a patent is classified using a plurality of patent classifications, the patent classifications including a first level patent classification and a second level patent classification, at least one of the depth score or the breadth scores calculated from at least the first level patent classification and the second level patent classifications. The above method further comprising analysing the depth score and the breadth score to characterize the first inventor and the second inventor. The above method further comprising analysing the depth score and the breadth score to characterize at least one of the first inventor and the second inventor as an innovator. The above method further comprising analysing the depth score and the breadth score to characterize at least one of the first inventor and the second inventor as an architect. The above method further comprising analyzing the depth score and the breadth score to characterize at least one of the first inventor and the second inventor as a specialist.

A method for determining the health of an organization comprising: determining a first set of inventions invented by a first set of inventors; determining a second set of inventions invented by a second set of inventors; determining a third set of inventions invented by a third set of inventors; calculating a depth score for a first set of inventors using a publicly available patent classification scheme for classifying patents; calculating a breadth score for the first set of inventors using a publicly available patent classification scheme for classifying patents; calculating a depth score for a second set of inventors using a publicly available patent classification scheme for classifying patents; calculating a breadth score for the second set of inventors using a publicly available patent classification scheme for classifying patents; characterizing one of the first set, second set, or third set of inventors as innovators; characterizing one of the first set, second set, or third set of inventors as specialists; and characterizing one of the first set, second set, or third set of inventors as architects. The above method for determining the health of an organization further comprising plotting the scores for innovators, specialists and architects over time and correlating organization events to changes in the scores. The above method for determining the health of an organization further comprising plotting the scores for innovators, specialists and architects over time and correlating changes in company value to changes in the scores. The above method for determining the health of an organization further comprising plotting the scores for innovators, specialists and architects over time and predicting changes in company value to result from changes in the scores. The above method for determining the health of an organization further comprising determining the sets of inventors and characterizing them form a second company and comparing the first company's scores to the second company's scores.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. The term "having" if used in the claims is an open ended term. Moreover, in the following claims, the terms "first," "second," and "third," etc. are used merely as labels, and are not intended to impose numerical requirements on their objects.

The use of the term "or" in the present description should be interpreted as a non-exclusive or unless otherwise stated.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate example embodiment.

It is emphasized that, for purposes of the United States, the Abstract is provided to comply with 36 C.F.R. § 1.62(b) requiring an Abstract that will allow the reader to quickly ascertain the nature and gist of the technical disclosure. It is submitted with the understanding that it will not be used to interpret or limit the scope or meaning of the claims.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

The invention claimed is:

1. A method comprising:
calculating, by a special purpose computer, a first depth score for a first inventor, the calculating of the first depth score comprising:
calculating a first summation of first occurrences of patents obtained by the first inventor associated with a certain patent classification code; and
in the calculating of the first summation, weighting each occurrence of the first occurrences of patents by inventor order;
calculating, by the special purpose computer, a first breadth score for the first inventor;
identifying, by the special purpose computer, first one or more co-inventors on a collection of patent documents on which the first inventor is listed;
calculating, by the special purpose computer, a second depth score for a second inventor, the calculating of the second depth score comprising:
calculating a second summation of second occurrences of patents obtained by the second inventor associated with the certain patent classification code; and
in the calculating of the second summation, weighting each occurrence of the second occurrences of patents by inventor order;
calculating, by the special purpose computer, a second breadth score for the second inventor;
identifying, by the special purpose computer, second one or more co-inventors on a collection of patent documents on which the second inventor is listed;
ranking, by the special purpose computer, the first inventor relative to the second inventor based on the first scores and a first number of unique co-inventors in the first one or more co-inventors as well as the second scores and a second number of unique co-inventors in the second one or more co-inventors;
measuring attributes of a brain of the first inventor using functional magnetic resonance imaging (fMRI), and wherein the calculating of the first depth score is further based on the measured attributes of the brain of the first inventor; and
measuring attributes of a brain of the second inventor using fMRI, and wherein the calculating of the second depth score is further based on the measured attributes of the brain of the second inventor.

2. The method of claim 1, further comprising calculating, by the special purpose computer, a first collaboration score according to depth scores of co-inventors of the first inventor, wherein the collaboration score is reflective an ability of the first inventor to work with other inventors, and wherein the calculations of the depth scores of the co-inventors are performed in a similar way as the calculation of the first depth score of the first inventor.

3. The method of claim 1 further comprising calculating, by the special purpose computer, a forward citation prediction indicator for the first inventor according to the first depth score.

4. The method of claim 1 further comprising identifying, by the special purpose machine computer, the first inventor as a specialist when the first depth score is above a threshold depth score and the first breadth score is below a breadth threshold score.

5. The method of claim 1 further comprising identifying, by the special purpose machine computer, the first inventor as an innovator when the first depth score is above a threshold depth score and the first breadth score is above a breadth threshold score.

6. The method of claim 1 further comprising identifying, by the special purpose machine computer, the first inventor as an architect when the first depth score is above a threshold depth score and the first breadth score is above a breadth threshold score, and the first inventor has co-inventors with different specialty areas.

7. The method of claim 1 further comprising identifying, by the special purpose machine computer, the first inventor as an innovator when the first depth score is above a threshold depth score and the first breadth score is above a breadth threshold score, and with co-inventors that change above a selected frequency.

8. A system, comprising:
a special purpose computer; and
memory comprising an instruction set executable by a processor of the special purpose computer to cause the special purpose computer to:
calculate a first depth score for a first inventor, the calculating of the first depth score comprising:
calculating a first summation of first occurrences of patents obtained by the first inventor associated with a certain patent classification code; and
in the calculating of the first summation, weighting each occurrence of the first occurrences of patents by inventor order;
calculate a first breadth score for the first inventor;
identify first one or more co-inventors on a collection of patent documents on which the first inventor is listed;
calculate a second depth score for a second inventor, the calculating of the second depth score comprising:
calculating a second summation of second occurrences of patents obtained by the second inventor associated with the certain patent classification code; and
in the calculating of the second summation, weighting each occurrence of the second occurrences of patents by inventor order;
calculate a second breadth score for the second inventor;
identify second one or more co-inventors on a collection of patent documents on which the second inventor is listed;
rank the first inventor relative to the second inventor based on the first scores and a first number of unique co-inventors in the first one or more co-inventors as well as the second scores and a second number of unique co-inventors in the second one or more co-inventors;
measure attributes of a brain of the first inventor using functional magnetic resonance imaging (fMRI), and wherein the calculating of the first depth score is further based on the measured attributes of the brain of the first inventor; and
measure attributes of a brain of the second inventor using fMRI, and wherein the calculating of the second depth score is further based on the measured attributes of the brain of the second inventor.

9. The method of claim 1, wherein the calculating of the first breadth score comprises:
calculating a third summation of third occurrences of patents obtained by the first inventor associated with a second certain patent classification code; and
in the calculating of the third summation, weighting each occurrence of the third occurrences of patents by inventor order.

10. The method of claim 9, wherein the calculating of the second breadth score comprises:

calculating a fourth summation of fourth occurrences of patents obtained by the second inventor associated with the second certain patent classification code; and in the calculating of the fourth summation, weighting each occurrence of the fourth occurrences of patents by inventor order.

11. The method of claim 1 further comprising calculating, by the special purpose computer, a forward citation prediction indicator for the first inventor according to the first depth score and the second breadth score.

12. The method of claim 1, wherein the calculating of the first depth score further comprises:

calculating a third summation of third occurrences of patents obtained by the first inventor associated with a second certain patent classification code, wherein the certain patent classification code is included in a first classification level and the second certain patent classification code is included in a second classification level; and in the calculating of the third summation, weighting each occurrence of the third occurrences of patents by inventor order.

13. The method of claim 12, wherein the calculating of the second depth score further comprises:

calculating a fourth summation of fourth occurrences of patents obtained by the second inventor associated with the second certain patent classification code; and in the calculating of the fourth summation, weighting each occurrence of the fourth occurrences of patents by inventor order.

14. The method of claim 1, further comprising:

correlating the measured attributes of the brain of the first inventor to the first depth score;

correlating the measured attributes of the brain of the second inventor to the second depth score; and repeating the correlations on a group of inventors to create a training set.

15. The method of claim 14, wherein the calculating of the first breadth score is further based on the measured attributes of the brain of the first inventor, and wherein the calculating of the second breadth score is further based on the measured attributes of the brain of the second inventor.

16. The method of claim 15, further comprising:

correlating the measured attributes of the brain of the first inventor to the first breadth score;

correlating the measured attributes of the brain of the second inventor to the second breadth score; and repeating the correlations on the group of inventors to create the training set.

17. A special purpose computer comprising memory comprising an instruction set executable by a processor of the special purpose computer that when executed by the processor causes the special purpose computer to perform a method comprising the following steps:

calculating a first depth score for a first inventor, the calculating of the first depth score comprising:

calculating a first summation of first occurrences of patents obtained by the first inventor associated with a certain patent classification code; and in the calculating of the first summation, weighting each occurrence of the first occurrences of patents by inventor order;

calculating a first breadth score for the first inventor;

identifying first one or more co-inventors on a collection of patent documents on which the first inventor is listed;

calculating a second depth score for a second inventor, the calculating of the second depth score comprising:

calculating a second summation of second occurrences of patents obtained by the second inventor associated with the certain patent classification code; and in the calculating of the second summation, weighting each occurrence of the second occurrences of patents by inventor order;

calculating a second breadth score for the second inventor;

identifying second one or more co-inventors on a collection of patent documents on which the second inventor is listed;

ranking the first inventor relative to the second inventor based on the first scores and a first number of unique co-inventors in the first one or more co-inventors as well as the second scores and a second number of unique co-inventors in the second one or more co-inventors;

measuring attributes of a brain of the first inventor using functional magnetic resonance imaging (fMRI), and wherein the calculating of the first depth score is further based on the measured attributes of the brain of the first inventor; and measuring attributes of a brain of the second inventor using fMRI, and wherein the calculating of the second depth score is further based on the measured attributes of the brain of the second inventor.

18. The computer of claim 17, wherein the method performed by the computer further comprises the following steps:

correlating the measured attributes of the brain of the first inventor to the first depth score; correlating the measured attributes of the brain of the second inventor to the second depth score; and repeating the correlations on a group of inventors to create a training set.

19. The system of claim 8, wherein the instruction set is further executable by the processor of the special purpose machine computer to cause the special purpose machine computer to:

correlate the measured attributes of the brain of the first inventor to the first depth score;

correlate the measured attributes of the brain of the second inventor to the second depth score; and repeat the correlations on a group of inventors to create a training set.

20. The system of claim 8, wherein the instruction set is further executable by the processor of the special purpose computer to cause the special purpose computer to:

calculate a first collaboration score according to depth scores of co-inventors of the first inventor, wherein the collaboration score is reflective of an ability of the first inventor to work with other inventors, and wherein the calculations of the depth scores of the co-inventors are performed in a similar way as the calculation of the first depth score of the first inventor.

* * * * *

UNITED STATES PATENT AND TRADEMARK OFFICE
CERTIFICATE OF CORRECTION

PATENT NO. : 10,984,476 B2
APPLICATION NO. : 16/110848
DATED : April 20, 2021
INVENTOR(S) : Andrew Ouderkirk and Rachel Andreasen Page 1 of 1

It is certified that error appears in the above-identified patent and that said Letters Patent is hereby corrected as shown below:

In the Specification

Column 3, Line 64, delete "FIG. 13 is chart" and insert the text --FIGS. 13A, 13B, 13C, and 13D are charts with each chart--.

Column 3, Line 67, delete "FIG. 13" and insert the text --FIGS. 13A, 13B, 13C, and 13D--.

Column 23, Line 19, delete "FIG. 13 shows" and insert the text --FIGS. 13A, 13B, 13C, and 13D show--.

Column 23, Line 25, delete "FIG. 13" and insert the text --FIGS. 13A, 13B, 13C, and 13D--.

Column 24, Line 31, delete "FIG. 13" and insert the text --FIGS. 13A, 13B, 13C, and 13D--.

Signed and Sealed this
Third Day of May, 2022

Katherine Kelly Vidal
*Director of the United States Patent and Trademark Office*